(12) United States Patent
Gardner et al.

(10) Patent No.: US 11,479,046 B2
(45) Date of Patent: Oct. 25, 2022

(54) LOGIC CIRCUITRY FOR SENSOR DATA COMMUNICATIONS

(71) Applicant: Hewlett-Packard Development Company, L.P., Spring, TX (US)

(72) Inventors: James Michael Gardner, Corvallis, OR (US); Sirena Chi Lu, Corvallis, OR (US); Scott A. Linn, Corvallis, OR (US); Stephen D. Panshin, Corvallis, OR (US); David Owen Roethig, Vancouver, WA (US); David N. Olsen, Corvallis, OR (US); Anthony D. Studer, Corvallis, OR (US); Michael W. Cumbie, Corvallis, OR (US); Jefferson P. Ward, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 222 days.

(21) Appl. No.: 16/772,997

(22) PCT Filed: Apr. 5, 2019

(86) PCT No.: PCT/US2019/026159
§ 371 (c)(1),
(2) Date: Jun. 15, 2020

(87) PCT Pub. No.: WO2020/117307
PCT Pub. Date: Jun. 11, 2020

(65) Prior Publication Data
US 2021/0078334 A1 Mar. 18, 2021

Related U.S. Application Data

(63) Continuation of application No. PCT/US2018/063624, filed on Dec. 3, 2018, and a continuation
(Continued)

(51) Int. Cl.
*B41J 2/175* (2006.01)
*G06F 13/42* (2006.01)
(Continued)

(52) U.S. Cl.
CPC ......... *B41J 2/1753* (2013.01); *B41J 2/17513* (2013.01); *B41J 2/17523* (2013.01);
(Continued)

(58) Field of Classification Search
None
See application file for complete search history.

(56) References Cited

U.S. PATENT DOCUMENTS 3,109,125 A 10/1963 Wachowiak
3,553,483 A 1/1971 Jarvis
(Continued)

FOREIGN PATENT DOCUMENTS

AU 2014202104 A1 5/2014
CA 2507422 A1 1/2002
(Continued)

OTHER PUBLICATIONS

Arnostech, "Thermal Inkjet Printers," retrieved at http://www.arnostech.com/machines/coding-systems/thermal-inkjet-printers/, retrieved on Jul. 1, 2019 3 pages.
(Continued)

*Primary Examiner* — Miya J Williams
(74) *Attorney, Agent, or Firm* — Hanley Flight & Zimmerman LLC

(57) ABSTRACT

In an example, a method includes, by logic circuitry associated with a replaceable print apparatus component installed in a print apparatus, responding to a sensor data request received from the print apparatus by returning a first
(Continued)

response; receiving a calibration parameter from the print apparatus; and returning a second response which is different from the first response.

19 Claims, 18 Drawing Sheets

Related U.S. Application Data of application No. PCT/US2018/063630, filed on Dec. 3, 2018, and a continuation of application No. PCT/US2018/063631, filed on Dec. 3, 2018, and a continuation of application No. PCT/US2018/063643, filed on Dec. 3, 2018, and a continuation of application No. PCT/US2018/063638, filed on Dec. 3, 2018.

(51) Int. Cl.
| | | |
|---|---|---|
| *G06F 21/44* | (2013.01) | |
| *G06F 9/30* | (2018.01) | |
| *G06F 21/62* | (2013.01) | |
| *H04L 9/08* | (2006.01) | |
| *H04L 9/32* | (2006.01) | |

(52) U.S. Cl.
CPC ....... *B41J 2/17546* (2013.01); *B41J 2/17553* (2013.01); *B41J 2/17556* (2013.01); *B41J 2/17566* (2013.01); *G06F 9/30105* (2013.01); *G06F 13/4282* (2013.01); *G06F 21/44* (2013.01); *G06F 21/62* (2013.01); *H04L 9/0819* (2013.01); *H04L 9/3242* (2013.01); *B41J 2002/17579* (2013.01); *B41J 2202/13* (2013.01); *B41J 2202/20* (2013.01)

(56) References Cited

U.S. PATENT DOCUMENTS

| | | | |
|---|---|---|---|
| 3,614,576 | A | 10/1971 | Raphael |
| 4,074,284 | A | 2/1978 | Dexter et al. |
| 4,503,441 | A | 3/1985 | Tamukai |
| 4,506,276 | A | 3/1985 | Kyser et al. |
| 4,639,738 | A | 1/1987 | Young et al. |
| 4,734,787 | A | 3/1988 | Hayashi |
| 5,001,596 | A | 3/1991 | Hart |
| 5,045,811 | A | 9/1991 | Lewis |
| 5,079,570 | A | 1/1992 | Mohr et al. |
| 5,142,909 | A | 9/1992 | Baughman |
| 5,329,254 | A | 7/1994 | Takano |
| 5,438,351 | A | 8/1995 | Trenchard et al. |
| 5,471,176 | A | 11/1995 | James et al. |
| 5,583,544 | A | 12/1996 | Stamer et al. |
| 5,680,960 | A | 10/1997 | Keyes et al. |
| 5,682,184 | A | 10/1997 | Stephany et al. |
| 5,699,091 | A | 12/1997 | Bullock et al. |
| 5,731,824 | A | 3/1998 | Kneezel et al. |
| 5,751,323 | A | 5/1998 | Swanson |
| 5,757,406 | A | 5/1998 | Kaplinsky et al. |
| 5,777,646 | A | 7/1998 | Barinaga et al. |
| 5,788,388 | A | 8/1998 | Cowger et al. |
| 5,861,780 | A | 1/1999 | Fukuda |
| 5,975,688 | A | 11/1999 | Kanaya et al. |
| 6,068,363 | A | 5/2000 | Saito |
| 6,098,457 | A | 8/2000 | Poole |
| 6,151,039 | A | 11/2000 | Hmelar et al. |
| 6,164,766 | A | 12/2000 | Erickson |
| 6,175,929 | B1 | 1/2001 | Hsu et al. |
| 6,219,933 | B1 | 4/2001 | Taniguchi et al. |
| 6,299,273 | B1 | 10/2001 | Anderson et al. |
| 6,312,074 | B1 | 11/2001 | Walker |
| 6,341,853 | B1 | 1/2002 | Scheffelin et al. |
| 6,386,693 | B1 | 5/2002 | Michele |
| 6,402,299 | B1 | 6/2002 | DeMeerleer |
| 6,412,901 | B2 | 7/2002 | Su et al. |
| 6,431,670 | B1 | 8/2002 | Schantz et al. |
| 6,456,802 | B1 | 9/2002 | Phillips |
| 6,457,355 | B1 | 10/2002 | Philipp |
| 6,494,553 | B1 | 12/2002 | Donahue et al. |
| 6,494,568 | B2 | 12/2002 | Hou et al. |
| 6,598,963 | B1 | 7/2003 | Yamamoto et al. |
| 6,641,240 | B2 | 11/2003 | Hsu et al. |
| 6,641,243 | B2 | 11/2003 | Anderson et al. |
| 6,648,434 | B2 | 11/2003 | Walker et al. |
| 6,685,290 | B1 | 2/2004 | Farr et al. |
| 6,736,497 | B2 | 5/2004 | Jung |
| 6,796,644 | B1 | 9/2004 | Anderson, Jr. et al. |
| 6,802,581 | B2 | 10/2004 | Hasseler et al. |
| 6,802,602 | B2 | 10/2004 | Sakai et al. |
| 6,811,250 | B2 | 11/2004 | Buchanan et al. |
| 6,902,256 | B2 | 6/2005 | Anderson et al. |
| 6,908,179 | B2 | 6/2005 | Pan et al. |
| 6,959,599 | B2 | 11/2005 | Feldstein et al. |
| 6,966,222 | B2 | 11/2005 | Carson et al. |
| 6,969,137 | B2 | 11/2005 | Maeda |
| 7,039,734 | B2 | 5/2006 | Sun et al. |
| 7,077,506 | B2 | 7/2006 | Chen |
| 7,155,972 | B2 | 1/2007 | Kosugi |
| 7,171,323 | B2 | 1/2007 | Shipton et al. |
| 7,240,130 | B2 | 7/2007 | Larson |
| 7,260,662 | B2 | 8/2007 | Moriwaki et al. |
| 7,328,115 | B2 | 2/2008 | Shipton et al. |
| 7,380,042 | B2 | 5/2008 | Wang et al. |
| 7,458,656 | B2 | 12/2008 | Smith |
| 7,533,960 | B2 | 5/2009 | Yasuda et al. |
| 7,547,082 | B2 | 6/2009 | Lee et al. |
| 7,630,304 | B2 | 12/2009 | Larson et al. |
| 7,686,423 | B2 | 3/2010 | Sato et al. |
| 7,740,347 | B2 | 6/2010 | Silverbrook et al. |
| 7,775,638 | B2 | 8/2010 | Hirosawa et al. |
| 7,841,712 | B2 | 11/2010 | Muyskens et al. |
| 7,886,197 | B2 | 2/2011 | Wegman |
| 7,890,690 | B2 | 2/2011 | Naderi et al. |
| 7,970,042 | B2 | 6/2011 | Lexmark |
| 8,040,215 | B2 | 10/2011 | Zakriti |
| 8,161,224 | B2 | 4/2012 | Laurencin et al. |
| 8,215,018 | B2 | 7/2012 | Morita et al. |
| 8,220,910 | B2 | 7/2012 | Wanibe |
| 8,224,602 | B2 | 7/2012 | Lory et al. |
| 8,289,788 | B2 | 10/2012 | Asauchi |
| 8,331,581 | B2 | 12/2012 | Pennock |
| 8,348,377 | B2 | 1/2013 | Asauchi |
| 8,350,628 | B1 | 1/2013 | George et al. |
| 8,364,859 | B2 | 1/2013 | Sato |
| 8,386,657 | B2 | 2/2013 | Adkins et al. |
| 8,393,718 | B2 | 3/2013 | Kida et al. |
| 8,393,721 | B2 | 3/2013 | Katoh et al. |
| 8,429,437 | B2 | 4/2013 | Asauchi |
| 8,432,421 | B2 | 4/2013 | Muraki et al. |
| 8,438,919 | B2 | 5/2013 | Phillips et al. |
| 8,454,137 | B2 | 6/2013 | Price et al. |
| 8,556,394 | B2 | 10/2013 | Chen |
| 8,558,577 | B1 | 10/2013 | Soriano Fosas et al. |
| 8,562,091 | B2 | 10/2013 | Sabanovic et al. |
| 8,591,012 | B2 | 11/2013 | Yoshino et al. |
| 8,608,276 | B2 | 12/2013 | Oohashi et al. |
| 8,621,116 | B2 | 12/2013 | Fister et al. |
| 8,651,614 | B2 | 2/2014 | Sakamoto et al. |
| 8,651,643 | B2 | 2/2014 | Harvey et al. |
| 8,721,059 | B2 | 5/2014 | Kodama et al. |
| 8,721,203 | B2 | 5/2014 | Ehrhardt, Jr. |
| 8,752,943 | B2 | 6/2014 | Hirano et al. |
| 8,864,277 | B2 | 10/2014 | Rice et al. |
| 8,876,257 | B2 | 11/2014 | Harada et al. |
| 8,888,207 | B2 | 11/2014 | Furness, III et al. |
| 8,892,798 | B2 | 11/2014 | Tailliet et al. |
| 8,898,358 | B2 | 11/2014 | DeCesaris et al. |
| 8,978,487 | B2 | 3/2015 | Fergusson et al. |
| 8,990,467 | B2 | 3/2015 | Saito |
| 9,079,414 | B2 | 7/2015 | Lester et al. |
| 9,108,448 | B1 | 8/2015 | Bergstedt |
| 9,132,656 | B2 | 9/2015 | Nicholson, III et al. |

(56) References Cited

U.S. PATENT DOCUMENTS

| | | |
|---|---|---|
| 9,137,093 B1 | 9/2015 | Abraham et al. |
| 9,176,921 B2 | 11/2015 | Fister et al. |
| 9,194,734 B2 | 11/2015 | Mehrer et al. |
| 9,213,396 B1 | 12/2015 | Booth et al. |
| 9,213,927 B1 | 12/2015 | Ahne et al. |
| 9,254,661 B2 | 2/2016 | Otaka et al. |
| 9,298,908 B1 | 3/2016 | Booth et al. |
| 9,370,934 B2 | 6/2016 | Asauchi et al. |
| 9,400,204 B2 | 7/2016 | Schoenberg |
| 9,413,356 B1 | 8/2016 | McKinley |
| 9,413,359 B2 | 8/2016 | Stirk |
| 9,454,504 B2 | 9/2016 | Evans |
| 9,483,003 B2 | 11/2016 | Thacker, III |
| 9,487,017 B2 | 11/2016 | Ge et al. |
| 9,496,884 B1 | 11/2016 | Azenkot et al. |
| 9,511,596 B2 | 12/2016 | Anderson et al. |
| 9,561,662 B2 | 2/2017 | Ward et al. |
| 9,582,443 B1 | 2/2017 | Switzer et al. |
| 9,599,500 B2 | 3/2017 | Ge et al. |
| 9,619,663 B2 | 4/2017 | Refstrup |
| 9,671,820 B2 | 6/2017 | Maruyama et al. |
| 9,734,121 B2 | 8/2017 | Pitigoi-Aron et al. |
| 9,738,087 B2 | 8/2017 | Kato et al. |
| 9,746,799 B2 | 8/2017 | Jeran |
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo et al. |
| 10,031,882 B2 | 7/2018 | Srivastava |
| 10,052,878 B2 | 8/2018 | Bonneton |
| 10,107,667 B2 | 10/2018 | Cumbie et al. |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Campbell-Brown et al. |
| 10,259,230 B2 | 4/2019 | Asauchi |
| 10,279,594 B2 | 5/2019 | Horade et al. |
| 10,338,838 B2 | 7/2019 | Olarig |
| 10,412,461 B2 | 9/2019 | Long et al. |
| 10,471,725 B2 | 11/2019 | Esterberg et al. |
| 10,875,318 B1 | 12/2020 | Gardner et al. |
| 10,894,423 B2 | 1/2021 | Gardner et al. |
| 11,034,157 B2 | 6/2021 | Gardner et al. |
| 2001/0029554 A1 | 10/2001 | Namba |
| 2001/0033316 A1 | 10/2001 | Eida |
| 2002/0012016 A1 | 1/2002 | Wilson et al. |
| 2002/0012616 A1 | 1/2002 | Zhou et al. |
| 2002/0033855 A1 | 3/2002 | Kubota et al. |
| 2002/0109761 A1 | 8/2002 | Shimizu et al. |
| 2002/0129650 A1 | 9/2002 | Zimmermann et al. |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1* | 4/2003 | Tsukada ............... B41J 2/17523 347/7 |
| 2003/0202024 A1 | 10/2003 | Corrigan |
| 2004/0021711 A1 | 2/2004 | Hasseler et al. |
| 2004/0036733 A1 | 2/2004 | Kubota et al. |
| 2004/0085382 A1 | 5/2004 | Kosugi et al. |
| 2004/0155913 A1 | 8/2004 | Kosugi et al. |
| 2004/0252146 A1 | 12/2004 | Naka et al. |
| 2005/0010910 A1 | 1/2005 | Lindhorst et al. |
| 2005/0093910 A1 | 5/2005 | Im |
| 2005/0125105 A1 | 6/2005 | Halstead et al. |
| 2005/0126282 A1 | 6/2005 | Maatuk |
| 2005/0185595 A1 | 8/2005 | Lee |
| 2005/0229699 A1 | 10/2005 | Chai et al. |
| 2006/0007253 A1 | 1/2006 | Kosugi |
| 2006/0007295 A1 | 1/2006 | Ueda |
| 2006/0072952 A1 | 4/2006 | Walmsley et al. |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong |
| 2007/0024650 A1 | 2/2007 | Reinten et al. |
| 2007/0068249 A1 | 3/2007 | Eguchi et al. |
| 2007/0088816 A1 | 4/2007 | Hrustemovic et al. |
| 2007/0115307 A1 | 5/2007 | Smith |
| 2007/0146409 A1 | 6/2007 | Kubota et al. |
| 2007/0247497 A1 | 10/2007 | Buchanan et al. |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Kwok et al. |
| 2008/0165232 A1 | 7/2008 | Yuen |
| 2008/0192074 A1 | 8/2008 | Dubois et al. |
| 2008/0211838 A1 | 9/2008 | Zhang |
| 2008/0246626 A1 | 10/2008 | Sheafor et al. |
| 2008/0298455 A1 | 12/2008 | Greenblat et al. |
| 2008/0307134 A1 | 12/2008 | Geissler et al. |
| 2009/0013779 A1 | 1/2009 | Usui et al. |
| 2009/0021766 A1 | 1/2009 | Yamazaki |
| 2009/0177823 A1* | 7/2009 | Chao .................... G06F 13/385 710/110 |
| 2009/0179678 A1 | 7/2009 | Hardin et al. |
| 2009/0290005 A1 | 11/2009 | Wanibe et al. |
| 2009/0309941 A1 | 12/2009 | Price et al. |
| 2010/0220128 A1 | 3/2010 | Zaba |
| 2010/0082271 A1 | 4/2010 | McCann et al. |
| 2010/0138745 A1 | 6/2010 | McNamara et al. |
| 2010/0205350 A1 | 8/2010 | Bryant-Rich |
| 2010/0248208 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |
| 2011/0279530 A1 | 11/2011 | Love et al. |
| 2011/0285027 A1 | 11/2011 | Lee |
| 2012/0128379 A1 | 5/2012 | Takeda |
| 2012/0243559 A1 | 9/2012 | Pan et al. |
| 2012/0284429 A1 | 11/2012 | Adkins et al. |
| 2012/0299989 A1 | 11/2012 | Prothon et al. |
| 2013/0018513 A1 | 1/2013 | Metselaar |
| 2013/0054933 A1* | 2/2013 | Fister ................. G03G 15/0863 711/E12.061 |
| 2013/0067015 A1 | 3/2013 | Vasters |
| 2013/0067016 A1 | 3/2013 | Adkins et al. |
| 2013/0083096 A1 | 4/2013 | Rice et al. |
| 2013/0155142 A1 | 6/2013 | Browning et al. |
| 2013/0250024 A1 | 9/2013 | Kakishima |
| 2013/0295245 A1 | 11/2013 | Gardner et al. |
| 2014/0040517 A1 | 2/2014 | Fister et al. |
| 2014/0095750 A1 | 4/2014 | Tailliet |
| 2014/0164660 A1 | 6/2014 | Decesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin et al. |
| 2014/0372652 A1 | 12/2014 | Shu |
| 2014/0375321 A1 | 12/2014 | Ikeya |
| 2014/0375730 A1 | 12/2014 | Campbell-Brown et al. |
| 2015/0028671 A1 | 1/2015 | Ragaini et al. |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |

(56) References Cited

U.S. PATENT DOCUMENTS

| | | |
|---|---|---|
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1* | 4/2016 | Booth .................... G06F 21/44 726/2 |
| 2016/0114590 A1 | 4/2016 | Arpin |
| 2016/0279962 A1 | 9/2016 | Ishida et al. |
| 2016/0357691 A1 | 12/2016 | Ahne |
| 2016/0364305 A1 | 12/2016 | Pitigoi-Aron |
| 2016/0368273 A1 | 12/2016 | Ishikawa |
| 2017/0032135 A1 | 2/2017 | Refstrup |
| 2017/0050383 A1 | 2/2017 | Bell et al. |
| 2017/0100941 A1 | 4/2017 | Kuribayashi |
| 2017/0115307 A1 | 4/2017 | Garcia-Martinez et al. |
| 2017/0144448 A1 | 5/2017 | Smith |
| 2017/0157929 A1 | 6/2017 | Yokoo et al. |
| 2017/0168976 A1 | 6/2017 | Yost |
| 2017/0169623 A1 | 6/2017 | Chen et al. |
| 2017/0182786 A1 | 6/2017 | Angulo et al. |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi et al. |
| 2018/0050537 A1 | 2/2018 | Bakker et al. |
| 2018/0100753 A1 | 4/2018 | Cumbie et al. |
| 2018/0143935 A1 | 5/2018 | Cox et al. |
| 2018/0157943 A1 | 6/2018 | Fister et al. |
| 2018/0162137 A1 | 6/2018 | Van et al. |
| 2018/0212593 A1 | 7/2018 | Usuda |
| 2018/0264808 A1 | 9/2018 | Bakker et al. |
| 2018/0281394 A1 | 10/2018 | Horade et al. |
| 2018/0281438 A1 | 10/2018 | Horade et al. |
| 2018/0290457 A1 | 10/2018 | Ge et al. |
| 2018/0302110 A1 | 10/2018 | Solan |
| 2018/0304640 A1 | 10/2018 | Horne |
| 2019/0004991 A1 | 1/2019 | Foust et al. |
| 2019/0011306 A1 | 1/2019 | Cumbie et al. |
| 2019/0012663 A1 | 1/2019 | Masters |
| 2019/0013731 A1 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1 | 4/2019 | Anderson et al. |
| 2019/0118527 A1 | 4/2019 | Anderson et al. |
| 2019/0126631 A1 | 5/2019 | Anderson et al. |
| 2019/0126632 A1 | 5/2019 | Anderson et al. |
| 2019/0137316 A1 | 5/2019 | Anderson et al. |
| 2019/0138484 A1 | 5/2019 | De et al. |
| 2019/0217628 A1 | 7/2019 | Horade et al. |
| 2019/0226930 A1 | 7/2019 | Cumbie et al. |
| 2019/0240985 A1 | 8/2019 | Ge et al. |
| 2020/0159689 A1 | 5/2020 | Koshisaka et al. |
| 2021/0334392 A1 | 10/2021 | Panshin et al. |

FOREIGN PATENT DOCUMENTS

| | | | |
|---|---|---|---|
| CN | 1367080 A | 9/2002 | |
| CN | 1380852 A | 11/2002 | |
| CN | 2603934 | 2/2004 | |
| CN | 1621959 A | 6/2005 | |
| CN | 2734479 | 10/2005 | |
| CN | 101143515 A | 3/2008 | |
| CN | 201761148 | 3/2011 | |
| CN | 102112977 A | 6/2011 | |
| CN | 102231054 | 11/2011 | |
| CN | 203651218 | 6/2014 | |
| CN | 102736627 | 12/2014 | |
| CN | 103879149 B | 6/2015 | |
| CN | 105760318 | 7/2016 | |
| CN | 106183411 A | 12/2016 | |
| CN | 106575271 A | 4/2017 | |
| CN | 107209743 | 9/2017 | |
| CN | 107379773 A | 11/2017 | |
| CN | 108602351 A | 9/2018 | |
| CN | 108819486 | 11/2018 | |
| CN | 109073441 A | 12/2018 | |
| CN | 209014461 U | 6/2019 | |
| DE | 3712699 C2 | 3/1989 | |
| EP | 0015954 A1 | 6/1984 | |
| EP | 0720916 A2 | 7/1996 | |
| EP | 1285764 | 2/2003 | |
| EP | 0994779 B1 | 4/2003 | |
| EP | 1314565 A2 | 5/2003 | |
| EP | 1238811 B1 | 12/2006 | |
| EP | 1800872 | 6/2007 | |
| EP | 1389531 | 7/2007 | |
| EP | 1164022 B1 | 7/2008 | |
| EP | 1524120 B1 | 9/2008 | |
| EP | 2237163 | 10/2010 | |
| EP | 1839872 B1 | 11/2010 | |
| EP | 2385468 | 11/2011 | |
| EP | 2854063 | 6/2019 | |
| EP | 3208736 | 12/2019 | |
| GB | 2519181 | 4/2015 | |
| JP | 04-220353 A | 8/1992 | |
| JP | 2001292133 | 10/2001 | |
| JP | 2002026471 A | 1/2002 | |
| JP | 2003326726 | 11/2003 | |
| JP | 2005262458 A | 9/2005 | |
| JP | 2009258604 | 11/2009 | |
| JP | 2010079199 | 4/2010 | |
| JP | 2011113336 | 6/2011 | |
| JP | 2012063770 | 3/2012 | |
| JP | 2013197677 | 9/2013 | |
| JP | 5644052 B2 | 12/2014 | |
| JP | 2014534917 | 12/2014 | |
| JP | 2016-185664 A | 10/2016 | |
| JP | 2017196842 | 11/2017 | |
| JP | 2018049141 | 3/2018 | |
| JP | 2018136774 | 8/2018 | |
| JP | 2018161785 | 10/2018 | |
| JP | 2018531394 | 10/2018 | |
| KR | 10-2008-0003539 A | 1/2008 | |
| KR | 10-1785051 B1 | 10/2017 | |
| TW | 200707209 | 2/2007 | |
| TW | 201202948 | 1/2012 | |
| TW | 201546620 A | 12/2015 | |
| WO | 98/55318 A1 | 12/1998 | |
| WO | 2007107957 | 9/2007 | |
| WO | 2008/117194 A1 | 10/2008 | |
| WO | 2009/145774 A1 | 12/2009 | |
| WO | 2012/020443 A1 | 2/2012 | |
| WO | 2012/054050 A1 | 4/2012 | |
| WO | 2012/057755 A1 | 5/2012 | |
| WO | WO-2013048430 A1 * | 4/2013 | ............ B41J 2/1753 |
| WO | 2015/116092 A1 | 8/2015 | |
| WO | 2016/061480 A2 | 4/2016 | |
| WO | 2016/114759 A1 | 7/2016 | |
| WO | 2016/130157 A1 | 8/2016 | |
| WO | 2017/074334 A1 | 5/2017 | |
| WO | 2017/074342 A1 | 5/2017 | |
| WO | 2017/174363 A1 | 10/2017 | |
| WO | 2017/184147 A1 | 10/2017 | |
| WO | 2017/189009 A1 | 11/2017 | |
| WO | 2017/189010 | 11/2017 | |
| WO | 2017/189011 A1 | 11/2017 | |
| WO | 2017/189013 A1 | 11/2017 | |
| WO | 2017/194913 A1 | 11/2017 | |
| WO | 2018/017066 A1 | 1/2018 | |
| WO | 2018/022038 A1 | 2/2018 | |
| WO | 2018/186847 A1 | 10/2018 | |
| WO | 2018/199886 A1 | 11/2018 | |
| WO | 2018/199891 A1 | 11/2018 | |
| WO | 2018/199895 A1 | 11/2018 | |
| WO | 2018/217185 A1 | 11/2018 | |
| WO | 2019/017963 A1 | 1/2019 | |
| WO | 2019/078834 A1 | 4/2019 | |
| WO | 2019/078835 A1 | 4/2019 | |
| WO | 2019/078839 A1 | 4/2019 | |

(56) References Cited

FOREIGN PATENT DOCUMENTS

| WO | 2019/078840 | A1 | 4/2019 |
| WO | 2019/078843 | A1 | 4/2019 |
| WO | 2019/078844 | A1 | 4/2019 |
| WO | 2019/078845 | A1 | 4/2019 |

OTHER PUBLICATIONS

Epson, "Epson provides the best inks for the job," retrieved at https://www.epson.co.nz/microsite/excellence/inks_why.asp, retrieved on Jul. 1, 2019, 3 pages.

HP, "Development of the HP DeskJet 1200C Print Cartridge Platform", retrieved at https://www.hpl.hp.com/hpjournal/94feb/feb94a7.pdf, Feb. 1994, 9 pages.

International Searching Authority "International Search Report and Written Opinion" issued in connection with PCT/US2019/026159 dated Aug. 13, 2019, 15 pages.

International Searching Authority "International Search Report and Written Opinion" issued in connection with PCT/US2018/063633 dated Jul. 23, 2019, 12 pages.

International Searching Authority "International Search Report and Written Opinion" issued in connection with PCT/US2019/017511 dated Jul. 25, 2019, 12 pages.

International Searching Authority "International Search Report and Written Opinion" issued in connection with PCT/US2019/026124 dated Aug. 26, 2019, 15 pages.

International Searching Authority "International Search Report and Written Opinion" issued in connection with PCT/US2019/026133 dated Aug. 26, 2019, 18 pages.

International Searching Authority "International Search Report and Written Opinion" issued in connection with PCT/US2018/063638 dated Aug. 26, 2019, 13 pages.

International Searching Authority "International Search Report and Written Opinion" issued in connection with PCT/US2018/063624 dated Aug. 23, 2019, 13 pages.

International Searching Authority "International Search Report and Written Opinion" issued in connection with PCT/US2018/063630 dated Aug. 22, 2019, 15 pages.

International Searching Authority "International Search Report and Written Opinion" issued in connection with PCT/US2018/063631 dated Aug. 23, 2019, 13 pages.

International Searching Authority "International Search Report and Written Opinion" issued in connection with PCT/US2018/063643 dated Aug. 20, 2019, 13 pages.

International Searching Authority "International Search Report and Written Opinion" issued in connection with PCT/US2019/026145 dated Sep. 5, 2019, 16 pages.

International Searching Authority "International Search Report and Written Opinion" issued in connection with PCT/US2019/026161 dated Aug. 26, 2019, 20 pages.

Laureto, J., et al., "Open Source Multi-head 3D printer for polymer metal composite component manufacturing," Technologies 2017, vol. 5(2), pp. 1-23.

Maxim Integrated Products "1-to-8 I2C Bus Switches/Multiplexers with Bus Lock-Up Detection, Isolation, and Notification," retrieved at https://www.maximintegrated.com/en/products/analog/analog-switches-multiplexers/MAX7356.html, Sep. 2008, 22 pages.

NXP "Introducing A10006 Secure Authenticator Tamper-Resistant Anti Counterfeit Solution", retrieved at https://www.nxp.com/docs/en/supporting-information/A1006-Secure-Authenticator.pdf, retrieved on Jul. 3, 2019, 29 pages.

NXP Semiconductors N.V. "NXP 2-, 4-, and 8-channel I2C/SMBus muxes and switches PCA954x" retrieved at https://www.nxp.com/docs/en/brochure/75016529.pdf, Apr. 1, 2014, 34 pages.

NXP Semiconductors N.V. "PCA9641: 2-channel I2C-bus master arbiter Product data Sheet" retrieved at https://www.nxp.com/docs/en/data-sheet/PCA9641.pdf, Oct. 23, 2014, 77 pages.

Reddit, "Use an accelerometer to measure Z wobble", retrieved at https://www.reddit.com/r/Reprapicomments/6qsoyd/, retrieved on Jul. 1, 2019, 3 pages.

The I2C-Bus Specification Version 2.1 Jan. 2000, retrieved at https://www.csd.uoc.gr/~hy428/reading/i2c_spec.pdf, Jan. 2000, 46 pages.

United States Patent and Trademark Office, "Non-Final office action ," issued in connection with U.S. Appl. No. 16/502,479, dated Dec. 11, 2019, 13 pages.

United States Patent and Trademark Office, "Non-Final Office action," issued in connection with U.S. Appl. No. 16/460,016, dated Sep. 12, 2019, 12 pages.

United States Patent and Trademark Office, "Non-Final Office action," issued in connection with U.S. Appl. No. 16/505,090, dated Sep. 10, 2019, 20 pages.

United States Patent and Trademark Office, "Notice of Aliowance," issued in connection with U.S. Appl. No. 16/505,090, dated Oct. 22, 2019, 5 Pages.

United States Patent and Trademark Office, "Notice of allowance," issued in connection with U.S. Appl. No. 16/460,016, dated Mar. 25, 2020, 10 pages.

United States Patent and Trademark Office, "Notice of Allowance," issued in connection with U.S. Appl. No. 16/502,479, dated Apr. 9, 2020, 9 pages.

United States Patent and Trademark Office, "Notice of Allowance," issued in connection with U.S. Appl. No. 16/505,090, dated Feb. 12, 2020, 9 pages.

United States Patent and Trademark Office, "Restriction Requirement," issued in connection with U.S. Appl. No. 16/502,479, dated Aug. 15, 2019, 7 pages.

United States Patent and Trademark Office, "Notice of Allowance," Issued in connection with U.S. Appl. No. 16/728,207, dated Feb. 19, 2020 19 pages.

* cited by examiner

LOGIC CIRCUITRY FOR SENSOR DATA COMMUNICATIONS

BACKGROUND

Related Applications

This patent arises from the U.S. national stage of International Patent Application Serial No. PCT/US19/026159, having a filing date of Apr. 5, 2019, and claims priority to International Patent Application Serial No. PCT/US18/063624, having an international filing date of Dec. 3, 2018; International Patent Application Serial No. PCT/US18/063630, having an international filing date of Dec. 3, 2018; International Patent Application Serial No. PCT/US18/063631, having an international filing date of Dec. 3, 2018; International Patent Application Serial No. PCT/US18/063638, having an international filing date of Dec. 3, 2018; and International Patent Application Serial No. PCT/US18/063643, having an international filing date of Dec. 3, 2018. International Patent Application Serial No. PCT/US19/026159; International Patent Application Serial No. PCT/US18/063624; International Patent Application Serial No. PCT/US18/063630; International Patent Application Serial No. PCT/US18/063631; International Patent Application Serial No. PCT/US18/063638; and International Patent Application Serial No. PCT/US18/063643 are hereby incorporated by reference in their entireties.

Subcomponents of apparatus may communicate with one another in a number of ways. For example, Serial Peripheral Interface (SPI) protocol, Bluetooth Low Energy (BLE), Near Field Communications (NFC) or other types of digital or analogue communications may be used.

Some 2D and 3D printing systems include one or more replaceable print apparatus components, such as print material containers (e.g. inkjet cartridges, toner cartridges, ink supplies, 3D printing agent supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like. In further examples, print material containers may include circuitry to execute one or more monitoring functions such as print material level sensing.

Disclosures discussing data stored on, and pertaining to, print apparatus components include EP patent publication No. 0941856, and international patent application publications Nos. WO2015/016860 and WO2016/028272, and US patent publication No. 6685290. Disclosures of communication and authentication circuits for print apparatus components include US patent publication Nos. 9619663, 9561662 and 9893893. Examples disclosures discussing print material sensors and sensor arrays for print apparatus components include international patent application publications Nos. WO2017/189010, WO2017/189011, WO2017/074342, WO2017/184147, WO2017184143, and WO2018/022038. Example disclosures discussing air and pressure regulation include US patent publication Nos. 8919935, 9056479, 9090082, 8998393, 9315030 and 9211720. These publications are incorporated by reference.

BRIEF DESCRIPTION OF DRAWINGS

Non-limiting examples will now be described with reference to the accompanying drawings, in which.

DETAILED DESCRIPTION

Figure 1:
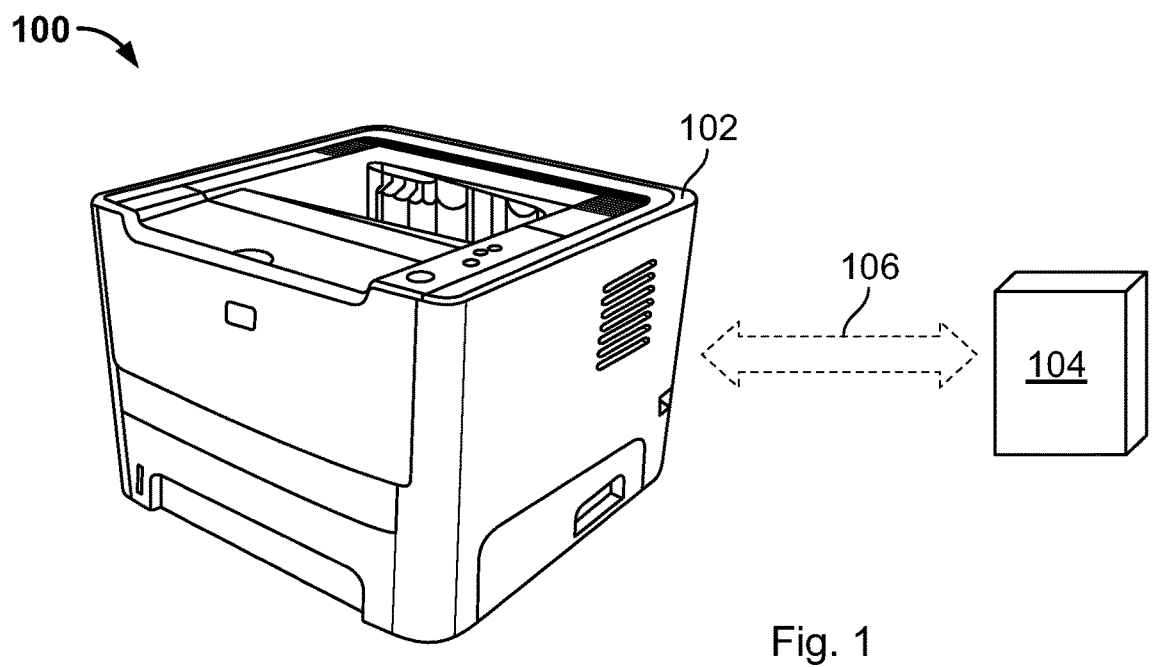
FIG. 1 is an example of a printing system.

Some examples of applications described herein are in the context of print apparatus. However, not all the examples are limited to such applications, and at least some of the principles set out herein may be used in other contexts.

The contents of other applications and patents cited in this disclosure are incorporated by reference.

In certain examples, Inter-integrated Circuit ($I^2C$, or I2C, which notation is adopted herein) protocol allows at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above x may indicate a logic "1" whereas a voltage value below x volts may indicate a logic "0", where x is a predetermined numerical value. By generating an appropriate voltage in each of a series of clock periods, data can be communicated via a bus or another communication link.

Certain example print material containers have slave logic that utilizes I2C communications, although in other examples, other forms of digital or analogue communications could also be used. In the example of I2C communication, a master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link or bus (for example, containers of different colors of print agent). The slave IC(s) may comprise a processor to perform data operations before responding to requests from logic circuitry of the print system.

Communications between print apparatus and replaceable print apparatus components installed in the apparatus (and/or the respective logic circuitry thereof) may facilitate various functions.

Logic circuitry within a print apparatus may receive information from logic circuitry associated with a replaceable print apparatus component via a communications interface, and/or may send commands to the replaceable print apparatus component logic circuitry, which may comprise commands to write data to a memory associated therewith, or to read data therefrom.

This disclosure may refer to print apparatus components, which may include replaceable print apparatus components. Certain print apparatus components may include a reservoir holding print agent or print material. In this disclosure print material and print agent mean the same thing and are intended to encompass different example print materials including ink, toner particles, liquid toner, three-dimensional printing agents (including stimulators and inhibitors), three-dimensional printing build material, three-dimensional print powder.

For example, the identity, functionality and/or status of a replaceable print apparatus component and/or the logic circuitry associated therewith may be communicated to logic circuitry of a print apparatus via a communications interface. For example, a print agent container logic circuit may be configured to communicate an identity. For example, the identity may be stored on the logic circuit to facilitate the checking thereof by a compatible print apparatus logic circuit, wherein in different examples the identity may be in the form of a product serial number, another cartridge number, a brand name, a signature or bit indicating an authenticity, etc. In certain examples of this disclosure, multiple functions or logic circuits may be associated with a single logic circuit package of a single print apparatus component whereby multiple corresponding identities may be stored on and/or read from the logic circuit package. For example, the logic circuitry of the print apparatus component may store print apparatus component characteristics data, for example comprising data representative of at least one characteristic of a print material container, for example print material identifying characteristics, such as, total volume, initial fill volume and/or fill proportion (see for example EP patent publication No. 0941856); color such as cyan, magenta, yellow or black; color data including compressed or non-compressed color maps or portions thereof (see for example international patent application publication No. WO2015/016860); data to reconstruct colour maps such as recipes (see for example international patent application publication No. WO2016/028272); etc. For example, the print material characteristics may be configured to enhance a functionality or output with respect to a print apparatus in which it is installed. In a further example, a status, such as print material level-related data (e.g. a fill level) or other sensed (e.g. dynamic) property, may be provided via a communications interface, for example such that a print apparatus may generate an indication of the fill level to a user. In some examples, a validation process may be carried out by a print apparatus. An example of a cryptographically authenticated communication scheme is explained in US patent publication 9619663. For example, the print apparatus may verify that a print agent container originates from an authorized source, so as to ensure the quality thereof (for example, performing an authentication thereof). Examples of logic circuits of replaceable components that are configured to respond to authentication requests are US patent publication No. 9619663, US patent publication No. 9561662 and/or US patent publication No. 9893893.

In certain examples of this disclosure, a validation process may include an integrity check to ensure that the replaceable print apparatus component and/or the logic circuitry associated therewith is functioning as expected, for example that communicated identity or identities, print material characteristics and status are as expected. The validation process may further comprise requesting sensor information such that logic circuitry of a print apparatus component can check that this sensor data complies with expected parameters.

Examples of sensors and sensor arrays are disclosed in prior international patent application publications WO2017/074342, WO2017/184147, and WO2018/022038. These or other sensor types, or other arrangements that simulate signal outputs similar to these sensor arrays, could be used in accordance with this disclosure.

In turn, instructions to perform tasks may be sent to logic circuitry of a print apparatus component from logic circuitry associated with a print apparatus via the communications interface.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples the package may be directly affixed to a cartridge wall. In some examples, the package may comprise an interface, for example comprising pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g. a print apparatus). A first type of request may comprise a request for data, for example identification and/or authentication information. A second type of request from a host may be a request to perform a physical action, such as performing at least one measurement. A third type of request may be a request for a data processing action. There may be additional types or requests.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between master to slaves in accordance with the I2C protocol. In other examples, other forms of digital and/or analogue communication can be used.

FIG. 1 is an example of a printing system 100. The printing system 100 comprises a print apparatus 102 in communication with logic circuitry associated with a replaceable print apparatus component 104 via a communications link 106. Although for clarity, the replaceable print apparatus component 104 is shown as external to the print apparatus 102, in some examples, the replaceable print apparatus component 104 may be housed within the print apparatus. While a particular type of 2D print apparatus 102 is shown, a different type of 2D print apparatus or a 3D print apparatus may instead be provided.

The replaceable print apparatus component 104 may comprise, for example a print material container or cartridge (which, again, could be a build material container for 3D printing, a liquid or dry toner container for 2D printing, or a liquid print agent container for 2D or 3D printing), which may in some examples comprise a print head or other dispensing or transfer component. The replaceable print apparatus component 104 may for example contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example comprising print agent containers of different colors, print heads (which may be integral to the containers), or the like. In other examples the print apparatus components 104 could comprise service components, for example to be replaced by service personnel, examples of which could include print heads, toner process cartridges or logic circuit package by itself to adhere to corresponding print apparatus component and communicate to a compatible print apparatus logic circuit.

In some examples, the communications link 106 may comprise an I2C capable or compatible bus (herein after, an I2C bus).

Figure 2:
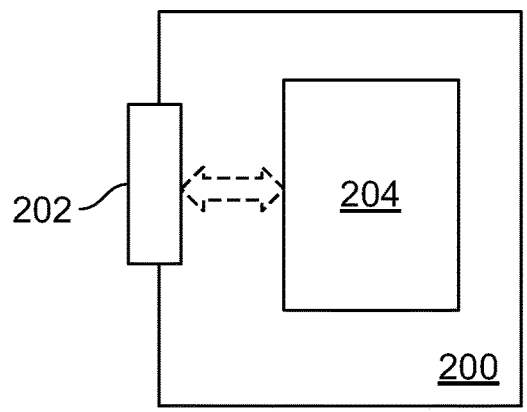
FIG. 2 is an example of a replaceable print apparatus component.

FIG. 2 shows an example of a replaceable print apparatus component 200, which may provide the replaceable print apparatus component 104 of FIG. 1. The replaceable print apparatus component 200 comprises a data interface 202 and a logic circuitry package 204. In use of the replaceable print apparatus component 200, the logic circuitry package 204 decodes data received via the data interface 202. The logic circuitry may perform other functions as set out below. The data interface 202 may comprise an I2C or other interface. In certain examples the data interface 202 may be part of the same package as the logic circuitry package 204.

In some examples, the logic circuitry package 204 may be further configured to encode data for transmission via the data interface 202. In some examples, there may be more than one data interface 202 provided.

In some examples, the logic circuitry package 204 may be arranged to act as a 'slave' in I2C communications.

Figure 3:
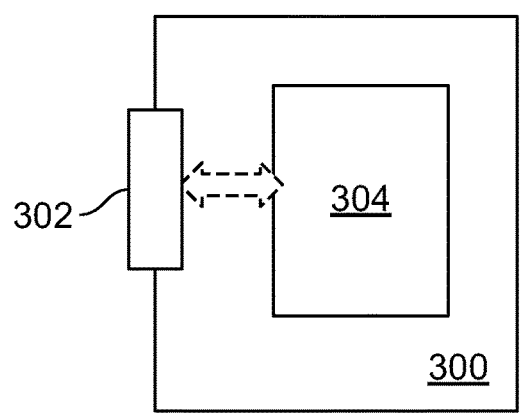
FIG. 3 shows an example of a print apparatus.

FIG. 3 shows an example of a print apparatus 300. The print apparatus 300 may provide the print apparatus 102 of FIG. 1. The print apparatus 300 may serve as a host for replaceable components. The print apparatus 300 comprises an interface 302 for communicating with a replaceable print apparatus component and a controller 304. The controller 304 comprises logic circuitry. In some examples, the interface 302 is an I2C interface.

In some examples, the controller 304 may be configured to act as a host, or a master, in I2C communications. The controller 304 may generate and send commands to at least one replaceable print apparatus component 200, and may receive and decode responses received therefrom. In other examples the controller 304 may communicate with the logic circuitry package 204 using any form of digital or analogue communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
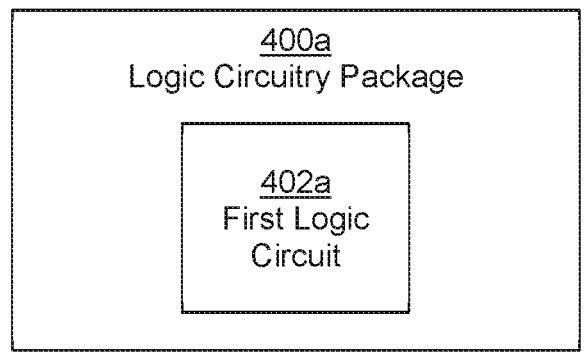
FIGS. 4A, 4B, 4C, 4D and 4E show examples of logic circuitry packages and processing circuitry.

FIG. 4A shows an example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

In some examples, the logic circuitry package 400a is addressable via a first address and comprises a first logic circuit 402a, wherein the first address is an I2C address for the first logic circuit 402a. In some examples, the first address may be configurable. In other examples, the first address is a fixed address, e.g. "hard-wired", intended to remain the same address during the lifetime of the first logic circuit 402a. The first address may be associated with the logic circuitry package 400a at and during the connection with a print apparatus logic circuit (e.g. a controller 304), outside of the time periods that are associated with a second address, as will be set out below. In example systems where a plurality of replaceable print apparatus components are to be connected to a single print apparatus, there may be a corresponding plurality of different first addresses. In certain examples, the first addresses can be considered standard I2C address for logic circuitry packages 400a or replaceable print components.

In some examples, the logic circuitry package 400a is also addressable via a second address. For example, the second address may be associated with different logic functions and/or, at least partially, with different data than the first address. In some examples, the second address may be associated with a different hardware logic circuit or a different virtual device than the first address.

In some examples, the second address may be configurable. The second address may be an initial and/or default second address at the start of a communication session via the second address and may be reconfigured to a different second address after the start of the session. In some examples, the second address may be used for the duration of the communication session, the logic circuitry package 400a may be configured to set the second address to a default or initial address at the end of the session, or at or before the beginning of a new session. Communications in such a communication session may be directed to the second address and between communication sessions may be directed to the first address, whereby the print apparatus logic circuit 304 may verify, for example, different identities, characteristics and/or status through these different communication sessions via different addresses. In examples where the end of a communication session via the second address is associated with a loss of power to at least part of the logic circuit as is further set out below, this loss of power may cause the second 'temporary' address to be discarded (for example, the second address may be held in volatile memory, whereas the initial or default address may be held in persistent memory). Therefore a 'new' or 'temporary' second address may be set each time after the corresponding communications session is started (although in some cases the 'new' or 'temporary' second address may have been previously used in relation to the logic circuitry).

In other examples the logic circuit package 400a may not set itself back to the initial second address for starting each corresponding communication session. Rather, it may allow for configuring the second address at each corresponding communication session, without switching to the initial or default second address.

In other words, the second address may be configured to be an initial second address at the start of a time period during which the communication session is to take place. The logic circuitry package 400a may be configured to reconfigure its second address to a temporary address in response to a command sent to the initial second address and including that temporary address during that time period. The logic circuitry package 400a may then be effectively reset such that upon receiving a subsequent command indicative of the task and time period sent to the first address, the logic circuitry package 400a is configured to have the same initial second address.

In some examples, the initial and/or default second address of different logic circuitry packages 204, 400a, for example associated with different print material types (such as different colours or agents) and compatible with the same print apparatus logic circuit 304, may be the same. However, for each communication session with the second address, each logic circuitry package 400a may be temporarily associated with a different temporary address, which may be set as the second address for each communication session. In certain examples, a random temporary second address can be used each time, in some examples with the condition that each enabled second address on a common I2C bus at a particular instant is different from the other enabled addresses. In some examples a 'random' second address may be a second address which is selected from a predetermined pool of possible second addresses, which may, in some examples, be stored on the print apparatus. The temporary address may be generated by the print apparatus logic circuit 304 for each connected logic circuitry package 400a and communicated through said command.

In some examples, the logic circuitry package 400a may comprise a memory to store the second address (in some examples in a volatile manner). In some examples, the memory may comprise a programmable address memory register for this purpose.

In some examples, the package 400a is configured such that, in response to a first command indicative of a first time period sent to the first address (and in some examples a task), the package 400a may respond in various ways. In some examples, the package 400a is configured such that it is accessible via at least one second address for the duration of the time period. Alternatively or additionally, in some examples, the package may perform a task, which may be the task specified in the first command. In other examples, the package may perform a different task.

The first command may, for example, be sent by a host such as a print apparatus in which the logic circuitry package 400a (or an associated replaceable print apparatus component) is installed. As set out in greater detail below, the task may comprise a monitoring task, for example, monitoring a timer (and in some examples, monitoring the time period). In other examples, the task may comprise a computational task, such as performing a mathematical challenge. In some examples, the task may comprise activating a second address and/or effectively deactivating the first address for communication purposes (or may comprise performance of actions which result in the activation or enabling of a second address and/or effectively deactivating or disabling of the first address). In some examples, activating or enabling a second address may comprise setting (e.g. writing, re-writing or changing), or triggering the setting of, a second address (for example, a temporary second address), for example by writing the second address in a portion of memory which is indicative of an address of the logic circuitry package 400a.

Where a task is specified, the task and/or time period may be specified explicitly in the first command, or may be inferred by the logic circuitry package 400a by reference to a lookup table or the like. In one example, the first command may for example comprise mode data and time data. For example, a first data field, which may be sent as part of a serial data package, may comprise a mode field. This may for example be around one or a few bits or bytes in size. A second data field, which may be sent as part of the serial data packet of the first data field in some examples, may comprise a 'dwell time' data field. For example, this may be around two or a few bits or bytes in size and may specify a time period, for example in milliseconds.

In some examples, the package 400a is configured so as to be inaccessible via the second address (the default or temporary second address or any address other the first address) for a second time period preceding (in some examples, immediately preceding) the first time period and/or for a third time period following (in some examples, immediately following) the first time period. In some examples, the first logic circuit 402a is to ignore I2C traffic sent to the first address (or any address other than a currently active second address) for the duration of the time period. In other words, the package 400a may respond to commands directed to the first address and not to commands directed to the second address outside the first time period; and may respond to commands directed to the second address and not to commands directed to the first address during the first time period. The term 'ignore' as used herein with respect to data sent on the bus may comprise any or any combination of not receiving (in some examples, not reading the data into a memory), not acting upon (for example, not following a command or instruction) and/or not responding (i.e. not providing an acknowledgement, and/or not responding with requested data). For example, 'ignoring' I2C traffic sent to the first address may be defined as the logic circuitry package 400a not responding to communications directed to the first address (or any address other than a currently active second address as perceivable by the print apparatus logic circuit 304).

Causing the first logic circuit 402a to 'ignore' (or otherwise not respond to) I2C traffic sent to the first address for the duration of the time period for which the second address is activated or in use allows the first and second addresses to be entirely independent of one another. For example, the first address may be I2C compliant whereas a second address may be of any format, including in some examples a non-I2C compliant format. In addition, if the first address is effectively disabled for the duration of the time period, consideration need not be made as to any response to a command which the package 400a may consider to be addressed to the first address. For example, the first address may be represented by a particular bit sequence and, if there is a possibility that the first address may be recognized when the package is not to be addressed using the first address, precautions may be taken such that this identifying bit sequence is avoided when the package is not to be addressed using the first address. The likelihood of this event could increase in the instance where communication is established via different temporary second addresses of respective different logic circuitry packages within a single time period over the same serial bus. If these situations are not managed correctly, indeterminate or unexpected behaviour may be seen. However, if the first address is effectively disabled during the time period, there need be no such consideration or precautions, and commands which could otherwise be inadvertently received and interpreted by the package 400a as having been received by the first address will not be received as the first address is effectively inactivated. The reverse may also be true (i.e. commands which may be inadvertently taken to be addressed to any second address will not be received by the package 400a outside the time period if that address is effectively disabled outside the time period).

In some examples, the first and the second addresses may be of different lengths. For example, the first address may be a 10-bit address and the second address may be a 7-bit address. In other examples, the first and second address may be of the same length, for example both comprising a 7-bit or 10-bit address. In certain examples the first and the default second address are hardwired, while the second address allows for reconfiguration to the temporary address, as explained above. In other examples the first and second address may be programmed.

In some examples, the first logic circuit 402a is to perform a task, which may be the task specified in the command received, for the duration of the time period. However, in other examples, for example to allow for increased compatibility, the first logic circuit 402a may not perform the specified task (for example, if it is unable to do so, or it is unnecessary to do so to keep the first logic circuit 402a 'busy', as described below).

In some examples, the first logic circuit 402a may in effect not respond to (i.e., ignore) requests sent to the first address as a result of performing a task, which may be a task specified in the first command. In some examples, the task may at least substantially consume the processing capacity of the first logic circuit 402a. For example, the task may comprise monitoring a timer in such a way that the processing capacity of the first logic circuit 402a is substantially dedicated to that task. In other examples, the processing capacity may be substantially dedicated to performing a computational task, such as an arithmetical task. In a simple example, the first logic circuit 402a may be tasked with calculating a value such as pi. This task may be, according to present understanding, unlimited in the sense that a processor could continue calculating pi to further decimal places for an infinite amount of time. Therefore, the performance of this task to completion exceeds any likely time period specified in the first command. For example, such time periods may be, in some examples, in the order of seconds or tens of seconds. If the first logic circuit is dedicated to the task of calculating pi/monitoring a timer until the time period has passed, it may not also be monitoring traffic sent thereto via a communications bus or the like. Therefore, even if the communications were sent to the first address, these would be ignored. It may be noted that certain I2C slave devices will generally ignore a bus while performing any kind of processing. However, the processing specified herein is associated with the time period. It is noted that, given that the logic circuit package is not responsive to communications to its first address for the time for which the second address is activated, in some examples, the (temporary) second address could be the same as the first address whereby the desired function corresponding to that second address may still be achieved. However, as explained before, in other examples, the second address is different to the first address.

It will be appreciated that the task of calculating pi is merely one example of a task which may generally exceed a time period specified in a first command. Other examples of computational tasks having a completion time which is likely to exceed the time period may be selected, for example based on the length of the time period under consideration. For example, if the time period is to last for no longer than 3 seconds, a processing task which will exceed 3 seconds in duration may be performed (and, in some examples, instructed in the first command). Moreover, in other examples, as noted above, the task may comprise monitoring a time period.

In other examples, the logic circuitry packages 400a may be configured to, in response to such a first command including the task and time period, not respond to communications directed to its first address, not necessarily by performing a processing task but effectively by being programmed not to respond.

In some examples, the package 400a is configured to provide a first set of responses, or to operate in a first mode, in response to instructions sent to the first address and to provide a second set of responses, or to operate in a second mode, in response to instructions sent to the second address. In other words, the address may trigger different functions provided by the package 400a. In some examples, at least one response of the first set of responses is output in response to commands sent to the first address and not in response to commands sent to the second address and at least one response of the second set of responses is output in response to commands sent to the second address and not in response to commands sent to the first address. In some examples, the first set of responses may be cryptographically authenticated (i.e. accompanied by a message authentication code generated using a base key, or otherwise cryptographically 'signed', and/or encrypted, see for example US patent publication No. 9619663) and the second set of responses is not cryptographically authenticated. In some examples, the second set of responses may relate to sensor data and the first set of responses may not relate to sensor data. In some examples, messages may be accompanied by a session key identifier. For example an identity of a logic circuit of the package 400a could be communicated in the first and the second set of responses, whereby it is cryptographically authenticated in the first set but not in the second set. This may allow the package 400a to provide two distinct functions. Data may be output from an output data buffer of the package 400a.

In some examples, the package 400a may be configured to participate in a first validation process using I2C communications sent to the first address, and to participate in a second validation process using communications sent to the second address. As noted above, the second address may be a reconfigurable address, and in some examples may be reconfigured after the first validation process has been carried out. In some examples, the first validation process may comprise an exchange of encrypted or authenticable messages, wherein the messages are encrypted and/or signed based on a base key stored in the package, which may be a secret key (or based on a secret base key) that corresponds to a secret key stored or held in the print apparatus. In some examples, the second validation process may comprise an integrity check, in which the package 400a may return requested data values such that a host apparatus can verify that these data values meet predetermined criteria.

In examples set out above, the addresses used to communicate with the circuitry package 400a have been described. Further communication may be directed to memory addresses to be used to request information associated with these memory addresses. The memory addresses may have a different configuration than the first and second address of the logic circuitry package 400a. For example, a host apparatus may request that a particular memory register is read out onto the bus by including the memory address in a read command. In other words, a host apparatus may have a knowledge and/or control of the arrangement of a memory. For example, there may be a plurality of memory registers and corresponding memory addresses associated with the second address. A particular register may be associated with a value, which may be static or reconfigurable. The host apparatus may request that the register be read out onto the bus by identifying that register using the memory address. In some examples, the registers may comprise any or any combination of address register(s), parameter register(s) (for example to store gain and/or offset parameters), sensor identification register(s) (which may store an indication of a type of sensor), sensor reading register(s) (which may store values read or determined using a sensor), sensor number register(s) (which may store a number or count of sensors), version identity register(s), memory register(s) to store a count of clock cycles, memory register(s) to store a value indicative of a read/write history of the logic circuitry, or other registers.

In some examples, the package 400a may be configured to respond to a data request (for example, a sensor data request) received from the print apparatus by returning a first response, then, following receipt of a calibration (e.g. conversion) parameter (and, in some examples a subsequent data request), return a second response which is different from the first response. In some examples, this functionality may be provided from a second logic circuit. In some examples, the received calibration parameter may be used to adjust the second response, or may otherwise be used in determining a second response which is different to the first response. In some examples the print apparatus logic circuit may send a new calibration parameter if the first response does not meet predetermined criteria (for example, is outside of a predetermined range), and the second response may need to be adjusted on this basis, by the package 400a. This may for example comprise part of a calibration routine, in which response data may need to be set to be within predetermined limits, for example so as to avoid 'range clipping', in which a data reading is capped at a high or a low end of a range when a parameter reaches a threshold, even though the parameter being measured may continue to change beyond the threshold. Such a routine may continue with responses being adjusted until a response and/or a set of responses which meets predetermined criteria is seen. Examples of calibration are discussed in greater detail below.

In some examples, the package 400a may be configured to receive a data request, determine whether the request is for data indicative of a print material level sensor or for data indicative of a pressurisation event, and to respond with a data response. In some examples, the data request may comprise a 'read' command in which the acquired data is read from a memory of the package 400a. In some examples, the data request may comprise at least two commands. For example, a first command may comprise a 'write' command, which triggers the acquisition of sensor data by the package 400a, and the acquired data is stored in a memory of the package 400a. In an example, the first command may provide information allowing a sensor type/sensor cell to be identified, and may trigger (in some examples on receipt of a specific "conversion" command, but in other examples in response to the first command) a sequence of events to carry out sensing, execute an A/D conversion to store the conversion value into a memory location, which may be predetermined (for example, comprising a sensor data register). The sensing may be carried out using parameters (e.g. electrical test parameters, heating parameters, timing of measurements, etc.) which may also be stored in a memory (in some examples, in separate memory registers), and/or may be provided with the command. The A/D conversion may be carried out using parameters which may also be stored in a memory (in some examples, in one or more memory register(s)). As discussed below in greater detail, the conversion parameters and/or the sensing parameters may be configured in a calibration operation. A second command may comprise a 'read' command in which the acquired data is read from a memory of the package 400a.

Characteristics of the data reading may be different for different types of sensor data requested. For example, the data response may comprise one or more values in a first range when the request is for data indicative of a print material level and may comprise one or more values in a second range when the request is for data indicative of a pressurisation event. In some examples, the values may comprise count values. In some examples, to obtain the response values in the respective first and second range, first operational parameters for the corresponding sensor type may have been (over)written to respective memory fields.

In some examples, a data response may comprise, in total, a first number of data readings when the request is for data of a print material level sensor and a second number of data readings when the request is for data indicative of a pressurisation event. Such a response may be provided over a series of data exchanges with processing circuitry of the print apparatus in which the package 400a is installed. For example, each data reading of the data response may be provided in response to a read request of a plurality of read requests received from logic circuitry of a print apparatus, and each read request may follow a write request from logic circuitry of a print apparatus, wherein receipt of the read request may trigger the acquisition of a data reading.

In some examples, the number of data readings returned for a particular sensor is less than the number of sensor cells or sensing elements of that sensor. This may allow a print apparatus in which the package 400a is installed to query an appropriate number of sensor cells without excessive bandwidth. For example, it may be that there are on the order of 100 or 150 sensor cells which form part of an ink level sensor in an ink cartridge. The print material level sensor in such an example may return 100 or 150 data readings (which may for example be requested one after another as outlined above). However, there may be on the order of 30 or 40 sensor cells which form part of a pressure sensor, for example comprising strain sensors or the like. Thus the pressure change sensor in such an example may return 30 or 40 data readings (which may for example be requested one after another). In some examples, a subset of the available sensor element or cells may be queried. For example, there may be around 100 or more sensor elements/cells of a particular sensor type, and only around 30 or the set may be queried and provide readings, for example to reduce sampling times. For example, it may be that, over the duration of a pressurisation event (or any other temporary or transitory state during which sensor readings are to be acquired), there may be time to query some, but not all, of the sensors/sensor cells.

In some examples, there may be additional data requests, such as any or any combination of print material temperature, an ambient temperature, a 'crack detection' sensor request, and the like.

Figure 4B:
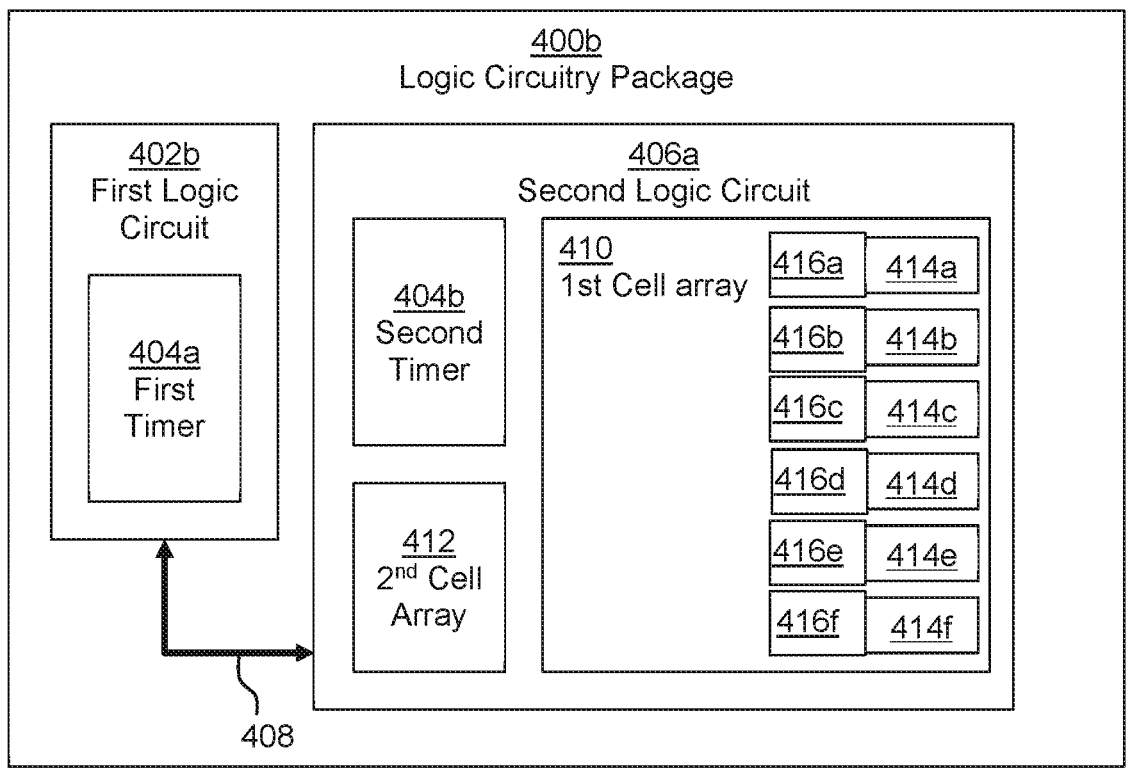

FIG. 4B shows another example of a logic circuitry package 400b. In this example, the package 400b comprises a first logic circuit 402b, in this example comprising a first timer 404a, and a second logic circuit 406a, in this example comprising a second timer 404b. While in this example, each of the first and second logic circuits 402b, 406a comprises its own timer 404, in other examples, they may share a timer, or reference at least one external timer. In a further example, the first logic circuit 402b and the second logic circuit 406a are linked by a dedicated signal path 408.

In one example, the logic circuitry package 400b may receive a first command comprising two data fields. A first data field is a one byte data field setting a requested mode of operation. For example, there may be a plurality of predefined modes, such as a first mode, in which the logic circuitry package 400b is to ignore data traffic sent to the first address (for example, while performing a task), and a second mode in which the logic circuitry package 400b is to ignore data traffic sent to the first address and to transmit an enable signal to the second logic circuit 406a, as is further set out below.

The first command may comprise additional fields, such as an address field and/or a request for acknowledgement.

The logic circuitry package 400b is configured to process the first command. If the first command cannot be complied with (for example, a command parameter is of an invalid length or value, or it is not possible to enable the second logic circuit 406a), the logic circuitry package 400b may generate an error code and output this to a communication link to be returned to host logic circuitry, for example in the print apparatus.

If however, the first command is validly received and can be complied with, the logic circuitry package 400b measures the duration of the time period included in the first command, for example utilising the timer 404a. In some examples, the timer 404a may comprise a digital "clock tree". In other examples, the timer 404a may comprise an RC circuit, a ring oscillator, or some other form of oscillator or timer. In this example, in response to receiving a valid first command, the first logic circuit 402b enables the second logic circuit 406a and effectively disables the first address, for example by tasking the first logic circuit 402b with a processing task as described above. In some examples, enabling the second logic circuit 406a comprises sending, by the first logic circuit 402b, an activation signal to the second logic circuit 406a. In other words, in this example, the logic circuitry package 400b is configured such that the second logic circuit 406a is selectively enabled by the first logic circuit 402b.

In this example, the second logic circuit 406a is enabled by the first logic circuit 402b sending a signal via a signal path 408, which may or may not be a dedicated signal path 408, that is, dedicated to enable the second logic circuit 406a. In one example, the first logic circuit 402b may have a dedicated contact pin or pad connected to the signal path 408, which links the first logic circuit 402b and the second logic circuit 406a. In a particular example, the dedicated contact pin or pad may be a General Purpose Input/Output (a GPIO) pin of the first logic circuit 402b. The contact pin/pad may serve as an enablement contact of the second logic circuit 406a.

The voltage of the signal path 408 may be driven to be high in order to enable the second logic circuit 406a. In some examples, such a signal may be present for substantially the duration of the first time period, for example, starting following receipt of the first command and may cease at the end of the first time period. As noted above, the enablement may be triggered by a data field in the command. In other examples, the second logic circuit may be selectively enabled/disabled, for example for the duration of the time period, in another way.

In some examples, such a contact pad or pin is provided in a manner so as to be generally inaccessible from the exterior of a replaceable print apparatus component. For example, it may be relatively distant from an interface and/or may be fully enclosed by a housing. This may be useful in ensuring that it is only triggered via the first logic circuit 402b.

In this example, the second logic circuit 406a is addressable via at least one second address. In some examples, when the second logic circuit 406a is activated or enabled, it may have an initial, or default, second address, which may be an I2C address or have some other address format. The second logic circuit 406a may receive instructions from a master or host logic circuitry to change the initial address to a temporary second address. In some examples, the temporary second address may be an address which is selected by the master or host logic circuitry. This may allow the second logic circuit 406a to be provided in one of a plurality of packages 400 on the same I2C bus which, at least initially, share the same initial second address. This shared, default, address may later be set to a specific temporary address by the print apparatus logic circuit, thereby allowing the plurality of packages to have different second addresses during their temporary use, facilitating communications to each individual package. At the same time, providing the same initial second address may have manufacturing or testing advantages.

In some examples, the second logic circuit 406a may comprise a memory. The memory may comprise a programmable address register to store the initial and/or temporary second address (in some examples in a volatile manner). In some examples, the second address may be set following, and/or by executing, an I2C write command. In some examples, the second address may be settable when the enablement signal is present or high, but not when it is absent or low. The second address may be set to a default address when an enablement signal is removed and/or on restoration of enablement of the second logic circuit 406*a*. For example, each time the enable signal over the signal path 408 is low, the second logic circuit 406*a*, or the relevant part(s) thereof, may be reset. The default address may be set when the second logic circuit 406*a*, or the relevant part(s) thereof, is switched out-of-reset. In some examples the default address is a 7-bit or 10-bit identification value. In some examples, the default address and the temporary second address may be written in turn to a single, common, address register.

In some examples, the address of the second logic circuit 406*a* may be rewritten at any time at which it is enabled. In some examples, when connected to the bus, the second logic circuit 406*a* may be in a low current state except when it is in an enabled state.

In some examples, the second logic circuit 406*a* may comprise a power-on reset (POR) device. This may comprise an electronic device which detects the power applied to the second logic circuit 406*a* and generates a reset impulse that goes to the entire second logic circuit 406*a* placing it into a known state. Such a POR device may be of particular utility in testing the package 400*b* prior to installation.

In some examples, a plurality of further logic circuits may be 'chained' together, with further pins (which may be GPIO pins) or the like. In some examples, once the second address has been written (i.e. the logic circuit has an address which is different to its default address), it may activate an 'out' pin or pad, and an 'in' pin or pad of the next logic circuit in the chain (if one exists) thereby be driven high and the logic circuit may be enabled. Such a further logic circuit(s) may function as described in relation to the second logic circuitry 406*a*. Such further logic circuits may have the same default address as the second logic circuit 406*a* in some examples. There is no absolute limit as to how many logic circuits can be serially chained and accessed in this way, however there may be a practical limitation in a given implementation based on the series resistance on the bus lines, the number of Slave IDs, and the like.

In one example, the first logic circuit 402*b* is configured to generate an enablement signal that may be an active low asynchronous reset signal. In some examples, when this signal is removed (or is driven to a logic 0), the second logic circuit 406*a* may immediately cease operations. For example, data transfers may immediately cease, and a default state (which may be a sleep state and/or a low current state) may be assumed by the second logic circuit 406*a*. In some examples, memories such as registers may revert to an initialised state (for example, a default address may comprise an initialised state of an address register).

In an example in which an I2C bus is used for communications with the package 400*b*, the first logic circuit 402*b* and the second logic circuit 406*a* may be connected to the same I2C bus. As noted above, an additional connection, for example provided between GPIO pins of the first logic circuit 402*b* and the second logic circuit 406*a* may be selectively enabled following receipt of a dedicated command. For example, the first logic circuit 402*b* may drive a dedicated GPIO pin to be high for a time period specified in a command (whereas by default the pin may be in a low state). For the duration of this time period, the first logic circuit 402*b* may not acknowledge ('NAK') any attempts to communicate using the first address. At the end of the specified time period, the dedicated contact pin may be returned to the 'low' state, and the first logic circuit 402*b* may be receptive to communications on the I2C bus sent to the first address once again. However, while the contact pin is driven to be high, the second logic circuit 406*a* may be enabled, and receptive to communications on the I2C bus.

It may be noted that, by sharing I2C contacts between the first logic circuit 402*b* and the second logic circuit 406*a*, electrical interconnect cost is small. Additionally, if the second logic circuit is selectively powered only for the duration of the time period, it may be less susceptible to electrochemical wear. In addition, this may allow multiple packages comprising respective first logic circuits 402*b* and second logic circuits 406*a* to be provided on the same serial I2C bus, where the second logic circuits 406*a* may (at least initially) share an address, which may in turn reduce manufacturing and deployment complexities.

In some examples, as outlined above, the logic circuitry package 400*b* comprises a first operational mode in which it responds to communication sent to the first address and not any second address and a second operational mode in which it responds to communications sent to a second address (e.g. the second address currently in use, and in some examples, currently stored in a dedicated register of the second logic circuit 406*a*) and not the first address.

In the example illustrated in FIG. 4*b*, the second logic circuit 406*a* comprises a first array 410 of cells and at least one second cell 412 or second array of second cells. The first cells 416 *a-f*, 414 *a-f* and the at least one second cell 412 can comprise resistors. The first cells 416 *a-f*, 414 *a-f* and the at least one second cell 412 can comprise sensors. In one example the first cell array 410 comprises a print material level sensor and the at least one second cell 412 comprises another sensor and/or other sensor array.

In this example, the first cell array 410 comprises a sensor configured to detect a print material level of a print supply, which may in some examples be a solid but in examples described herein is a liquid, for example, an ink or other liquid print agent. The first cell array 410 may comprise a series of temperature sensors (e.g. cells 414*a-f*) and a series of heating elements (e.g. cells 416*a-f*), for example similar in structure and function as compared to the level sensor arrays described in WO2017/074342, WO2017/184147, and WO2018/022038. In this example, the resistance of a resistor cell 414 is linked to its temperature. The heater cells 416 may be used to heat the sensor cells 414 directly or indirectly using a medium. The subsequent behaviour of the sensor cells 414 depends on the medium in which they are submerged, for example whether they are in liquid (or in some examples, encased in a solid medium) or in air. Those which are submerged in liquid/encased may generally heat more slowly and lose heat quicker than those which are in air because the liquid or solid may conduct heat away from the resistor cells 414 better than air. Therefore, a liquid level may be determined based on which of the resistor cells 414 are exposed to the air, and this may be determined based on a reading of their resistance following (at least the start of) a heat pulse provided by the associated heater cell 416.

In some examples each sensor cell 414 and heater cell 416 are stacked with one being directly on top of the other. The heat generated by each heater cell 416 may be substantially spatially contained within the heater element layout perimeter, so that heat delivery is substantially confined to the sensor cell 414 stacked directly above the heater cell 416. In some examples, each sensor cell 414 may be arranged between an associated heater cell 416 and the fluid/air interface.

In this example, the second cell array 412 comprises a plurality of different cells that may have a different function such as different sensing function(s). For example, the first and second cell array 410, 412 may include different resistor types. Different cells arrays 410, 412 for different functions may be provided in the second logic circuit 406a.

In one example, the second cell(s) 412 may comprise at least one sensor to detect a change in pressure and/or a pneumatic action applied by the print apparatus to a print component to which the package 400b is to be mounted. For example such at least one sensor to detect a change in pressure and/or pneumatic action may comprise strain sensing cell(s). In some examples, the strain sensing cells may comprise piezo-resistive cells. In one example, the strain sensing cells may be arranged across a surface of a chamber for containing print materials. For example, an ink cartridge may be pressurized in order to dispense ink in a predetermined manner. In order to test that such pressurization is correctly operational, a test may be carried out using strain gauges arranged across the surface of the chamber. This may comprise a 'hyperinflation' event, in which the cartridge is subjected to a pressure which is greater than that used in normal operation when dispensing ink and the like. In the event of a pressurization, it may be expected that the chamber will 'bulge out'. Thus strain sensors arranged across the surface may be expected to show a change in strain. Some examples of strain sensors are discussed in greater detail below.

The sensors 410, 412 may be read, and/or parameters thereof (and/or parameters of conversion apparatus associated therewith) may be calibrated. In some examples, calibration and/or reading of the sensors 410, 412 takes place when the second logic circuit 406a is enabled and/or following the setting of a temporary second address.

Figure 4C:
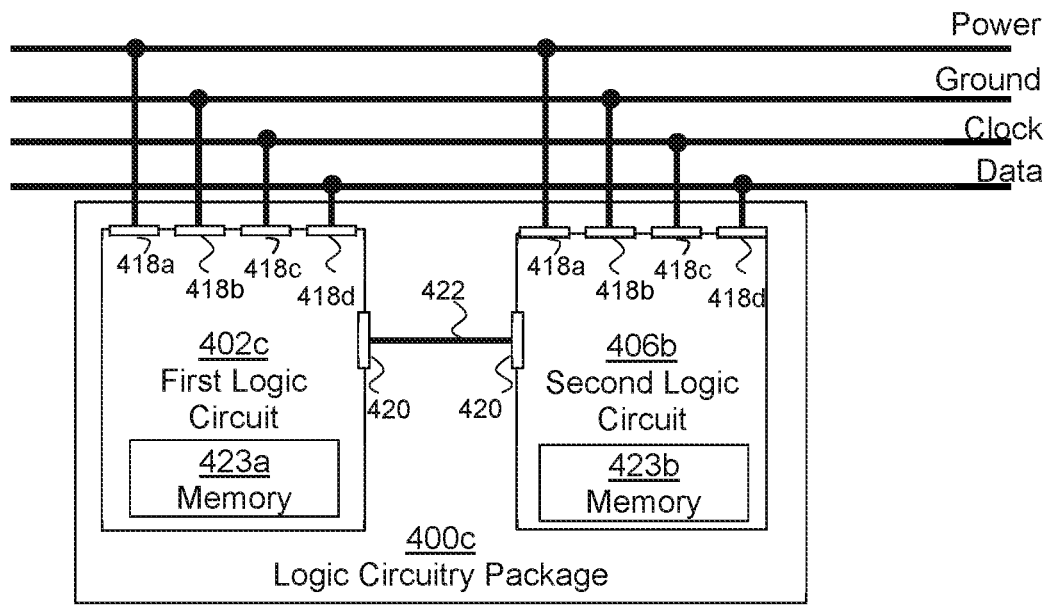

FIG. 4C shows an example of how a first logic circuit 402c and a second logic circuit 406b of a logic circuitry package 400c, which may have any of the attributes of the circuits/packages described above, may connect to an I2C bus and to each other. As is shown in the Figure, each of the circuits 402c, 406b has four pads (or pins) 418a-d connecting to the Power, Ground, Clock and Data lines of an I2C bus. In another example, four common connection pads are used to connect both logic circuits 402c, 406b to four corresponding connection pads of the print apparatus controller interface. It is noted that in some examples, instead of four connection pads, there may be fewer connection pads. For example, power may be harvested from the clock pad; an internal clock may be provided; or the package could be grounded through another ground circuit; so that, one or more of the pads may be omitted or made redundant. Hence, in different examples, the package could use only two or three interface pads and/or could include "dummy" pads.

Each of the circuits 402c, 406b has a contact pin 420, which are connected by a common signal line 422. The contact pin 420 of the second circuit serves as an enablement contact thereof.

In this example, each of the first logic circuit 402c and the second logic circuit 406b comprises a memory 423a, 423b.

The memory 423a of the first logic circuit 402c stores information comprising cryptographic values (for example, a cryptographic key and/or a seed value from which a key may be derived) and identification data and/or status data of the associated replaceable print apparatus component. In some examples the memory 423a may store data representing characteristics of the print material, for example any, any part, or any combination of its type, color, color map, recipe, batch number, age, et cetera.

The memory 423b of the second logic circuit 406b comprises a programmable address register to contain an initial address of the second logic circuit 406b when the second logic circuit 406b is first enabled and to subsequently contain a further (temporary) second address (in some examples in a volatile manner). The further, e.g. temporary, second address may be programmed into the second address register after the second logic circuit 406b is enabled, and may be effectively erased or replaced at the end of an enablement period. In some examples, the memory 423b may further comprise programmable registers to store any, or any combination of a read/write history data, cell (e.g. resistor or sensor) count data, Analogue to Digital converter data (ADC and/or DAC), and a clock count, in a volatile or non-volatile manner. Use of such data is described in greater detail below. Certain characteristics, such as cell count or ADC or DAC characteristics, could be derivable from the second logic circuit instead of being stored as separate data on the memory. Such registers may be addressable using memory addresses.

In one example, the memory 423b of the second logic circuit 406b stores any or any combination of an address, for example the second I2C address; an identification in the form of a revision ID; and the index number of the last cell (which may be the number of cells less one, as indices may start from 0), for example for each of different cell arrays or for multiple different cell arrays if they have the same number of cells.

In use of the second logic circuit 406b, in some operational states, the memory 423b of the second logic circuit 406 may store any or any combination of timer control data, which may enable a timer of the second circuit, and/or enable frequency dithering therein in the case of some timers such as ring oscillators; a dither control data value (to indicate a dither direction and/or value); and a timer sample test trigger value (to trigger a test of the timer by sampling the timer relative to clock cycles measurable by the second logic circuit 406b). In some examples, the memory 423b of the second logic circuit 406b may be configured to store calibration parameters associated with sensors, for example control parameters, calibration parameters, heating time or strength (power) parameters, gain parameters or the like. These parameters may be set to a default value at the beginning of a time period (for example a time period during which the second logic circuit 406b is enabled) and/or may be written and/or overwritten during the time period.

While the memories 423a, 423b are shown as separate memories here, they could be combined as a shared memory resource, or divided in some other way. The memories 423a, 423b may comprise a single or multiple memory devices, and may comprise any or any combination of volatile memory e.g. DRAM, SRAM, registers, etc. and non-volatile memory e.g. ROM, EEPROM, Flash, EPROM, memristor, etc.

While one package 400c is shown in FIG. 4C, there may be a plurality of packages with a similar or a different configuration attached to the bus.

Figure 4D:
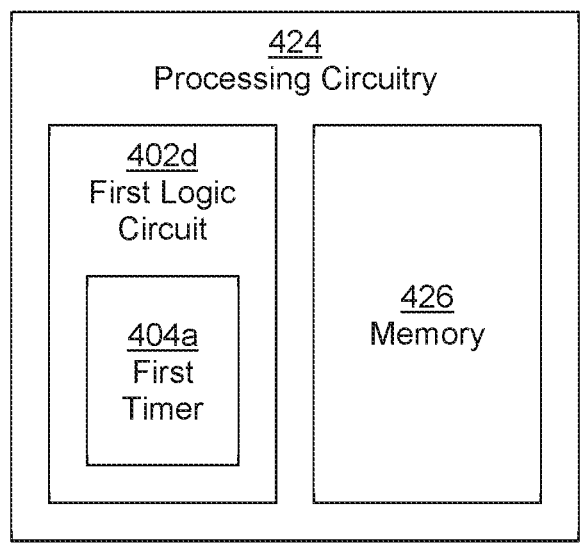

FIG. 4D shows an example of processing circuitry 424 which is for use with a print material container. For example, the processing circuitry 424 may be affixed or integral thereto. As already mentioned, the processing circuitry 424 may comprise any of the features of, or be the same as, any other logic circuitry package of this disclosure.

In this example, the processing circuitry 424 comprises a memory 426 and a first logic circuit 402d which enables a read operation from memory 426. The processing circuitry 424 is accessible via an interface bus of a print apparatus in which the print material container is installed and is associated with a first address and at least one second address. The bus may be an I2C bus. The first address may be an I2C address of the first logic circuit 402d. The first logic circuit 402d may have any of the attributes of the other examples circuits/packages described in this disclosure.

The first logic circuit 402d is adapted to participate in authentication of the print materials container by a print apparatus in which the container is installed. For example, this may comprise a cryptographic process such as any kind of cryptographically authenticated communication or message exchange, for example based on an encryption key stored in the memory 426, and which can be used in conjunction with information stored in the printer. In some examples, a printer may store a version of a key which is compatible with a number of different print material containers to provide the basis of a 'shared secret'. In some examples, authentication of a print material container may be carried out based on such a shared secret. In some examples, the first logic circuit 402d may participate in a message to derive a session key with the print apparatus and messages may be signed using a message authentication code based on such a session key. Examples of logic circuits configured to cryptographically authenticate messages in accordance with this paragraph are described in the earlier mentioned US patent publication No. 9619663.

In some examples, the memory 426 may store data comprising: identification data and read/write history data. In some examples, the memory 426 further comprises cell count data (e.g. sensor count data) and clock count data. Clock count data may indicate a clock speed of a first and/or second timer 404a, 404b (i.e. a timer associated with the first logic circuit or the second logic circuit). In some examples, at least a portion of the memory 426 is associated with functions of a second logic circuit, such as a second logic circuit 406a as described in relation to FIG. 4B above. In some examples, at least a portion of the data stored on the memory 426 is to be communicated in response to commands received via the second address. In some examples, the memory 426 comprises a programmable address register or memory field to store a second address of the processing circuitry (in some examples in a volatile manner). The first logic circuit 402d may enable read operation from the memory 426 and/or may perform processing tasks.

Other examples of first logic circuits 402 described herein may be adapted to participate in authentication processes in a similar manner.

The memory 426 may, for example, comprise data representing characteristics of the print material, for example any or any combination of its type, color, batch number, age, et cetera. The memory 426 may, for example, comprise data to be communicated in response to commands received via the first address. In some examples, the memory 426 may store parameters associated with reading and/or calibrating sensors, for example control parameters, conversion parameters or the like. The memory may comprise a non-volatile memory. The first logic circuit 402d to enable read operations from the memory 426 and perform processing tasks. In other words, in some examples, the memory 426 may functionally be associated with the first logic circuit 402d.

In some examples, the processing circuitry 424 is configured such that, following receipt of the first command indicative of a task and a first time period sent to the first logic circuit 402d via the first address, the processing circuitry 424 is accessible by at least one second address for a duration of the first time period. Alternatively or additionally, the processing circuitry 424 may be configured such that in response to a first command indicative of a task and a first time period sent to the first logic circuit 402d addressed using the first address, the processing circuitry 424 is to disregard (e.g. 'ignore' or 'not respond to') I2C traffic sent to the first address for substantially the duration of the time period as measured by a timer of the processing circuitry 424 (for example a timer 404a, b as described above). In some examples, the processing circuitry may additionally perform a task, which may be the task specified in the first command. The term 'disregard' or 'ignore' as used herein with respect to data sent on the bus may comprise any or any combination of not receiving (in some examples, not reading the data into a memory), not acting upon (for example, not following a command or instruction) and/or not responding (i.e. not providing an acknowledgement, and/or not responding with requested data).

The processing circuitry 424 may have any of the attributes of the logic circuitry packages 400 described herein. In particular, the processing circuitry 424 may further comprise a second logic circuit wherein the second logic circuit is accessible via the second address. In some examples the second logic circuit may comprise at least one sensor which is readable by a print apparatus in which the print material container is installed via the second address. In some examples, such a sensor may comprise any of a print materials level sensor, a strain sensor, a pressure sensor or the like.

The processing circuitry 424 may have a first validation function, triggered by messages sent to a first address on an I2C bus and a second validation function, triggered by messages sent to a second address on the I2C bus.

Figure 4E:
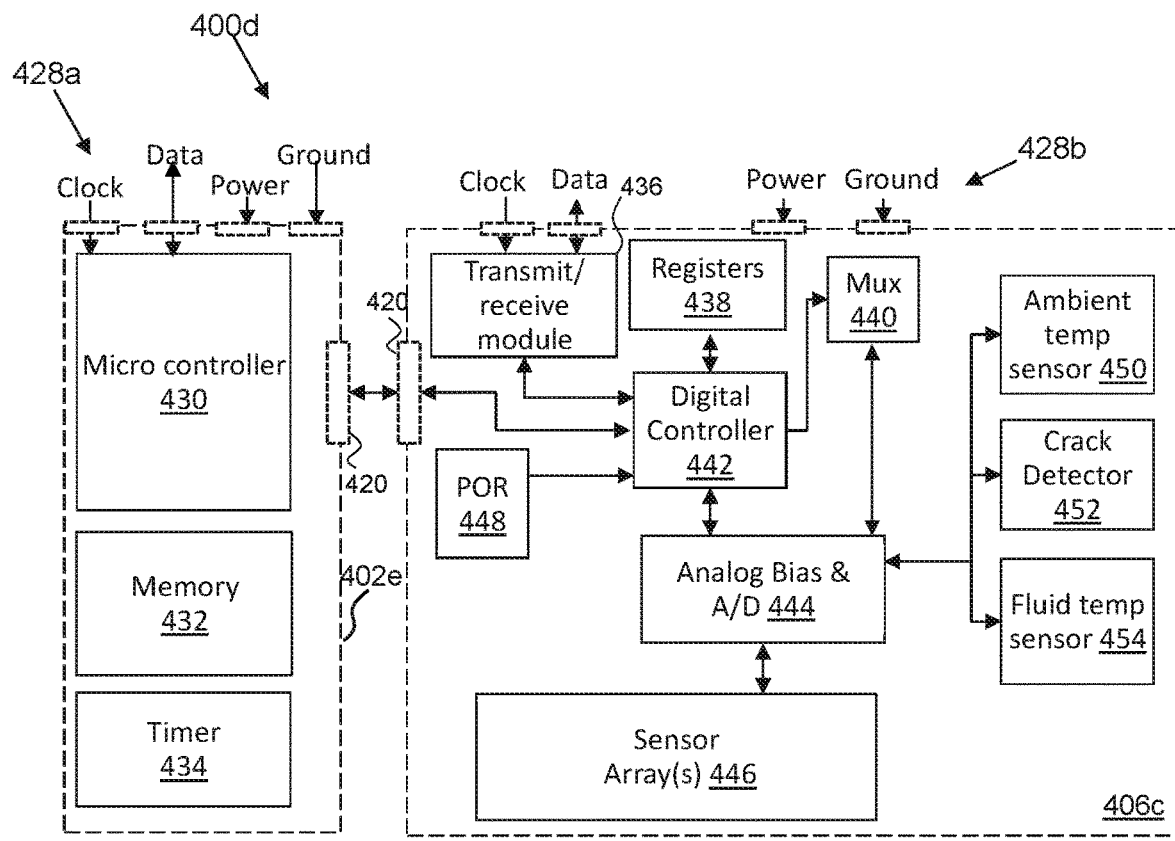

FIG. 4E shows another example of a first logic circuit 402e and second logic circuit 406c of a logic circuitry package 400d, which may have any of the attributes of the circuits/packages of the same names described herein, which may connect to an I2C bus via respective interfaces 428a, 428b and to each other. In one example the respective interfaces 428a, 428b are connected to the same contact pad array, with only one data pad for both logic circuits 402e, 406c, connected to the same serial I2C bus, see for example FIGS. 13A and 13B. In other words, in some examples, communications addressed to the first and the second address are received via the same data pad.

In this example, the first logic circuit 402e comprises a microcontroller 430, a memory 432 and a timer 434. The microcontroller 430 may be a secure microcontroller or customized integrated circuitry adapted to function as a microcontroller, secure or non-secure.

In this example, the second logic circuit 406c comprises a transmit/receive module 436 which receives a clock signal and a data signal from a bus to which the package 400d is connected, data registers 438, a multiplexer 440, a digital controller 442, an analogue bias and analogue to digital converter 444, at least one sensor or cell array 446 (which may in some examples comprise a level sensor with one or multiple arrays of resistor elements), and a power-on reset (POR) device 448. The POR device 448 may be used to allow operation of the second logic circuit 406c without use of a contact pin 420.

The analogue bias and analogue to digital converter 444 receives readings from the sensor array(s) 446 and from external sensors. For example, a current may be provided to a sensing resistor and the resultant voltage may be converted to a digital value. That digital value may be stored in a register and read out (i.e. transmitted as serial data bits, or as a 'bitstream') over the I2C bus. The analogue to digital converter 444 may utilise parameters, for example, gain and/or offset parameters, which may be stored in the registers 438. In some examples, the gain and/or offset parameter may be set or amended in a calibration operation. In some examples, the registers 438 may additionally store control parameters for the sensors 446, 450, 452 and 454. For example, these may specify heating powers and/or durations, electrical parameters such as voltage and/or currents, other time parameters such as the length of a test period and the like.

In this example, there are different additional single sensors, including for example at least one of an ambient temperature sensor 450, a crack detector 452 and/or a fluid temperature sensor 454. These may sense, respectively, an ambient temperature, a structural integrity of a die on which the logic circuitry is provided and a fluid temperature.

Figure 5:
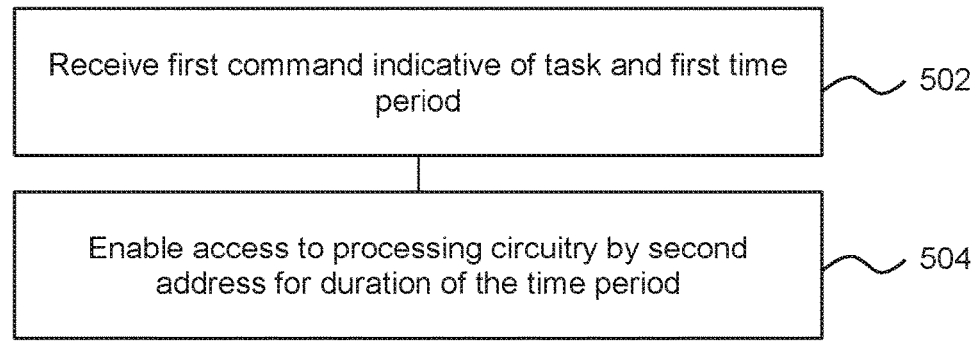
FIG. 5 is an example of a method which may be carried out by a logic circuitry package.

FIG. 5 shows an example of a method which may be carried out by processing circuitry, for example by a logic circuitry package such as the logic circuitry packages 400*a-d* described above, or by the processing circuitry 424 described in relation to FIG. 4D, and/or by processing circuitry provided on a replaceable print apparatus component, for example a consumable printing materials container.

Block 502 comprises receiving a first command indicative of a task and a first time period which is sent to a first address of processing circuitry. Block 504 comprises enabling, by the processing circuitry, access to the processing circuitry by at least one second address of the processing circuitry for the duration of the time period.

Figure 6:
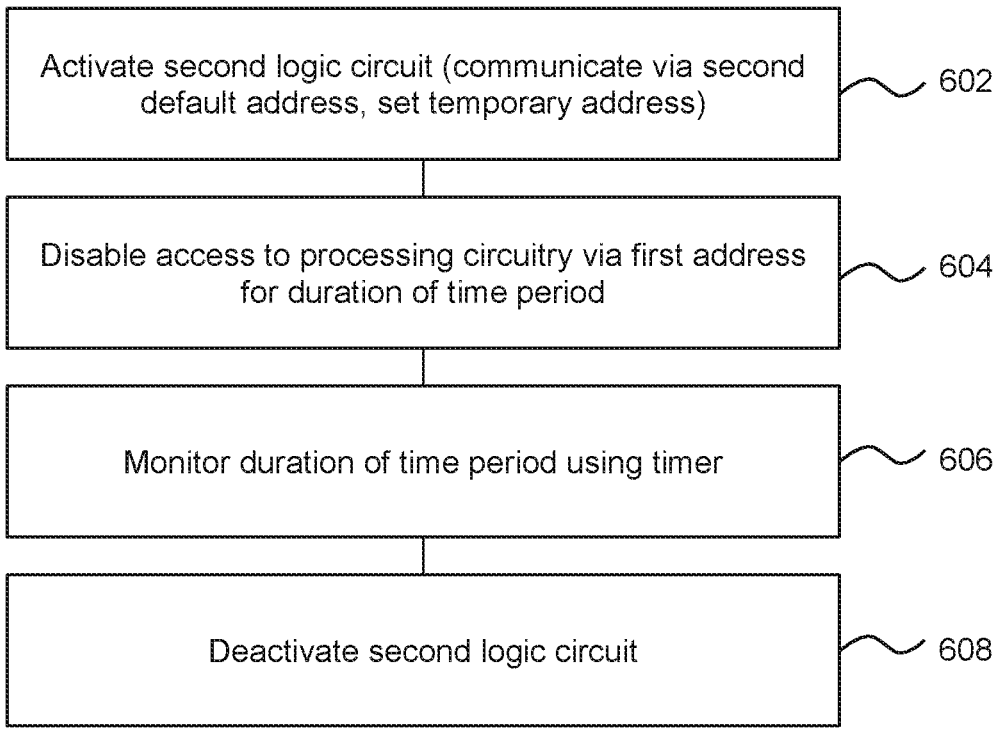
FIG. 6 is a further example of a method which may be carried out by a logic circuitry package.

FIG. 6 shows one example of the method of block 504 in greater detail. In this example, a first and second logic circuit are provided, each respectively associated with the first and at least one second address as described above with reference to FIG. 4B.

Block 602 comprises activating the second logic circuit. As described above, this may comprise a first logic circuit sending or transmitting an activation signal to a second logic circuit to activate the second logic circuit, for example via a dedicated signal path. In this example, activating the second logic circuit allows access to the processing circuitry using the at least one second address, for example using an initial or default second address. In some examples, following activation, the second logic circuit may be caused to set a new or temporary second address, for example to replace an initial or default address of the second logic circuit. In some examples, the temporary address may be set for the duration of a communication session.

Block 604 comprises disabling access to the processing circuitry via the first address (i.e. using communications addressed to the first address) for the duration of the time period by causing the first logic circuit to perform a processing task (in some examples, the processing task specified in the command received in block 502) for the duration of the time period. In other examples, the first address may be effectively disabled by preventing transmission of responses to messages sent to the first address. Block 606 comprises monitoring, by the processing circuitry, the duration of the time period using a timer of the processing circuitry. In some examples, monitoring the duration of the time period using the timer may itself comprise the processing task.

After the time period has expired, the method proceeds with block 608, which comprises deactivating the second logic circuit. For example, this may comprise removing an activation signal by the first logic circuit. Access to the processing circuitry via the second address may therefore be disabled after the duration of the time period. For example, the second logic circuit may be de-energized or placed in a sleep mode by the removal of the signal.

In examples where the end of a communication session is associated with a loss of power to at least part of the logic circuit, this loss of power may cause the second address to be discarded (for example, the second address may be held in volatile memory, whereas the initial or default address may be hardwired or held in persistent memory). After reset, the second address may again be set to the default or initial address before the beginning of a new session. In some examples, the initial or default address may be held in persistent memory and may be restored to a register of the second logic circuit when the second logic circuit is enabled. Therefore a 'new' second address may be set each time a communications session is started (although in some cases the 'new' second address may have previously been used in relation to the logic circuitry).

As set out in greater detail elsewhere herein, during the period of activation, the second logic circuit may provide services, for example cell or sensor readings or the like. However, in other examples, the second logic circuit may for example provide an output such as activating a light or sound (for example, the second logic circuit may control a light source or speaker or some other apparatus), may receive data (for example, may comprise a memory which is to store a data file), and/or may provide some other type of output or service.

Figure 7:
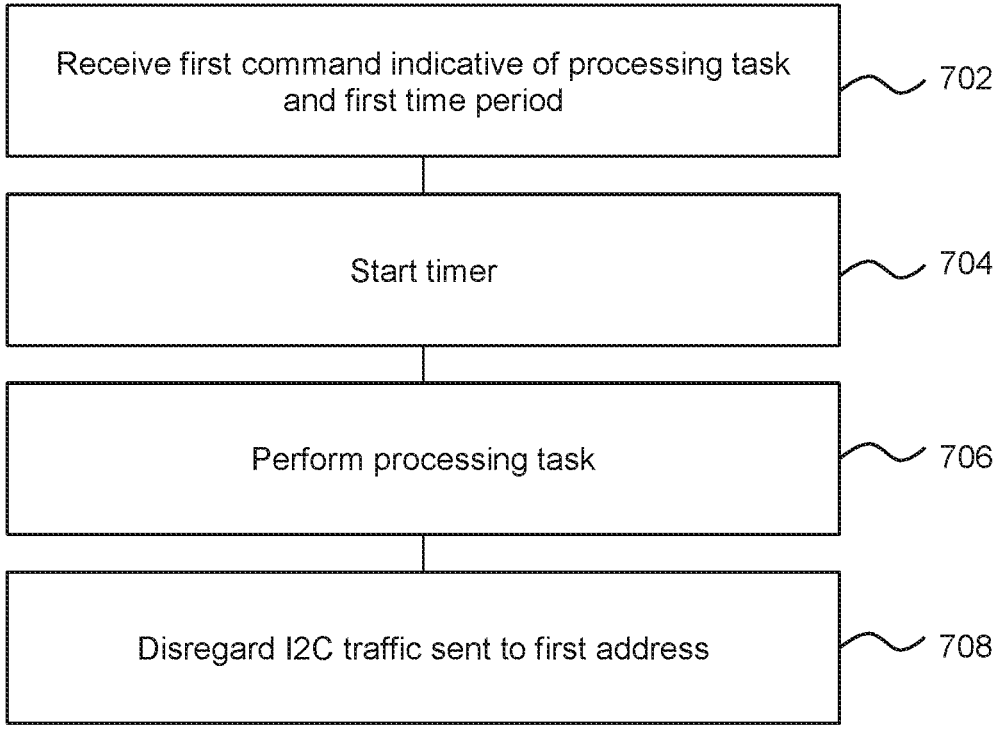
FIG. 7 shows an example of a method which may be carried out for example by processing circuitry.

FIG. 7 shows an example of a method which may be carried out for example by processing circuitry 424 or by a package 400*a-d* as described above. The method comprises, in block 702, receiving a first command indicative of a processing task and a first time period sent to a first address of processing circuitry via a communications bus, for example an I2C bus.

Block 704 comprises starting a timer of the processing circuitry. In other examples, a timer may be monitored rather than started. For example, an initial count of the timer may be recorded and an increase in the count may be monitored.

Block 706 comprises performing, by the processing circuitry, a processing task and block 708 comprises disregarding traffic sent to the first address. In some examples, disregarding the I2C traffic may be as a result of performing the task specified in the command, or another task. The task may comprise monitoring a timer. In other examples, the task may comprise a computational task, such as working to solve a mathematical challenge.

Block 708 may continue until the time period expires, as monitored using the timer.

The method may comprise any of the features described above in relation to a tasks and/or to disregarding (e.g. 'ignoring' or simply 'not responding to') traffic. The method may be carried out using processing circuitry which is associated with, or provided on, a printing material container and/or a replaceable print apparatus component.

In some examples, as described above, the method may comprise, for the duration of the time period, responding, by the processing circuitry, to I2C traffic sent to a second address of the processing circuitry. In some examples, the first address is associated with the first logic circuit of the processing circuitry and the second address is associated with the second logic circuit of the processing circuitry. In some examples, where first and second logic circuits are provided, the first logic circuit may perform the processing task and/or may send an activation signal to the second logic circuit, for example via a dedicated signal path, for the duration of the time period. In some examples, the second logic circuit may be deactivated by ceasing the activation signal.

Figure 8:
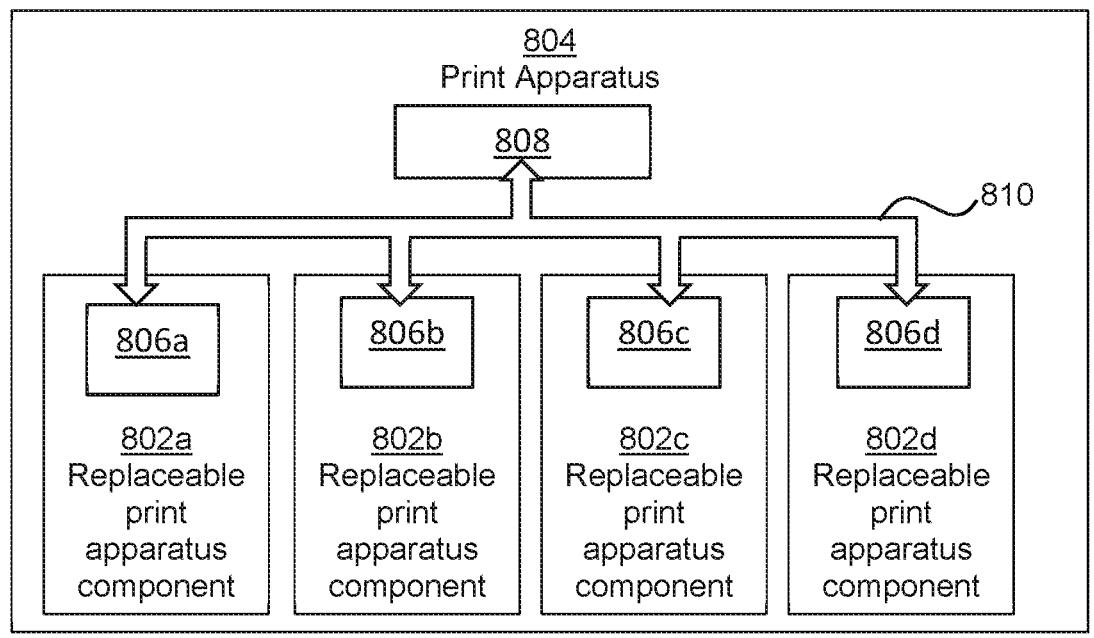
FIG. 8 shows an example arrangement of replaceable print apparatus components in a print apparatus.

FIG. 8 schematically shows an arrangement in which a plurality of replaceable print apparatus components 802a-d are provided in a print apparatus 804.

Each of the replaceable print apparatus components 802a-d is associated with a logic circuitry package 806a-d, which may be a logic circuitry package 400a-d as described above. The print apparatus 804 comprises host logic circuitry 808. The host logic circuitry 808 and the logic circuitry packages 806 are in communication via a common I2C bus 810. In one mode of operation, each of the logic circuitry packages 806 has a different first address. Therefore, each of the logic circuitry packages 806 (and by extension, each of the replaceable print apparatus components) may be addressed uniquely by the host print apparatus 804.

In an example, a first command may be sent to a particular one of the replaceable print apparatus component logic circuitry packages 806, i.e. being addressed using the unique first address for that logic circuitry package, instructing it to enable its (at least one) second address for a corresponding 'first command' time period. Therefore, that replaceable print apparatus component 802 may, for example, enable at least one second address and/or, in some examples, its associated functions. In some examples this results in enabling a second logic circuit as described above. For example, the addressed logic circuitry package 806 may ignore (e.g. not acknowledge and/or not respond to) I2C traffic sent to the first address of that logic circuitry package 806 for the duration of the first command time period, for example in response to the same command or a separate command. The other print apparatus components 802 may also be sent a second command resulting in them ignoring I2C traffic sent to their first addresses for the duration of a 'second command' time period. As noted above, when there are no other slave devices 'listening' to the I2C bus, restrictions as to the form and content of messages sent over the I2C bus may be reduced. Therefore, in this way, all of the first addresses may be effectively disabled whilst only one second address is in communication with the I2C bus 810. In other examples, more than one packages may be addressable by respective different addresses at the same time. In some examples, a first command may also result in an addressed component/package ignoring I2C traffic sent to their first addresses for the duration of the first command time period, and/or a second command may also result in an addressed component/package being accessible via at least one second address.

In some examples, the logic circuitry package(s) 806 may perform a processing task, which may be a processing task as specified in a command, so as to 'keep busy' and ignore I2C traffic sent to the first address for the duration of the specified time period. As noted above, this may comprise a computing task or a monitoring task, for example monitoring a timer.

Thus, the logic circuitry packages 806 may be configured to have a first response to a first command, which results in a second address of that package being enabled for the duration of the first command time period, and a second response to a second command, which results in the package ignoring I2C traffic sent to the first address (for example by performing a processing task such as monitoring a timer and/or carrying out a computational task which absorbs processing capacity) for the duration of the second command time period. In other words, each of the logic circuitry packages 806 may be enabled to carry out either of the methods of FIGS. 5 and/or 7, depending on the nature of the command received.

In some examples, logic circuitry packages 806 may be configured to respond to one or a series of sensor read requests by providing corresponding count values within a range of count values. In some examples, this may comprise responding to a first sensor read request by providing a count value within a first sub-range of the range of count values and responding to a second sensor read request by providing a count value within a second sub-range of the range of count values. In some examples, the logic circuitry packages 806 may be configured to respond to each read request of a set of first sensor read requests and to each read request of a set of second sensor read requests. The read requests may for example be sent from the print apparatus logic circuitry 808.

To consider a particular example, a host device such as a print apparatus 804 in this example wishing to communicate with a particular logic circuitry package 806 via its second address—in this example logic circuitry package 806a—may issue commands so as to instruct the other logic circuitry packages 806b-d to act in a manner which results in them ignoring traffic on the bus 810. This may comprise the logic circuitry 808 serially sending three commands addressed to a unique address of each of the other logic circuitry packages 806b-d, each command specifying a first mode of operation and a time period. The first mode of operation may result in traffic on the bus being ignored. Next, the logic circuitry 808 may send a dedicated command to the target logic circuitry package 806a via its first address, the command specifying a second mode of operation and a time period. The second mode of operation may comprise an instruction resulting in traffic on the bus 810 sent to a first address being ignored and enablement of a second address. The first command time period and the second command time period for which traffic is ignored by different logic circuit packets 806 may be specified to overlap with one another, in some examples bearing in the mind the delay with which instructions will be received.

The host logic circuitry may then communicate with the selected logic circuitry package 806a via its second address for the duration of the time period. During this time period, as in some examples no other devices are 'listening' to the I2C bus, any communication protocol (including in some examples a non-I2C compliant protocol) may be used for communicating with the selected logic circuitry package 806a via its second address.

Of course, this is only one example. In other examples, some or all packages may be accessible via a second address concurrently, or a mixture of first and second addresses of respective packages may be accessible.

Figure 9:
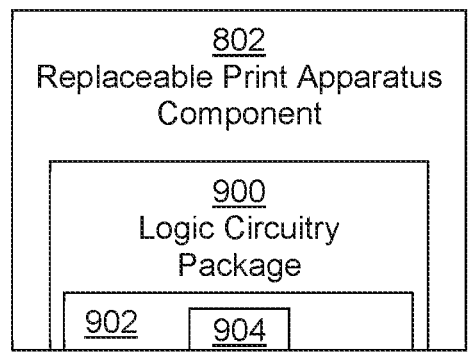
FIG. 9 shows an example of a replaceable print apparatus component.

FIG. 9 shows an example of a replaceable print apparatus component 802 which includes an I2C compatible logic circuitry package 900, which may comprise any of the attributes of the packages 400a-d or of the circuitry 424 described in relation to FIGS. 4A-E, and which may in some examples be configured to carry out any of the methods described herein. The package in this example comprises an I2C interface 902 including a data contact 904 to communicate via an I2C bus of a host printer.

The package in this example comprises a memory comprising data representing print liquid characteristics, and the data is retrievable and updatable via the data contact 904. The package 900 is configured to, in response to a read request received from a host apparatus via a first I2C address (i.e. the read request is addressed using the first address), transmit data including said data representing print liquid characteristics over the bus and via the data contact 904. Different replaceable print apparatus components 802 may be associated with memories which may store different print liquid characteristics.

The package 900 is further configured such that, in response to a command indicative of a task and a first time period received via the first address, the package transmits data for the duration of the time period over the same bus and data contact in response to (and in some examples, only in response to) received commands which are addressed to at least one second address, different than the first address, and after the end of the time period, again transmit data over the same bus and data contact in response to (and in some examples, only in response to) received commands which are addressed to the first address.

In some examples, the at least one different address includes a default second address and a further or temporary second address wherein the package 900 is configured to, in response to a received command which is addressed to the default second address, reconfigure the address to be the temporary second address and/or to respond to (and in some examples, only in response to) subsequent commands sent to the temporary second address until the end of the time period. Such responses may be sent over the same bus and the single data contact 904.

In some examples, the package 900 may be configured to respond to a data request (for example a sensor data request) received from the print apparatus by returning a first response, then, following receipt of a calibration parameter (and, in some examples, a subsequent data request), return a second response which is different from the first response. In some examples, this functionality may be provided from a second logic circuit. This may for example comprise part of a calibration routine as described in further detail elsewhere in this disclosure.

In some examples, the package 900 may be configured to receive a data request, determine whether the request is for data indicative of a print material level sensor or for data indicative of a pressurisation event, and to respond with a data response. In some examples, the data readings may be requested one after another for example to provide a first number of data readings when the requests are for data of a print material level sensor and a second number of data readings when the requests are for data indicative of a pressurisation event. In some examples, the data response may comprise one or more values in a first range when the request is for data of a print material level sensor and may comprise one or more values in a second range when the request is for data indicative of a pressurisation event. In some examples, the values may comprise count values.

In some examples, the data request may comprise at least two separate commands: a first command may effectively trigger the acquisition of data by a sensor, for example comprising a 'write' command, which may identify a sensor cell and/or sensor type. The sensor type may for example be a level sensor, ambient temperature sensor, fluid temperature sensor, pressure sensor, strain gauge, crack detector or the like. A second command may comprise a 'read' command, for example requesting that a memory register corresponding to a memory address provided in the read command is read out.

The replaceable print apparatus component 802 may be provided as one of a plurality of print apparatus components, the memories of which store different print material characteristics. The package of each of the plurality of replaceable print apparatus components may be configured to, in response to a command indicative of the task and the first time period received via respective first addresses, transmit data responses to received commands which are addressed to the same respective default addresses.

In some examples, the package 900 is configured to transmit, in response to indicated received commands which are addressed to the first address outside the time period, data that is authenticated, for example, cryptographically authenticated, for example using a secret key and accompanied by a message authentication code. During the time period, however, data which is not authenticated may be transmitted in response to received commands which are addressed to the at least one different address.

Figure 10:
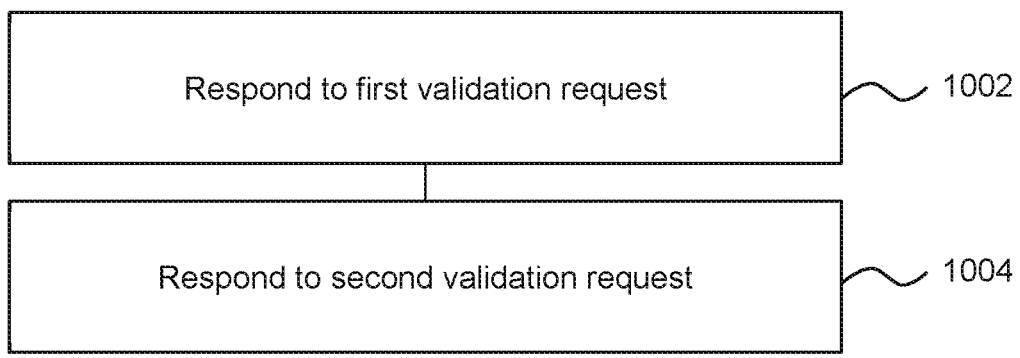
FIG. 10 is an example of a method of validating a print apparatus component.

FIG. 10 describes a method of validating a print apparatus component using logic circuitry associated therewith. In some examples, the logic circuitry may be a logic circuitry package 404*a-d*, 900 and/or processing apparatus 424 as described above.

For example, in validating a print apparatus component, it may be intended to verify that a print agent container originates from an authorized source, so as to ensure the quality thereof (for example, by performing an authentication thereof). In some examples, the validation process may include an integrity check to ensure that the replaceable print apparatus component and/or the logic circuitry associated therewith is functioning as expected. This may comprise requesting sensor information such that logic circuitry of a print apparatus component can check that this sensor data complies with expected parameters.

The method comprises, in block 1002, responding to a first validation request sent via an I2C bus to a first address associated with the logic circuitry with a first validation response. Block 1004 comprises responding to a second validation request sent via the I2C bus to a second address associated with the logic circuitry with a second validation response.

In some examples, the first validation response is a cryptographically authenticated response. For example, this may make use of a shared secret and/or use a cryptographic key. In some examples, the cryptographic response may comprise at least one 'signed' message, for example a message accompanied by a message authentication code, or may comprise an encrypted response. In some examples, the second validation response comprises an unencrypted response(s), or unsigned response(s). In some examples, most or all responses to validation requests sent to the first address are cryptographically signed using a key stored on the logic circuit, while no responses to validation requests sent to the second address are cryptographically signed. This may allow processing resources used to provide responses to commands sent to the second address to be reduced.

Figure 11:
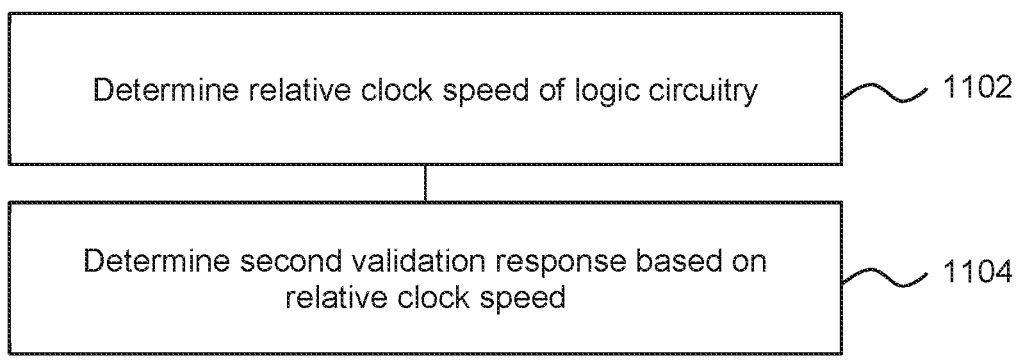
FIG. 11 is a further example of a method of validating a print apparatus component.

FIG. 11 describes one example of block 1004 in greater detail. In this example, the second validation request comprises a request for an indication of the clock speed of a timer of the logic circuitry (in some examples, a request for a clock speed of the second timer 404*b*, or more generally a timer associated with the second logic circuit). The method comprises, in block 1102, determining a clock speed of the logic circuitry relative to a frequency of another system clock or cycle signal measurable by the logic circuitry. Block 1104 comprises determining a second validation response based on the relative clock speed. This may, for example, allow a time period to be set by a host apparatus in the context of a timer provided with the logic circuitry. In some examples, the clock speed of a timer of the logic circuitry itself may be measured in order to determine the validation response. For example, the number of clock cycles of the timer within a predetermined number of other clock signals/measurable cycles may be determined, and, in some examples, an indication of the result may be provided as the validation response. In some examples, a clock speed may effectively be determined by comparing a known clock speed of a timer of the logic circuitry with the clock speed. In some examples, the validation response may comprise a selection of a value (e.g. a clock count) held in a memory indicating the clock speed of the logic circuitry relative to a system clock/measurable cycle. As has been noted above, in one example the response may be based on the clock speed of an internal timer of the second logic circuit, which may be a second timer in addition to a first timer of the first logic circuit.

To consider one example of such a method, the logic circuitry may comprise a number of registers. In one example, a register may record the number of outputs of a timer of a logic circuitry package (in some examples, a timer associated with a second logic circuit) over a set number of cycles detectable by the logic circuitry. For example, over 8 detectable cycles, there may be, say, 120 cycles recorded using the internal timer of the logic circuitry package. This may be recorded in one or more registers. In such example, the value "120" could be recorded on a register or memory, which may be read and verified by the print apparatus logic circuit, wherein verification may for example comprise comparing the value with an expected value. In one example, this relative clock speed value may be represented by the clock count that is mentioned in examples of this disclosure. In another example, the clock count can relate to an absolute clock speed. The clock speed can be measured and compared with a stored clock count. In this disclosure, the stored clock count may include any value representing the relative clock speed or clock count including a reference value or a range.

In some examples, a system clock may be set to take account of a speed of the timer. In some examples, a system clock may be driven by a ring oscillator of the second logic circuit as described above. The second logic circuit may comprise multiple timers such as both a SAR clock (for the analogue to digital converter) and a system clock.

Figure 12:
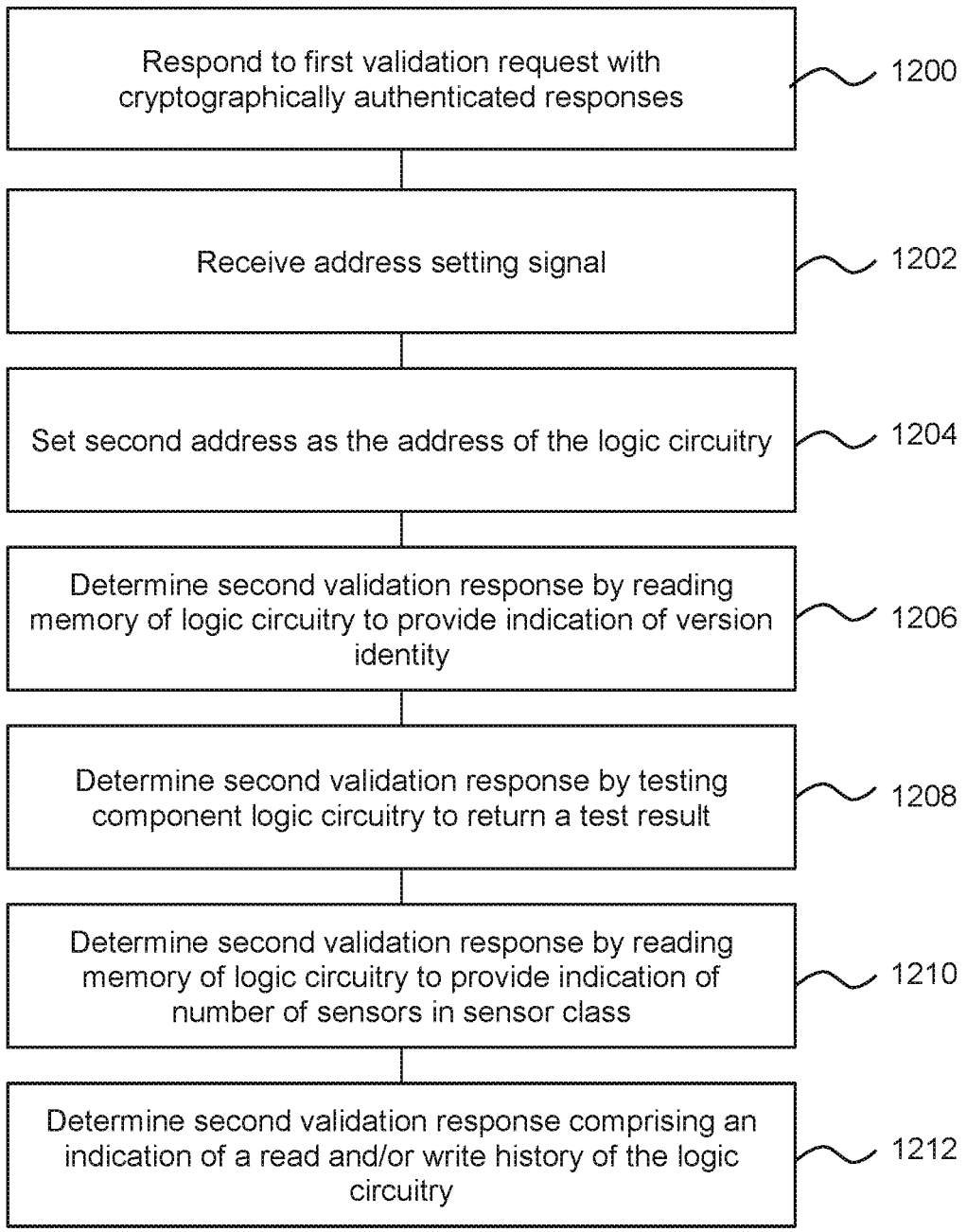
FIG. 12 shows another example of a method of validation.

FIG. 12 shows another example of a method of validation, which may be a method of validating a print apparatus component using logic circuitry associated therewith. In some examples, the logic circuitry may be a logic circuitry package 404a-d, 900 and/or processing apparatus 424 as described above.

In this example, the logic circuit package responds to a first validation request directed to its first address with cryptographically authenticated response(s) in block 1200. As part of the first validation, any or any combination of a version identity (i.e. revision ID) of (at least part of) the package; a number cells per type; a print material level; a clock count; a read/write history data and other identity and characteristics data related to the second address may be included. In some examples, identification data associated with a second logic circuit, such as the version identity as described above, may be stored in a first logic circuit. In some examples, the identification data may be stored in both the first and the second logic circuits. In some examples, after a second logic circuit has been enabled, as described above, the method comprises in block 1202, receiving an address setting signal, which is sent via the I2C bus to an initial second address associated with logic circuitry. In some examples, the address setting signal may be indicative of a temporary second address. For example host logic circuitry (e.g. logic circuitry of a print apparatus) may select and/or generate the temporary second address, and transmit this to the logic circuitry associated with the replaceable print apparatus component. In other examples, the temporary second address may be selected in some other way, for example based on data held in a memory of the logic circuitry. Block 1204 comprises setting the second address as the address of the logic circuitry. As noted above, in some examples, this may comprise replacing a default address with a temporary address which may be selected, in some examples, by a print apparatus.

In some examples, the temporary second address may be retained for the duration of a communication period, and then the address may revert to the initial address (which may therefore provide a default address). In some examples, the initial address is reinstated on the next occasion that the second logic circuit is enabled.

The method continues in block 1206 by determining the second validation response by reading a memory of logic circuitry to provide an indication of version identity. This may be an indication of the version of hardware, software and/or firmware used in the logic circuitry package, for example in a second logic circuit of the package. In some examples, this may be an indication of the version of at least one sensor which may be provided as part of the logic circuitry. The version identity (i.e. revision ID) of the second validation may match the version identity of the first validation.

For example, this may comprise providing one or more 'revision value', which may be the content of one or more registers. It may be the case that at least one, and in some examples, each, die and/or subcomponent of the logic circuitry is associated with a revision value which indicates the type or version of hardware, and may allow a master I2C circuit to provide more appropriate communications.

Assuming that the returned values meet predetermined criteria (for example, an expected number of revision values is returned and/or the revision value is recognised by a host print apparatus, or has a valid format or the like), the method continues in block 1208 by determining a further second validation response by testing at least one component of the logic circuitry to return a test result. While sensors may not be provided in association with all logic circuitry (and/or a test thereof may not be performed), in some examples, the second validation response may comprise an actual test of any provided sensors or cells involved in communications through the second address. For example, this may comprise a test to indicate that a cell and/or a resistor is responding as expected. For example, the test may include verifying the absolute or relative clock speed, for example by comparing the measured clock speed with a stored clock speed, as described above. In some examples an expected value for the clock speed may be determined based on the indication of version identity (e.g. the 'revision value'). For example, it may be determined that a particular version of hardware is expected to have a particular response value.

In some examples, the indication of version identity may be used to set parameters for a sensor or sensor cell reading. For example, a duration and/or power of a heat pulse, or an offset and/or a gain setting of an analogue to digital converter, may be set based on the indicated version identity. In other examples, calibration of parameters may also or alternatively take place.

In block 1210 the method comprises determining a further second validation response by reading a memory of logic circuitry to provide an indication of the number of cells or sensors in at least one sensor type. In some examples, the returned number of this second validation should match a sensor count provided in the first validation. For example, this may provide an indication of the number of resistors in a fluid level sensor. In some examples, there may be a plurality of values provided relating, for example, to different sensor types. This validation feature may allow a print apparatus to configure parameters for later reading of the sensors. In addition, if this value is not an expected value, which may be determined by matching values provided in the first and second validations, it may result in the logic circuitry failing a validation test. In some examples the expected value may be determined based on the second validation response. For example, it may be determined that a particular version of hardware is expected to have a particular number of sensors.

In this example, a read and/or write status of at least part of the logic circuitry, (in some examples, the read/write history of a second logic circuit) is recorded in a memory thereof on an ongoing basis, for example between actions associated with each block of FIG. 12. In particular, in this example, a plurality of indications of a read/write status is stored in a memory, each being determined using a different predetermined algorithmic function. Such algorithmic functions (which may be secret algorithmic function(s), or based on secret data, wherein the solution is also derivable based on a secret known by the print apparatus in which the replaceable print apparatus component is to be arranged) may be applied such that different read/write actions result in a different value being stored. The algorithmic function may include scrambling, e.g. signing the read/write history value, which may be executed by hardwiring or written instructions on the logic circuitry package. In some examples, the content of the read and/or write may be considered by the algorithm such that the same number of read/write operations may result in a different value being associated with the history if the content of the read/write operations differ. In some examples, the order of read/write operations may also impact the value stored. The algorithm could be stored or hardwired in the logic circuitry package, for example in the second logic circuit. In some examples, the read/write history status value can be used for data communication error checking. In some examples, the logic circuitry package is configured to update the read/write history after read/write events. For example, the second logic circuit may be configured, for example hardwired, to re-write the read/write history data portion after each respective read or write action on the second logic circuit, wherein the read/write history data portion may be re-written after or at each read or write cycle. The read/write history data portion may be updated after a read request from the print apparatus, a write request from the print apparatus, or both. For example, the updating may be based on an internal output buffer refresh, or it may be based on a received instruction of the print apparatus circuit. The second logic circuit may be hardwired to update the read/write history data portion based on actions of the second logic circuit. In an example, the logic circuitry package is configured to not update the read/write history when reconfiguring the second address to the temporary address. In an example, the logic circuitry package is configured to update the read/write history during the measured time period, after configuring the second address to the temporary address. In yet another example the print apparatus rewrites the read/write history data field.

In this example, therefore, the method further comprises storing a plurality of indications of the read/write history status of the logic circuitry and updating the stored indication with each read/write request of the logic circuitry.

In block 1212, the method comprises determining a further second validation response which comprises an indication of a read and/or write history of the logic circuitry. The response may be selected based on an indication provided in the request, such that an expected value, associated with a particular algorithmic function is selected and returned. The algorithmic function may be stored or hardwired in the logic circuitry package, for example the second logic circuit. The algorithmic functioning may include signing the read/write history data. Providing a number of different algorithmic functions may assist in increasing security of the validation process.

In one example, the logic circuitry comprises at least one register (e.g. read-only) that creates a value representing a signature, i.e. that allows for decoding and checking by a print apparatus that stores the data to decode the signature. A value indicative of the read/write history may be stored therein and may be updated when operations (reads/writes) occur within the logic circuitry, and therefore provides an indication of a read and/or write history of the logic circuitry. It may not be the case that all actions result in the register being updated and there may be at least one register access event that does not result in the value being updated. The order of the read/writes may have an effect on the values. As the host apparatus may keep its own history of the reads and writes it requests of the logic circuitry, it can verify the value against its own record to determine if the read/writes are being performed and/or if the function to determine the value is operating as expected.

In this example, while such methods may be thought of as pseudo-cryptographic methods, as they may be based on a shared secret, the second validation response may be provided without a digital signature or message authentication code or session key or session key identifier, nor may it qualify as cryptographically authenticated communication, whereas the first validation response may be provided with a digital signature, message authentication code or session key and/or session key identifier and may qualify as cryptographically authenticated communication. In one example, the different validations may be associated with different logic circuits that can be integrated in the package in a relatively cost-efficient way without compromising system integrity.

In another example, a second validation response may comprise an indication of crack sensor data. In some examples, a crack sensor comprises a long 'wire' of a conductor (in one example, polysilicon) routed around the perimeter of a die providing the logic circuitry that can be electrically tested. The wire may be relatively fragile, so a crack in the die will likely result in a break in the conductor. For example an intact sensor may result in a read result of around 125-160 of a possible range of 0-255. If a read result is outside this range, it is an indication that mechanical damage has cracked the die and a validation check may fail.

In some examples, the methods of any of FIGS. 10 to 12 may be carried out in relation to replaceable print apparatus components in which sensors are likely to contact printing fluids. Such contact may mean that the sensors are liable to suffer damage and therefore verifying that the sensors are acting as intended may be particularly beneficial. However, the methods may also be carried out in relation to other types of replaceable print apparatus components.

In some examples if any validation response is not as expected (or, in some examples, if a response and/or an acknowledgement of a request is not received), a print apparatus may determine that a replaceable print apparatus component has failed a check, and, in some examples, may reject the replaceable print apparatus component. In some examples, at least one operation of the print apparatus may be prevented or altered as a result of a replaceable print apparatus component failing a check.

In some examples, the validation responses may be provided in time slices, with each test being carried out in a serial manner.

Figure 13A:
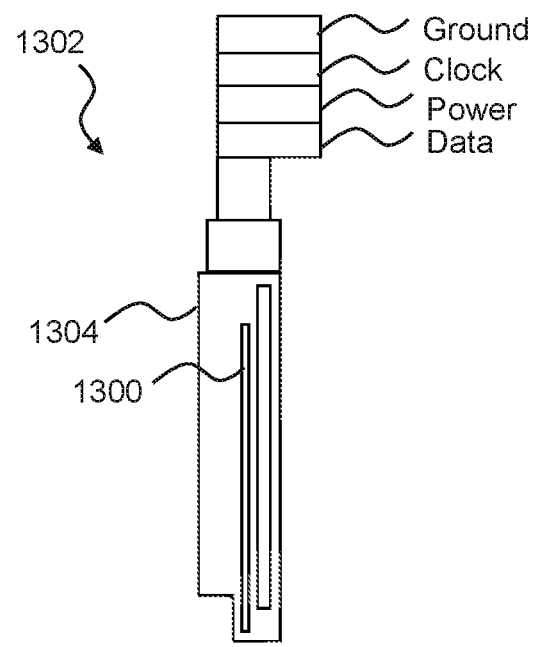
FIG. 13A shows an example arrangement of a fluid level sensor.

FIG. 13A shows an example of a possible practical arrangement of a second logic circuit embodied by a sensor assembly 1300 in association with a circuitry package 1302. The sensor assembly 1300 may comprise a thin film stack and include at least one sensor array such as a fluid level sensor array. The arrangement has a high length:width aspect ratio (e.g. as measured along a substrate surface), for example being around 0.2 mm in width, for example less than 1 mm, 0.5 mm or 0.3 mm, and around 20 mm in length, for example more than 10 mm, leading to length:width aspect ratios equal to or above approximately 20, 40, 60, 80 or 100:1. In an installed condition the length may be measured along the height. The logic circuit in this example may have a thickness of less than 1 mm, less than 0.5 mm or less than 0.3 mm, as measured between the bottom of the (e.g. silicon) substrate and the opposite outer surface. These dimensions mean that the individual cells or sensors are small. The sensor assembly 1300 may be provided on a relatively rigid carrier 1304, which in this example also carries Ground, Clock, Power and Data I2C bus contacts.

Figure 13B:
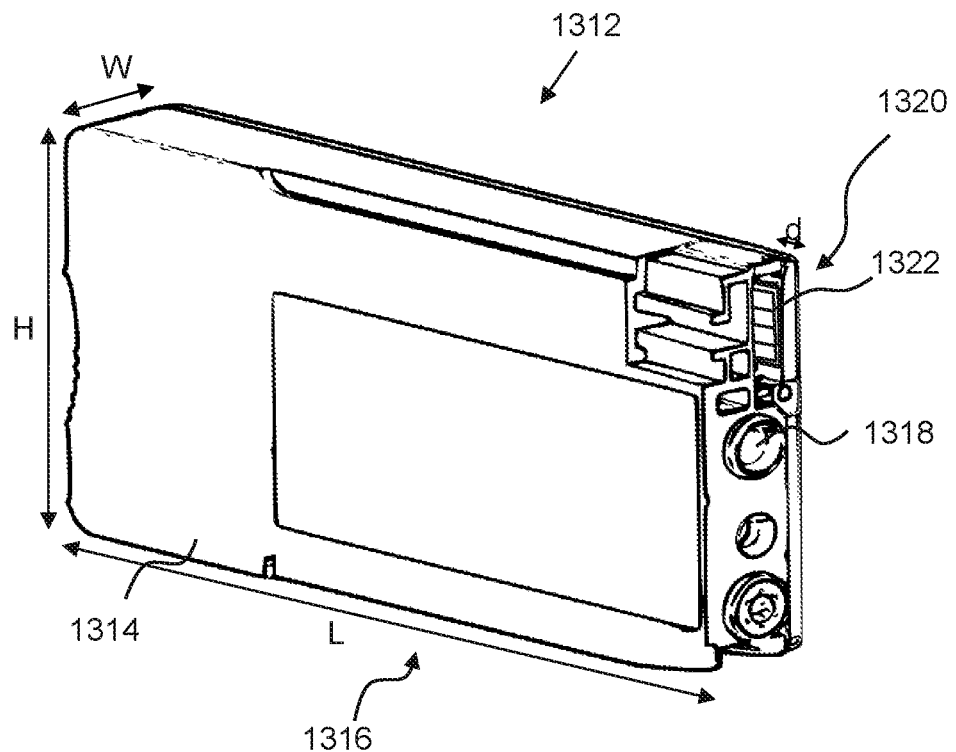
FIG. 13B shows an example of a perspective view of a print cartridge

FIG. 13B shows a perspective view of a print cartridge 1312. The print cartridge 1312 has a housing 1314 that has a width W less than its height H and that has a length L or depth that is greater than the height H. A print liquid output 1316 (in this example, a print agent outlet provided on the underside of the cartridge 1312), an air input 1318 and a recess 1320 are provided in a front face of the cartridge 1312. The recess 1320 extends across the top of the cartridge 1312 and I2C bus contacts (i.e. pads) 1322 of a logic circuitry package 1302 (for example, a logic circuitry package 400*a-d*, 900 as described above) are provided at a side of the recess 1320 against the inner wall of the side wall of the housing 1314 adjacent the top and front the housing 1314. In this example, the data contact is the lowest of the contacts 1322. In this example, the logic circuitry package 1302 is provided against the inner side of the side wall.

In some examples the logic circuitry package 1302 comprises a sensor assembly as shown in FIG. 13A.

It will be appreciated that placing logic circuitry within a print material cartridge may create challenges for the reliability of the cartridge due to the risks that electrical shorts or damage can occur to the logic circuitry during shipping and user handling, or over the life of the product.

A damaged sensor may provide inaccurate measurements, and result in inappropriate decisions by a print apparatus when evaluating the measurements. Therefore, a method as set out in relation to FIGS. 10 to 12 may be used to verify that communications with the logic circuitry based on a specific communication sequence provide expected results. This may validate the operational health of the logic circuitry.

In other examples, a replaceable print apparatus component includes a logic circuitry package of any of the examples described herein, wherein the component further comprises a volume of liquid. The component may have a height H that is greater than a width W and a length L that is greater than the height, the width extending between two sides. Interface pads of the package may be provided at the inner side of one of the sides facing a cut-out for a data interconnect to be inserted, the interface pads extending along a height direction near the top and front of the component, and the data pad being the bottom-most of the interface pads, the liquid and air interface of the component being provided at the front on the same vertical reference axis parallel to the height H direction wherein the vertical axis is parallel to and distanced from the axis that intersects the interface pads (I.e. the pads are partially inset from the edge by a distance d). The rest of the logic circuitry package may also be provided against the inner side.

In some examples, the print cartridge comprises a print material container comprising a validation circuitry package comprising a memory, a contact array for connecting with a I2C bus of a print apparatus, at least one timer, and circuitry to provide a first validation function, triggered by messages sent to a first address on an I2C bus; and a second validation function, triggered by messages sent to a second address on the I2C bus.

In pre-existing print apparatus components such as print cartridges, logic circuitry packages may consist of integrated circuits sometimes referred to as microcontrollers or secure microcontrollers. These integrated circuits are configured to store, communicate and update status and characteristics of corresponding print apparatus components, sometimes in a secure manner. Said status may include a level of print material, for example updated by the print apparatus after each print job and based on drop count and/or page count. Basing the status on drop count or page count implies an indirect way of measuring a remaining print material level because it may be based on, e.g., global print statistics rather than the contents of the individual print apparatus component. Consequently, the status or characteristics of a print apparatus component, as stored and reflected by its associated logic circuitry package could be wrong or not reliable.

This disclosure addresses first example logic circuitry packages adapted to enable connecting further sensor devices to a print apparatus component, or including those sensor devices. This disclosure also addresses other examples of logic circuitry packages that are configured to be compatible with a print apparatus logic circuit that is designed to be compatible with (e.g. read, write and/or command) the first example logic circuitry packages.

As said, different examples of this disclosure facilitate different sub-devices in a circuit package of a replaceable print component to communicate with a printer controller, for example in addition to, or instead of, the afore mentioned microcontroller-based integrated circuits alone, which are typically not configured to directly measure certain components' status.

In one example, the logic circuit package allows for a relatively secure and reliable communication while controlling costs and/or manufacturing. Certain examples of this disclosures facilitate adding capabilities to (partly) existing communication protocols in printers, such as the existing I2C busses that communicate with integrated circuits on the print apparatus components.

In one example, this disclosure explores inclusion of, for example, lab-on-chip type, cell arrays (e.g. as part of "second logic circuits") in print apparatus component logic circuitry packages, which in one example may be implemented in conjunction with existing print apparatus interface buses, for example in an effort to control costs and reliability. As explained earlier, examples of second logic circuits include thin, silicon-based, sensor arrays. In one example these sensors do not use established or standard digital data communication protocols such as I2C. Rather they may rely on custom analogue signal communications. Some of the examples of this disclosure involve the integration of such memory arrays in logic circuitry packages of print apparatus components.

Figure 14:
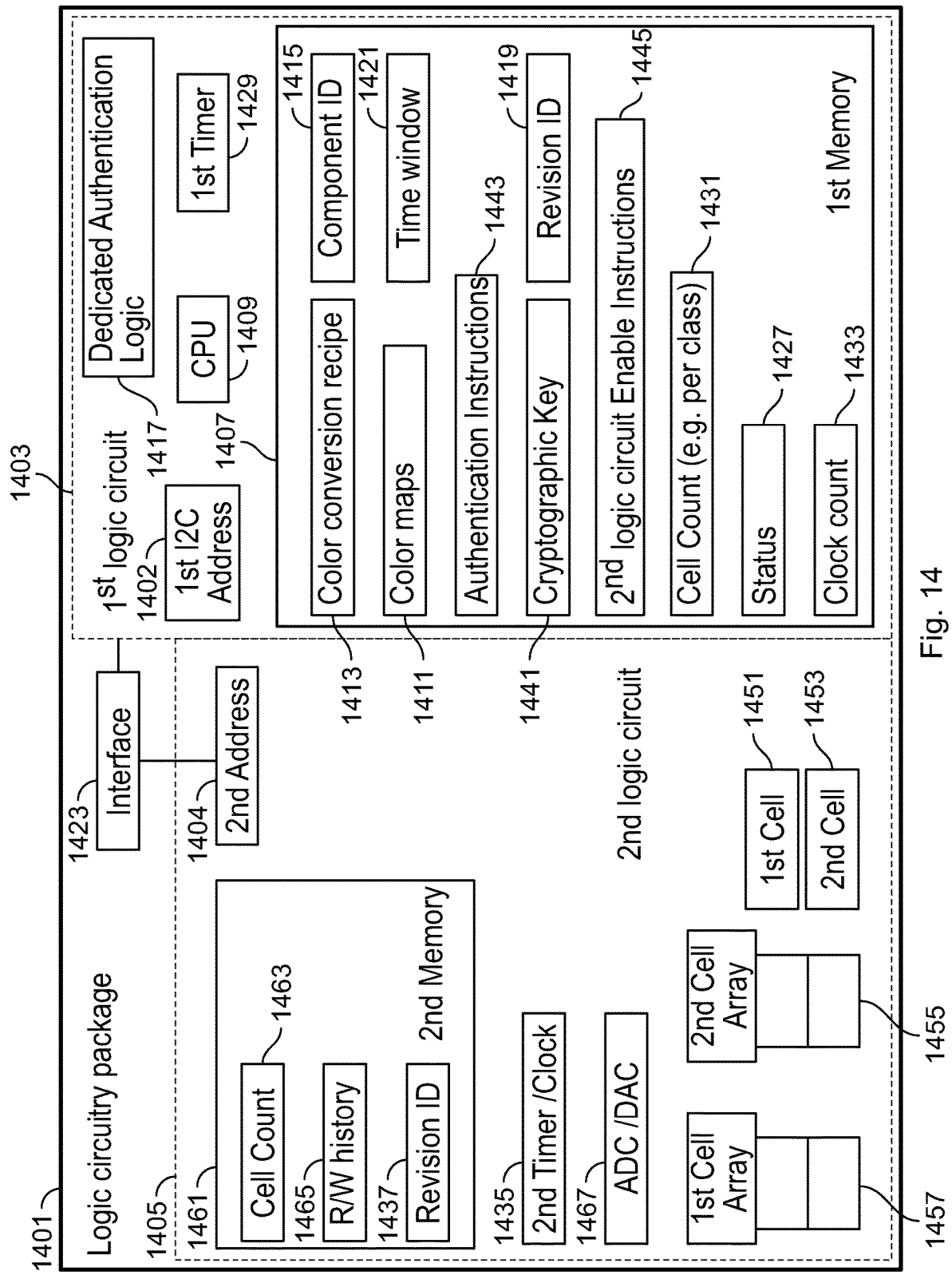
FIG. 14 shows an example of a logic circuitry package.

FIG. 14 represents different specific examples of a logic circuitry package including such sensor arrays.

FIG. 14 illustrates a logic circuitry package 1401 for a replaceable print component to interface with a print apparatus logic circuit through a single interface package and having a second logic circuit 1405 with cell or sensor arrays. The logic circuitry package 1401 may include a first logic circuit 1403 and a second logic circuit 1405, although the sub-features that will be described below could be provided in a single package without a clear distinction between first and second logic circuit 1403, 1405. In fact, the illustrated logic circuitry package 1401 may include some, not all, of the illustrated sub-components. The illustrated sub-components have been addressed in other examples of this disclosure. Some of the features are explained in relation to the first and second validations. For a better understanding of certain features of FIG. 14 reference is made to all the publications cited in this disclosure, all of which pertain to the present applicant.

The first logic circuit 1403 includes a first address (indicated by a block 1402), which may be a first I2C address, and which may be different than other packages of other components that are to be connected to the same host apparatus at the same time. The second logic circuit 1405 may include a second address (indicated by block 1404) which, at least before or at enabling the second logic circuit 1405, may be the same as other packages of other components that are to be connected to the same host apparatus at the same time. At or after enablement of the second logic circuit 1405 the second address may be reconfigured, for example to be different than other connected packages 1401.

The first logic circuit 1403 includes a memory 1407 and a CPU (central processing unit) 1409. The memory 1407 may include a signed and unsigned portion, for example depending on desired security of a particular data feature, as desired by an OEM and/or partly by available space of each signed or unsigned portion. The memory 1407 may store at least one of characteristics, status and identity data 1415, 1419/1437 associated with the replaceable print component. The characteristics may include colour, print material type, colour maps 1411, colour conversion recipes 1413, and other characteristics. The identity 1415 could include a product number, brand and/or any code to be associated with the identity of the replaceable print apparatus component, for example for association with a warranty of an OEM should that be necessary or for other reasons. In certain examples, the identity or identities 1419/1437, 1415 may intentionally be left blank, for example when a third party supplies other than the OEM the package 1401. The status may include data for association with a relative or absolute print material level 1427, for example based on at least one of page count, drop count and/or based on a status of cells 1451, 1453, 1457, 1455 of the second logic circuit 1403, 1405. The first logic circuit 1403 may further include a cryptographic key 1441 to cryptographically authenticate messages, which messages may include any of said status, characteristics and/or identity.

The logic circuitry package 1401 includes an interface 1423 to interconnect the package sub-components including the first and second logic circuit 1403, 1405 to the print apparatus interface bus, for example including three or four I2C compatible interconnect pads. The logic circuitry package 1401 may include separate, dedicated authentication logic 1417. The dedicated authentication logic may include its own dedicated processor separate from the CPU 1409, for example especially designed to perform a specific calculation cycle a high number of times within a short time window 1421. The time window 1421 may be stored in the memory 1407. The logic circuitry package 1401 may include a first timer 1429 to measure a timer period as indicated in a command, for example to execute a specific task such as enabling a second logic circuit. The first logic circuit 1403 may include, or be connected to, a signal path and/or switch to enable the second logic circuit 1405 and/or to determine a time from which the logic circuitry package 1401 is to respond to commands directed to the second, reconfigurable, address (indicated by a block 1404).

The memory 1407 may store characteristics related to the second logic circuit 1405. The memory 1407 may store a cell count 1431 for each of at least one class of cells 1451, 1453, 1457, 1455, to be associated with a number of cells of the respective class(es). The memory 1407 may store a clock count 1433 which may be associated with a relative or absolute clock speed of a second timer 1435. The memory 1407 may store a revision ID 1419 to be associated with a revision ID 1437 of the second logic circuit 1405.

Some of the previously mentioned data may be included as digitally signed data, such as, for example, at least one of the time window 1421, the revision ID 1419, the colour conversion recipe 1413, the colour maps 1411, the cell count 1433. In one example the cryptographic key 1441 is stored in separate, secure hardware memory which should be understood as being encompassed by the first memory 1407.

Furthermore, the memory 1407 may store at least one of instructions 1443 to cryptographically authenticate messages using the key 1441; instructions 1443 to provide an authenticated challenge response within the time window 1421; and instructions 1445 to enable/activate the second logic circuit 1405 based on a respective command including a timer period and/or a task, including measuring the time period for example with the first timer 1429; and other authentication or non-authentication instructions. The logic circuitry package 1401 may be configured such that communications in response to the commands directed to the first address can be cryptographically authenticated using the cryptographic key 1441, for example being accompanied by a message authentication code and/or session key identifier, while responses to commands directed to the second address may not be cryptographically authenticated using the key 1441, for example not being accompanied by a message authentication code and/or session key identifier.

The second logic circuit 1405 includes a number of cells 1451, 1453 or cell arrays 1455, 1457 of different classes, the numbers of which may correspond to the cell counts 1431, 1463. The illustrated example includes four different cell classes but there may be more or less classes of different cells. For example, of each class, the cells may have a similar resistance, size, material or other property. An array of cells may include at least 50 or at least 100 cells. The cells may be adapted to heat or to sense a certain property such as presence of print material adjacent the cell. The cells may include resistors with or without sensing or heating properties, or dummy cells to receive signals only without influencing a read or write action. Depending on the type of cells, at least one ADC and/or DAC 1467 may be used to convert signals between digital and analogue, for example to facilitate signal conversions via the interface 1423.

The second logic circuit 1405 may include a second timer 1435 which may determine an internal clock speed, which clock speed may correspond to the stored clock count 1433.

The second logic circuit 1405 may store a revision ID 1437, which may be associated with certain properties by the print apparatus. The print apparatus may compare the first and second revision ID stored on the respective first and second logic circuit 1403, 1405, as explained in relation to the first and second validation responses.

The second logic circuit 1405 may be configured to communicate, the at least one cell count 1463 pertaining to each respective class of cells, which may correspond to the cell count 1431 of the first logic circuit 1403. In another example the cells per class may be probed by the print apparatus logic circuit or the logic circuitry package when installed in the print apparatus. For example, a cell count of the second logic circuit 1405 may be determined by measuring a last sensor or last sensor property. The read or tested cell count may be compared to the cell count stored in the first logic circuit 1403.

The logic circuitry package 1401 may include a field or data portion 1465 storing a read/write history associated with read and write actions associated with the second address 1404, for example the temporary second address 1404. The logic circuitry package may be configured to update that field after each respective read/write session, using an algorithmic function that may be partly based on the contents of the read/write session and/or on other variables, which function may some form of bit scrambling.

The second logic circuit 1405 may include a second memory arrangement 1461 that stores at least one of these second logic circuit characteristics, such as the cell count 1463, R/W history 1465 and/or revision ID 1437.

As mentioned earlier in relation to a first and second validation, in one example, communications from the second logic circuit 1405 are not cryptographically authenticated using the same cryptographic key as communications from the first logic circuit 1403 and/or are not cryptographically authenticated at all. In one example the signal output of the second logic circuit 1405 may be hardwired to scramble its output signals which in turn may be decoded by the print apparatus logic circuit.

In certain examples, integrating relatively unexplored, sometimes relatively complex, sensor devices to print apparatus components could lead to unanticipated problems in the field. For example, the manufacturer may not be able to predict exactly how the innovation may work out after several years on the shelves in different climate conditions and then in a connected state during and between different printing conditions. In addition, unanticipated cost and manufacturing issues could arise. Also there may be a desire to provide an alternative component to connect to the same print apparatus for other reasons. To alleviate any of these potential challenges or other challenges, certain print apparatus components such as print service cartridges may not be equipped with sensor arrays. Accordingly, this disclosure also encompasses other example logic circuitry packages that are compatible with a host print apparatus logic circuit that was originally adapted to communicate to the second logic circuits with sensors, which host print apparatus may in certain instances already be operational at many different customer locations around the globe prior to designing these other compatible packages. These other compatible packages are adapted to not rely on the same second logic circuits with sensors to communicate with the original host print apparatus logic circuit. In these examples, certain physical hardware components such as sensor devices may, at least partly, be replaced by different virtual or hardwired components or data representative of the different properties or states depending on the received printer command, which may allow the print apparatus to accept these logic circuitry packages as including original sensor arrays. In addition to being operable, these compatible packages may need to pass certain integrity checks such as the mentioned first and second validations.

Figure 15:
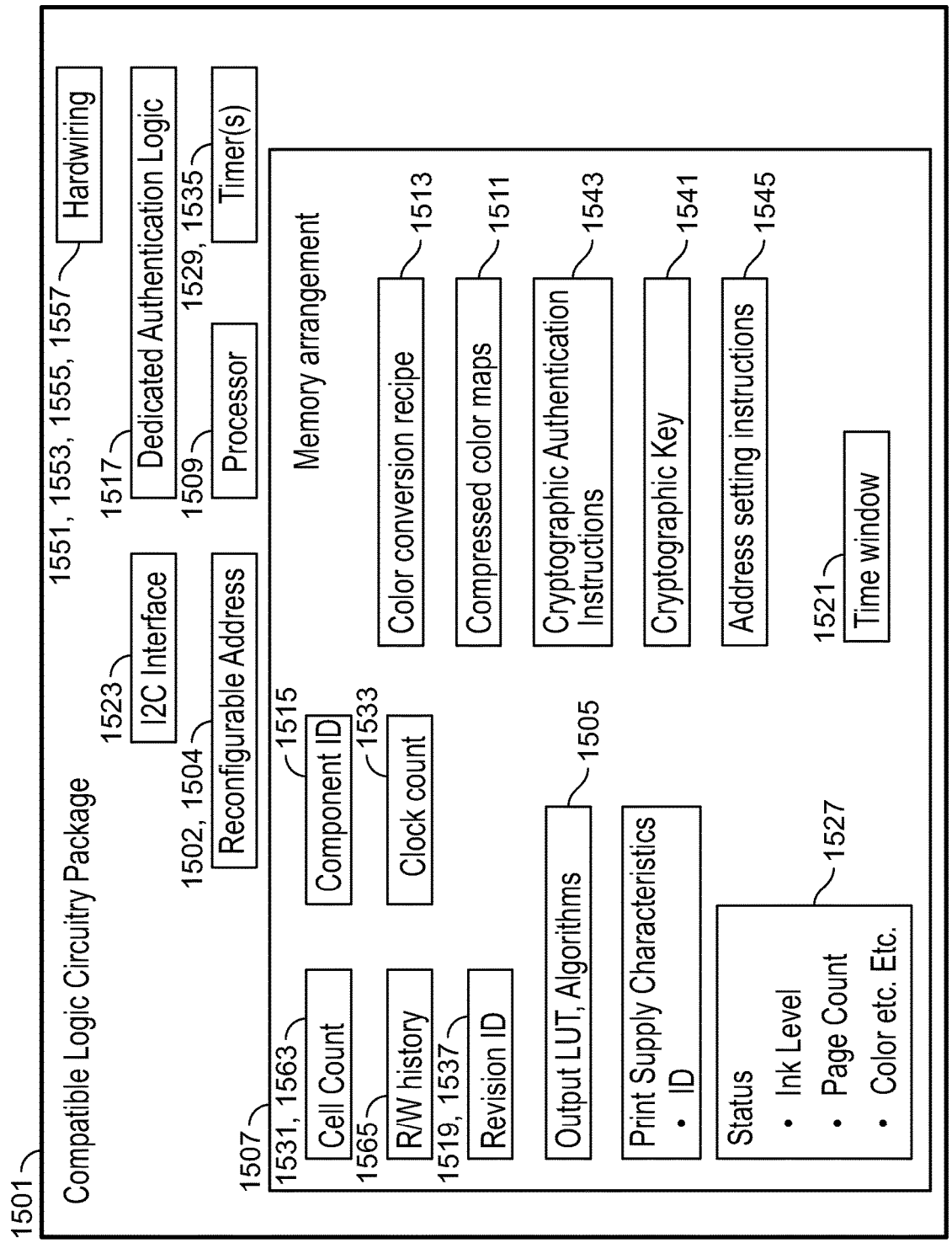
FIG. 15 shows a further example of a logic circuitry package.

In one example, these compatible packages can be relatively cheap or relatively easy to manufacture. In other examples, these compatible packages can be more reliable then the sensor-arrays logic circuitry package of this disclosure. In again other examples, these compatible packages provide for an alternative to sensor array-based second logic circuits. In again other examples, these compatible packages may facilitate testing or servicing the print apparatus or other components of the print apparatus. The compatible package may be designed to output similar responses to print apparatus logic circuit commands so that the print apparatus logic circuit accepts the responses, as if an original second logic circuit is installed. In certain examples, the compatible integrated circuits could be provided when the certain sensor-array based logic circuitry packages in the field fail to replace these failing integrated circuits; to save costs; because they are easier to manufacture; as an alternative; or for other reasons. FIG. 15 discloses an example of such other, compatible logic circuit package. Earlier mentioned examples also encompass such alternative package, such as for example FIG. 4B.

FIG. 15 illustrates a compatible logic circuitry package 1501 configured to have similar responses to respective print apparatus commands as the logic circuitry package 1401 of FIG. 14. The logic circuitry package 1501 includes an interface 1523 to connect to the print apparatus interface bus, for example including three or four I2C compatible interconnect pads. The first logic circuitry package 1501 includes a memory 1507 and a CPU (central processing unit) 1509. The package 1501 may store instructions 1545 to respond to corresponding commands directed to (i) a first address; and, at an enable command including a time period, (ii) an initial second address; and when receiving a reconfigured address, (iii) a reconfigured second address (as indicated by block 1502, 1504). The memory 1507 may store at least one of characteristics 1515, 1519, 1537, including identity data and a status 1527 associated with the replaceable print component.

This example package 1501 may include certain LUTs, algorithms 1505 and/or hardwiring 1551, 1553, 1555, 1557 configured to generate responses that the print apparatus logic circuit associated with these cells. In one example, the hardwiring of the logic circuitry package 1501 has similar properties as the cell arrays and cells of FIG. 14, to assist in generating compatible output signals or receiving input signals. In one example the hardwiring is to receive input signals and/or to mimic cells such as resistors and registers. In one example, the hardwiring may include a second timer or clock corresponding to a clock count 1533. In another example the second logic circuit of FIG. 14 may be replaced by a full virtual emulation, for example using said LUT and/or algorithm 1505, without additional hardwiring. The output LUT 1505 may be configured to associate certain received commands and signals with certain acceptable outputs, for example at least partly based on an updated status 1527. In addition to, or instead of, the output LUT 1505, algorithms may be provided to generate compatible outputs. Hence, the output LUTs, algorithms 1505, and the hardwiring 1551, 1553, 1555, 1557 may be configured to represent a sensor array 1451, 1453, 1455, 1457 or a complete second logic circuit 1405 (FIG. 14), which in this example of FIG. 15, is at least partly virtual and does not need to represent an actual status of the print component in the way the print apparatus would interpret this. Rather the LUT, algorithm 1505 and/or hardwiring 1551, 1553, 1555, 1557 may facilitate a working, compatible logic circuitry package 1501 to be able to print with the print apparatus.

The compatible package 1501 stores the revision ID 1519, 1537, for example in one field or in two fields, or is at least configured to provide it to the print apparatus based upon a corresponding read request. The revision ID 1519, 1537 is another ID that the print apparatus logic circuit may associate with the second logic circuit, which as explained in this example may not be present physically but may to some extent be represented virtually. Similarly, the package 1501 may store a cell count 1531, 1563, a clock count 1533 which may or may not be associated with a relative or absolute clock speed of the timer 1529, 1535. The logic circuitry package 1501 may be configured to store and/or output read/write history 1565 associated with commands to the reconfigured second address 1504. The revision ID, cell count, clock count and read/write history may be readably provided in response to read requests via the second address, for example the reconfigured second address, and in a further example may not be cryptographically authenticated using the cryptographic key 1541.

Certain features of this logic circuitry package 1501 may be similar to, or the same as, the first logic circuit 1403 of FIG. 14. For example, the characteristics may include colour, print material type, colour maps 1511, colour conversion recipes 1513, and other characteristics. The identity or identities 1515 could include a product number, brand and/or any code to be associated with the identity of the replaceable print apparatus component. The status 1527 may include data that the print apparatus associates with a print material level. The logic circuitry package 1501 may include a cryptographic key 1541 to cryptographically authenticate messages, which messages may include any of said status, characteristics and/or identity. The logic circuitry package 1501 may include separate, dedicated authentication logic 1517 and store a corresponding time window 1521. The logic circuitry package 1501 may include a first timer 1529, 1535 to measure a timer period as indicated in a respective command. In one example a single timer device 1529, 1535 could be used to represent the first and second timer.

Furthermore, the package 1501 may store at least one of instructions 1543 to cryptographically authenticate messages using the key 1541; instructions 1543 to provide an authenticated challenge response within the time window 1421; and instructions 1545 to set the address 1502, 1504 based on a respective command including a timer period and/or a task, including measuring the time period for example with the timer 1529, 1535; and other authentication or non-authentication instructions. The logic circuitry package 1401 may be configured such that communications in response to the commands directed to the first address are cryptographically authenticated using the cryptographic key 1541, for example being accompanied by a message authentication code and/or session key identifier, while responses to commands directed to the second address may not be cryptographically authenticated using the key 1541, for example not being accompanied by a message authentication code and/or session key identifier.

Some of the previously mentioned data portions may be stored as digitally signed data, such as, for example, at least one of the time window 1521, the revision ID 1519, 1537, the colour conversion recipe 1513, the colour maps 1511, the cell count 1533 and other data, to allow a printer to correspondingly decode/unsign the data.

In the examples of FIGS. 14 and 15 interface connection pads of the interface 1423, 1523 of the logic circuitry package 1401, 1501 may correspond to the interface contacts illustrated in FIGS. 13A and 13B. The example of FIG. 15 may be provided entirely or largely on the outside of the print apparatus component of FIG. 13B while the example of FIG. 14 may be provided partly or largely inside of the print apparatus component of FIG. 13B (e.g. against an inner wall of the print material reservoir), except for the interface connection pads.

Each of the logic circuitry packages 400a-d, 806a-d, 900, 1401, 1501 described herein may have any feature of any other logic circuitry packages 400a-d, 806a-d, 900, 1401, 1501 described herein or of the processing circuitry 424. The processing circuitry 424 described herein may have any feature of the logic circuitry packages 400a-d, 806a-d, 900, 1401, 1501. Any logic circuitry packages 400a-d, 806a-d, 900, 1401, 1501 or the processing circuitry 424 may be configured to carry out at least one method block of the methods described herein. Any first logic circuit may have any attribute of any second logic circuit, and vice versa.

Figure 16:
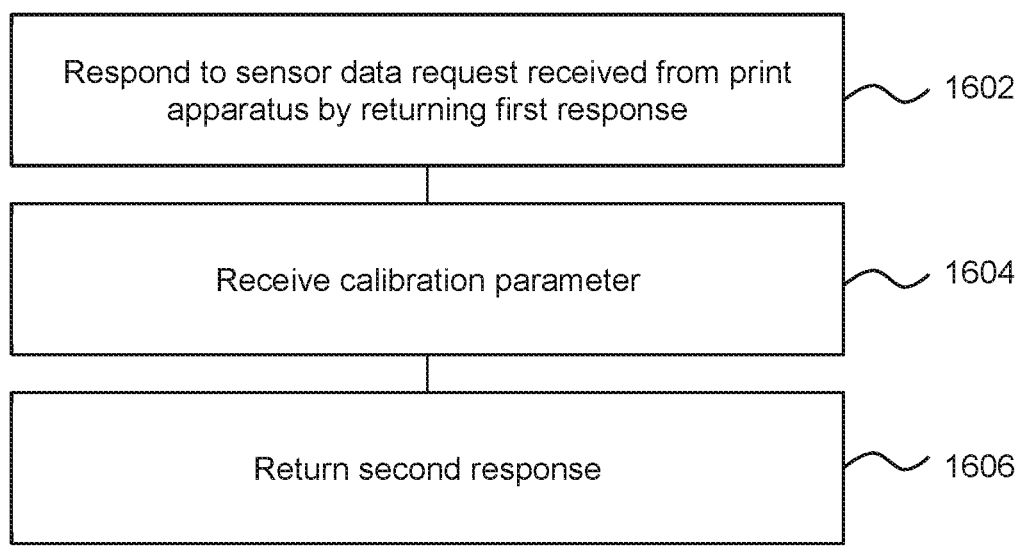
FIGS. 16 to 18 show example methods of calibrating sensors.

FIG. 16 is an example of a method, which may comprise a method of calibrating a response to a request for sensor data by a print apparatus. The method may be carried out by logic circuitry associated with a replaceable print apparatus component installed in a print apparatus. In some examples, such calibration may be used to prevent 'clipping' of sensor data. For example, as described above, in the case of a fluid level sensor, a reading may be lower when the sensor is submerged in liquid than when the sensor is exposed (see also FIG. 20C). Therefore, an initial calibration, which may be carried out when a printer cartridge is full, may provide a reading at the lower end of an expected range. In order to prevent a higher reading from being 'clipped', this lower reading may be calibrated so as to be within an anticipated range. As is further set out below, in some examples, this may comprise adjusting an offset and/or a gain parameter. For example, there may be an offset and/or gain associated with an analogue to digital conversion of the data and the offset and/or gain applied may be configurable. In a further example, calibration may be applied by adjusting the heat parameters such as power applied to heater cells (e.g., heater cells 416), heat time of heater cells, and/or selection of heater cells, in a heater array, wherein the heat parameters may also be considered calibration parameters.

Such parameters may be stored in a memory of a logic circuitry package. For example the offset and/or gain parameter may be stored in a memory register, and may be overwritten by a modified parameter. This could be used, for example in an analog bias stored in the analog to digital converter 444 shown in FIG. 4. Amplifiers in the analog bias block may receive the digital offset and/or gain setting stored in the digital register block, which sets how the amplifiers will behave. The modified offset and/or gain parameter may be selected based on information received from a host apparatus. In some examples, the offset and/or gain parameter may be configurable within a range.

For example, a gain parameter may be modified within a range of 1 to 64. A gain parameter of n has the effect of multiplying a measured value by n.

The offset parameter may be modified to comprise a value between 0 and 255, or a subrange thereof, for example between 50 and 100.

It may be noted that each step in the offset parameter will change the A/D output count by an amount that is a function of the gain parameter. Therefore, at high gain parameter settings, a small change in offset parameter value may move the output count value considerable (for example by hundreds of counts up or down) whereas at lower gain values, a larger range of offset parameter values must be used to have the same effect.

The method comprises, in block 1602, responding to a data request, in this example a sensor data request, received from the print apparatus by returning a first response. In some examples, the first response may comprise a sensor reading. In another example, the response may comprise data held in a memory of the replaceable print apparatus component. In some examples, the data request may be a request for data held in a memory of the replaceable print apparatus component (i.e. a memory read request). In some examples, the sensor data request may comprise at least two commands or request elements: a first command triggering data acquisition and a second command triggering transfer of the sensor data to the print apparatus For example, the sensor data request (or the first command thereof) may comprise a write request, which includes a sensor cell identifier. In some examples, a sensor type may be identified. For example, the sensor data request may specify that one of the level sensor, global temperature sensor resistor (TSR), strain gauge, crack detector or thermal diode sensor should be queried. In some examples, a specific sensor cell or set of sensor cells may be specified in such a write request. For example, the sensor data request may identify a specific sensor using an identifier such as an index/address or the like. In some examples, such identifying data may be written to one or more memory register(s), which may be a predetermined or dedicated register(s). The data may be read in response to a read request, which may in some examples identify the memory portion or memory register using the memory address.

Block 1604 comprises receiving a calibration parameter from the print apparatus. For example, calibration parameters may be used for each sensor conversion and/or read response. For example, processing circuitry of the print apparatus (e.g. controller 304 or logic circuitry 808) may determine that the result is outside of a predetermined range, and may send a new calibration parameter to be used in a subsequent sensor read operation in order to reach a point where a response is within the predetermined range. In some examples, the print apparatus processing circuitry may determine that the criteria (for example, whether the response is within a predetermined value range) is not met and may send a new calibration parameter intended to result in a value within that range. In some examples, the print apparatus processing circuitry may determine how the criteria is not met—for example, the print apparatus processing circuitry may determine that a value of the first response is clipped, too high, or too low, and/or an indication of the magnitude of the departure from the predetermined criteria.

For example, a determination that a reading is too high may be met with a first particular predetermined calibration parameter being sent (or a first particular adjustment being made to a previous calibration parameter), and an indication that a reading is too low may be met with a second particular predetermined calibration parameter being sent (or a second particular adjustment being made to a previous calibration parameter). The method of converging on an appropriate calibration parameter may be a linear adjustment, a binary adjustment (e.g. adjusting one bit of a value used in determining the output value), or some other modification to converge on a calibration parameter which results in a response accepted as meeting predetermined criteria. A binary adjustment may comprise altering one bit at a time, starting with the most significant. This may also be referred to as a binary search. For example, bits of the parameters may be changed in order from the most significant to the least significant, where a logic 1 may be changed to a logic 0 if a reading is indicated to be too low (but left unchanged if the received response is too high), and a logic 0 may be changed to a logic 1 if a received response is indicated to be too high (but left unchanged if the reading is too low). In other examples, if the received response is indicated to be too high, a new calibration parameter (for example, a new offset parameter) may be the previous calibration parameter, less half its value (wherein the previous calibration parameter is the calibration parameter which the print apparatus processing circuitry determines or assumes was used in determining the first response). If however the received response is indicated to be too low, a modified parameter may be the previous calibration parameter increased by half its value. In other examples, the parameter may be adjusted in other ways.

Block 1606 comprises returning a second response which is different from the first response. In some examples, the manner in which the first response and the second response are different may be deterministic, based on the new calibration parameter provided in block 1604. In some examples, the second response may be returned following receipt of a second sensor data request.

Performing a calibration step may allow for smaller sensors and/or greater variation in fabrication and operating conditions, as the variability this introduces can be countered by subsequent calibration. In some examples, such calibration may be performed after a replaceable print apparatus component is installed, which may reduce a requirement for non-volatile memory within processing circuitry associated therewith. Calibration could be carried out every time a print apparatus is switched on, when a new print apparatus component is installed, periodically in use of a print apparatus or at some other time.

The first response sent in block 1602 need not be the first response in a calibration sequence. Where data may be 'clipped', it may be the case that at least some successive responses return the same value (e.g. 0 or 255 in an 8 bit range), despite using different calibration parameters. However, in that case, a calibration sequence will likely continue until a value which is neither 0 nor 255 and thus a sequence of two responses will be different to one another.

Figure 17:
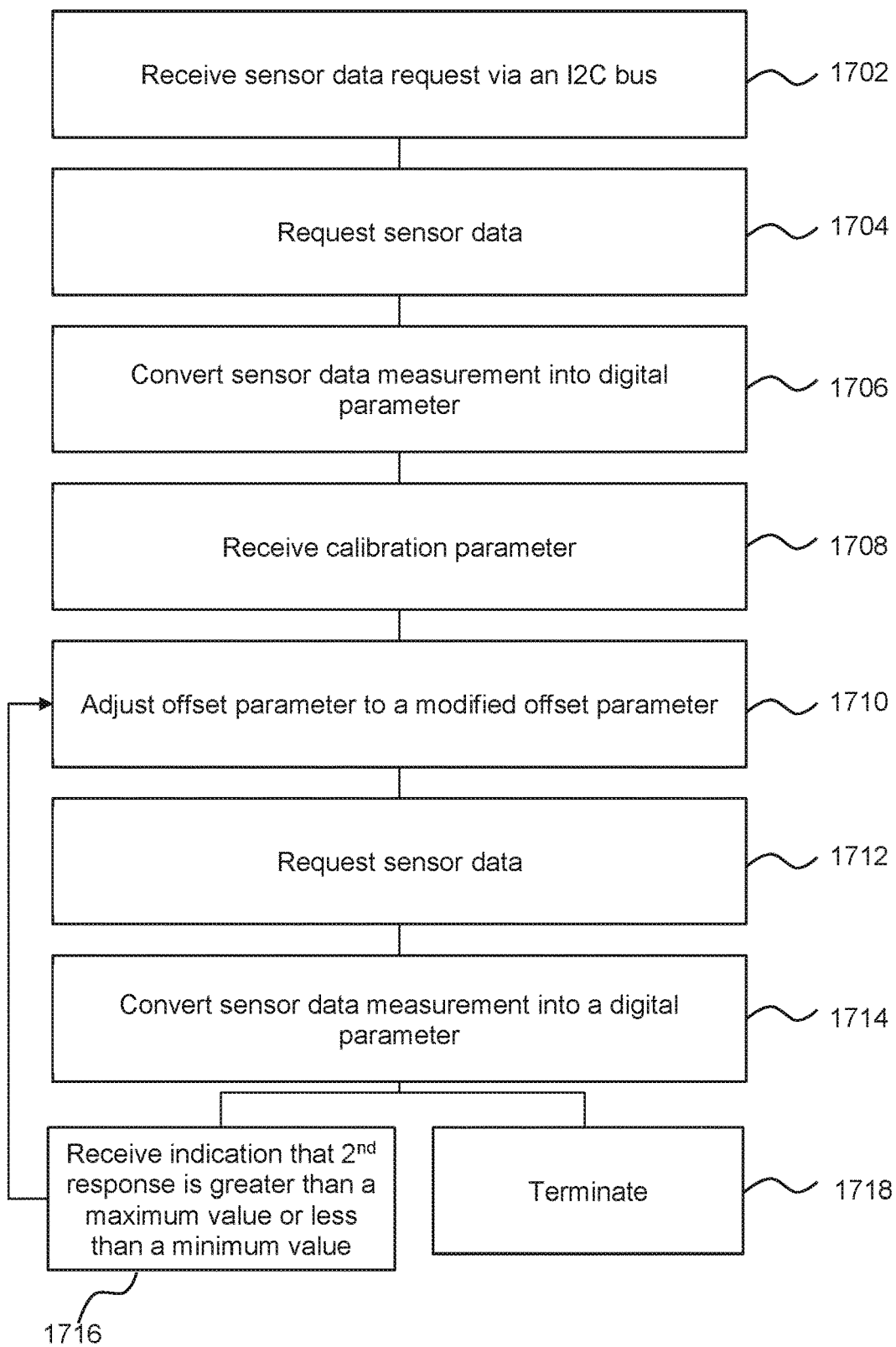

FIG. 17 describes an example of sensor calibration in greater detail.

In this example, in response to receiving a sensor data request via an I2C bus in block 1702, the method comprises, requesting (e.g. causing generation of and/or retrieving) sensor data in block 1704. For example, this may comprise reading a resistance of a liquid level sensor, determining a reading from a strain gauge, or the like. Therefore, in some examples, requesting sensor data may comprise applying a current to at least one resistor and generating a sensor voltage. In this example, the reading is converted to a digital reading using a configurable offset and/or gain parameter. Thus, block 1706 comprises converting the sensor data measurement into a digital parameter using an analogue to digital converter having an initial gain parameter and a voltage offset adjustment parameter (Vdac). In one example, calibration parameters may be provided in block 1702 for a first conversion, or default calibration parameters may be used for the conversion step of block 1706. In some examples the resulting digital reading may be stored in a memory, for example in a predetermined memory location, which may be predetermined memory register.

The sensor data request received in block 1702 may comprise a write request, which includes a sensor cell identifier. In some examples, a sensor type may be identified. For example, the sensor data request may specify that one of the level sensor, global TSR, strain gauge, crack detector or a thermal diode sensor should be queried. In some examples, a specific sensor cell or set of sensor cells may be selected. For example, the sensor data request may identify a specific sensor/sensor cell using an identifier such as an index, address or the like. In some examples, such identifying data may be written to one or more memory register(s), which may be a predetermined or dedicated register(s).

Receipt of such a sensor data request may trigger a sequence of actions, for example including blocks 1704, block 1706, and/or storing the digital parameter in a memory.

In some examples, the method may further comprise receiving a read request from processing circuitry, the read request being a request for the digital parameter, for example a request to read the predetermined memory location. In other examples, the digital parameter may be transmitted without requiring a read request to be received.

Block 1708 comprises receiving a first calibration parameter, which in this example is an offset parameter. This may be indicative that a print apparatus processing circuitry has determined that the first response is greater than a maximum value or less than a minimum value of a predetermined range (as stated above, certain calibration parameters may have been applied for an earlier, e.g., first, conversion in block 1706, but these may have returned these unsuitable values, and, hence, need further calibration as determined by the print apparatus processing circuitry). As noted above, the offset parameter may be a linear modification to a previously used offset parameter, a binary modification to a previously used offset parameter, or some other modification which may be intended (in some examples over a plurality of iterations) to converge on a count in an appropriate range.

Block 1710 comprises adjusting a stored offset parameter to the new offset parameter. In some examples, adjusting the offset parameter may comprise overwriting an offset parameter stored in a memory register with a modified offset parameter. More generally, any calibration parameter may be overwritten in a similar manner.

Block 1712 comprises requesting sensor data as described in relation to block 1704. Block 1714 comprises converting the sensor data measurement into a digital parameter using an analogue to digital converter having the first offset parameter.

As outlined above, once determined, the digital parameter may for example be stored in a memory (and in some examples may be stored in the same memory location as the digital parameter generated in block 1706) and/or supplied to the processing circuitry of the print apparatus automatically, or following receipt of a read request, or in some other way.

From here, the method may proceed in one of two ways. Block 1716 comprises receiving a second calibration parameter, which may be an indication that the processing circuitry of the print apparatus has determined that second response is greater than a maximum value or less than a minimum value of the predetermined range. In this case, the method loops, with further modified offset parameters being applied until the sensed data is within the predetermined range. In some such examples, the print apparatus processing circuitry may be configured such that, if consecutive readings fall outside the predetermined range at different ends of that range, then half the previous offset parameter may be added or subtracted from the previous offset parameter until a reading which is within the range is seen. However, in some examples, if consecutive readings fall outside the predetermined range at the same end of the range, the print apparatus processing circuitry may be configured such that the offset parameter which is sent may continue to be halved/doubled as appropriate. Other methods of converging on appropriate calibration parameters may be used, for example as discussed above.

Block 1718 comprises terminating the method. In some examples, the method may be terminated on receipt of an indication that the response is acceptable. In other examples, the absence of an indication that the responses fall outside of a predetermined range, or an absence of further calibration parameters, may serve to terminate the method.

To consider a particular example in which an array of thermal (ink level) sensor cells and an array of strain gauge sensor cells is provided, such sensors may each generate a unique voltage based on the silicon process variation and ink supply operating temperature. These sensor voltages may be read using an analog-to-digital (A/D) converter which is integral to the logic circuitry. Such an A/D circuit may have a finite input voltage range. To ensure all sensors produce a voltage that will be in range for the measurement sequence, a voltage calibration process may be performed before measurements begin.

For both ink level sensor cells and strain gauge sensor cells, the measurement sequence can result in a large change in the output value of the A/D (counts). Therefore, a specific starting count value range, unique for each sensor type, may be targeted before ink level or deflection measurements begin.

Some examples of ink level sensors work by measuring the thermal response change to a local heating event. If fluid is present over the sensor cell location, the thermal response change (e.g. counts of an analogue to digital converter receiving an input comprising a resistance) will be less than if there is air present over the sensor. Heating a sensor cell tends to increase its count reading.

In some examples, calibration may be carried out while the sensor cell(s) are not heated, and to ensure that readings are not clipped when sensors exposed to air are heated, the target count may be at the low end of a count range. For example, if a maximum count value is 255 counts, the target calibration value when the sensor cell is not heated may be approximately 10-30 counts or 10-50 counts. In another example, a calibration may be carried out using a first sensor cell while heating. This may be carried out using the sensor closest to the logic circuitry as this may be expected to provide the highest reading as it is less affected by losses in transmission. This heated sensor may be calibrated to provide a reading in the region of 170-240 counts (e.g. in dry state) or 100-180 counts (e.g. in wet state), with the knowledge that other sensor cells will return a lower reading.

Some examples of strain gauge sensor cells measure the mechanical deflection of the ink container lid during fluid priming (which is also known as hyperinflation). In one design, these sensor cells may lower their count value during lid deflection, meaning the target calibration range when not deflected is high, for example being at over 200 counts when the count range is from 0 to 255, for example being approximately 200-245 or 225-245 counts. This may allow a count reduction to around a minimum count of around 100 when a hyperinflation event occurs.

In summary therefore, if a calibration result is outside a target range, offset, gain and/or any other parameter of the A/D converter may be modified until it is within range. In other examples, test parameters (i.e. sensor reading parameters) may be alternatively or additionally be varied to return a result within a target range. For example, heat outputs or electrical parameters may be adjusted.

It may be noted that the target ranges for calibration for the sensor types are different. Therefore, in one example, the method may comprise calibrating a first sensor type to provide a calibration value in a first range, and calibrating a second sensor type to provide a calibration value in a second range, where the first and second range may be non-overlapping, or only partially overlapping. In some examples, the first and second ranges may be at the higher and lower end of a larger range.

In some examples, the individual sensor cells and the range of responses from a set of sensor cells may be calibrated, for example to determine that the spread between the maximum and the minimum readings is within a predetermined threshold. For example, temperature sensor cells may be expected to provide a set of calibration readings which fall within a spread of a first number of counts (for example, within 20 counts of each other), while strain gauge sensor cells may be expected to provide a set of calibration readings which fall within a spread of a second number of counts (for example, within 100, or 80 counts of each other). This range may be greater due to built-in stress during manufacturing. The first and second number may be the same or different. Limiting the spread in this way means that calibration may be carried out relative to a subset of sensor cells—or even relative to a single sensor cell, which in turn may shorten the time taken to fully calibrate the readings for the set of sensor cells. In this way, if the calibrated readings for the sensor cell(s) are within an expected range, the values returned from the other elements can be expected to be within that range. In some examples, the spread in values may be determined in a factory setting prior to distribution of the apparatus. In some examples, at least a predetermined number of out-of-range responses may be expected before an 'in range' response is seen.

In some examples, the method of FIG. 17 may be carried out during a time period during which a logic circuitry package is accessible via a second address, as described above.

Figure 18:
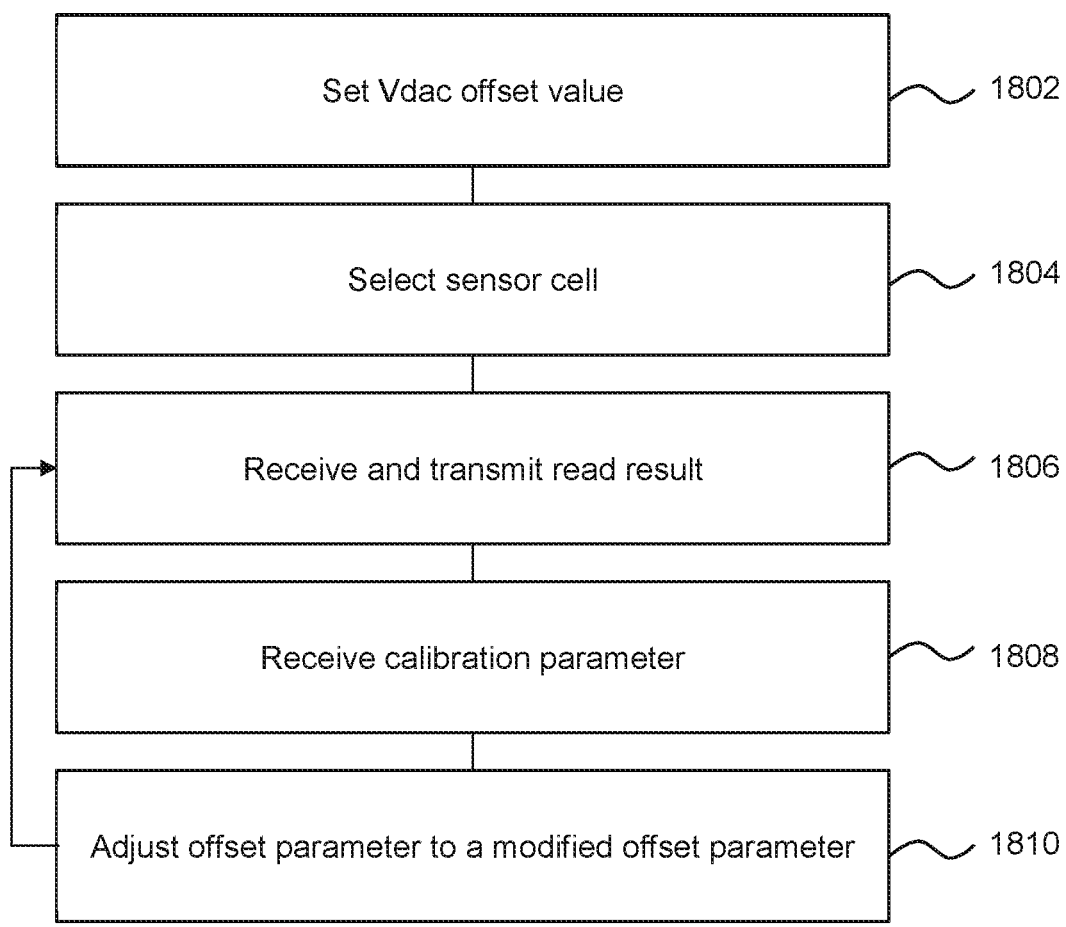

FIG. 18 is another example of a calibration operation, which may be a calibration operation of at least one sensor for sensing a characteristic of a replaceable print apparatus component. The method may be carried out by logic circuitry associated with a replaceable print apparatus component installed in a print apparatus, and which describes a method of setting parameters for a whole array based on a calibration result for a single sensor.

Block 1802 comprises configuring an offset value in a Vdac register. For example, this may comprise storing a value in a Vdac register. An initial value may, in some examples, be received from a host apparatus (e.g. a printer) in which sensor apparatus is installed. In other examples, the initial value may be a default value, for example a default value of 0, or a mid-range default value (for example, a default value of 72 in a range of 0 to 255), or a default value at the top of a range (e.g. 127, or 255, depending on the available range). In again other examples, the initial Vdac value may be stored on a memory of the logic circuitry package, for example of a first logic circuit, to be retrieved by the host apparatus via the first logic address outside of the time period, and subsequently to be input by the host apparatus to the second logic circuit. The offset value may compensate for an offset error in Vdac, and/or may be set to reduce a risk of 'clipping' as discussed above.

Block 1804 comprises selecting a cell to test or read. In some examples, the cell may be selected by writing a cell address into a memory register. The selected cell may depend on the configuration of the sensor array, and/or on test parameters. For example, if the calibration is to be carried out in relation to a liquid level sensor as shown in FIG. 13, it may be intended to test the sensor such that the reading may be expected to be at the higher end of an anticipated range. Therefore, a sensor which is close to the top of the array may be selected, to minimise signal transmission losses. In addition, an instruction to heat the sensor may be generated. In another example, it may be intended to test the sensor such that the reading may be expected to be at the lower end of an anticipated range. In such an example, a sensor cell which is relatively near the bottom of the array may be selected, and the sensor may not be heated, so as to provide an expected low voltage return at the analogue to digital converter.

Block 1806 comprises receiving, by processing circuitry which comprises the sensors, a sensor read result, and sending the read result to a host apparatus. In this example, the read result comprises a count value output by an analogue to digital converter, which may for example be stored in a memory (for example, a memory register) of processing circuitry which comprises the sensors. Such a read result may be sent to the host apparatus, for example following receipt of a read request therefrom. The host apparatus may determine if the count value in within a predetermined range, such that a count value within the range is considered suitable, and a count value outside the range is not.

If the count value is suitable, then the currently set offset value in the Vdac register may be adopted for that sensor array and the method may terminate. However, in some examples the method continues with block 1808, which comprises receiving a modified offset value, for example from the host apparatus. This provides an indication that the count value is not suitable. In block 1810 the offset value to be used in sensor reading conversion is adjusted to the received offset value, and the process repeated, for example with the print apparatus triggering a new read of the same sensor cell as described in relation to block 1804

The method of FIG. 18 may then be repeated for another sensor cell, sensor and/or sensor array. The range of suitable count values may be different for different sensors and/or sensor arrays. A similar method may be used to set one or more signal gain parameters and/or other operational parameters such a heat and/or electrical sensor read parameters.

In some examples, the methods of any of FIGS. 16 to 18 may be carried out by logic circuitry associated with a replaceable print apparatus component installed in a print apparatus. In some examples the methods of FIGS. 16 to 18 may be carried out during a time period during which a logic circuitry package is accessible via a second address, as described above. In some examples, the methods of FIGS. 16 to 18 may be carried out following authorisation, as described above.

Figure 19A:
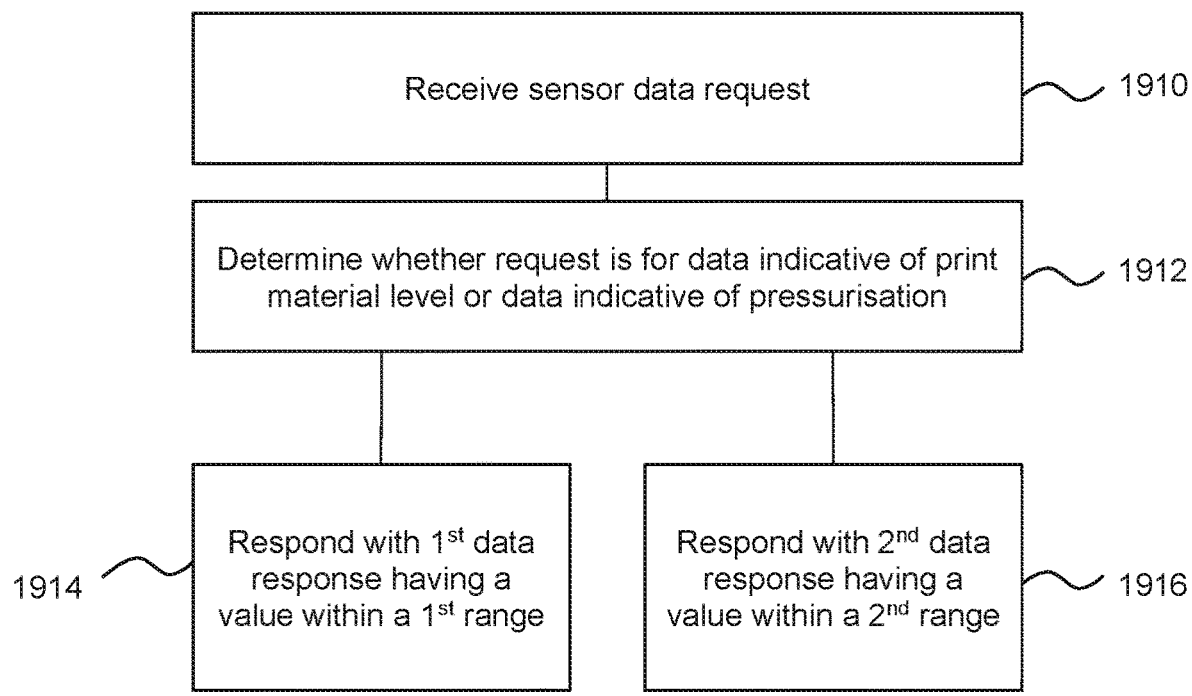
FIGS. 19A and 19B show example methods of reading sensors.

FIG. 19A shows an example methods of reading data from logic circuitry. In one example, the method may be carried out by logic circuitry associated with a replaceable print apparatus component installed in a print apparatus. In some examples the method of FIG. 19A may be carried out during a time period during which a logic circuitry package is accessible via a second address, as described above. In some examples, the method of FIG. 19A may be carried out following authorisation and/or calibration, as described above. Such calibration may comprise calibration of response parameters, such as Vdac offset and/or gain. In some examples, the calibration may be carried out as described in relation to any of FIGS. 16 to 18.

For example it may be that it is intended to monitor various parameters of a replaceable print apparatus component. For example, as mentioned above, in the case of a container for consumable materials, a level of the consumable materials may be measured using a suitable level sensor. Some examples of fluid level sensors are described herein, but other sensors may be used in other examples. In an alternative configuration, instead of measuring a material level directly, the amount of material consumed may be for example, estimated or measured, to infer a level remaining. For example, an ink level may be inferred from a drop or page count as stored in a respective memory field, for example in the first logic circuit. For example, an accelerometer may be used to detect motion of a print head and thereby provide an approximation of ink delivered to a page, or a typical ink usage could be predetermined for a print job or a printed page, and the number of jobs/pages printed may be monitored to determine an estimate (which in some examples may be refined by considering the time taken to carry out a print job). In other examples, fluid level may be measured directly in some other way, for example using resistive, capacitive or inductive sensors, optical sensor, Hall effect sensors with floating elements, or the like. In still further examples, fluid flow from a container may be measured using a flow sensor, for example inductive sensing for ionic fluids.

In some examples, a print material container such as a print agent cartridge may be pressurised (or more generally may be subjected to a pneumatic stimulus). This may assist in ejecting print agent therefrom. For example, this pressurisation event may comprise introducing air into a chamber containing a fluid. In some examples, the fluid and any introduced air may be kept separate from one another, for example by introducing the air into a collapsible chamber, such as a bag, which is itself arranged in the chamber containing the fluid. The function of such a chamber may be tested, for example in a 'hyperinflation' event, in which the pressure may be increased to a greater degree than may be expected during normal operation of the print apparatus to perform printing actions. This may for example provide a 'priming' function, in which material which may be occluding ejection nozzles or the like may be dislodged. While in some examples, the pressure may be measured directly, in other examples, an effect of the pressurization may be measured. For example, an air movement or pneumatic stimulus may be monitored, or a deflection in a surface caused by a change in pressure may be detected.

While particular arrangements using strain resistors are described in detail herein, other examples of sensors may be provided. For example, in one example, a temperature sensor may be provided to determine a printing fluid temperature. Thus, a sensor assembly may comprise at least one level sensing element, at least one strain sensing element, and at least one fluid temperature sensing element (which may for example comprise a temperature sensitive resistor.

In other examples, a temperature sensor may be provided to determine ambient temperature and/or mechanical integrity, which may for example be monitored using a crack detector.

In one example, a sensor assembly may contain an array of heater elements and sensors. There may be a plurality of sensor types, for example five different sensor types, each with a different sensing function. In one example, there may be around 255 sensors, with 126 of these being thermal sensors to measure printing fluid level (thermal point sensors), each of which may be associated with a heater element. In addition, there may be at least one global average, or ambient, temperature sensor which may be a Temperature Sensitive Resistor (TSR), and at least one absolute fluid temperature sensor, to determine the temperature of the fluid associated with the level sensor (which may be a diode or the like), at least one sensor to measure mechanical deflection (e.g. one or a number of strain gauges), and at least one sensor to determine mechanical integrity (e.g. a crack detector). The average temperature sensor may comprise a distributed sensor cell, for example, a resistive wire which may for example run along the length of a substrate. The resistive value represents an 'average' temperature over the length. This may be contrasted with a point sensor, which will take a localized reading.

In some examples, the sensors of the sensor assembly may be controlled by a common logic circuit, for example, a logic circuitry package, first logic circuit or second logic circuit or processing circuitry 424 as described above.

In some examples, the sensors of the assembly may be read using a specific I2C communication sequence, or some other communication sequence.

Providing converged circuit architecture which enables multiple sensor types to be included with little additional silicon cost is advantageous in simplifying manufacture and reducing costs associated therewith. In some examples, the same routine may be used to query a plurality of sensor types, as is set out below. This may reduce and/or simplify measurement time and/or firmware complexity.

In some examples, the number of data readings requested by logic circuitry of a print apparatus and returned by a logic circuitry package may depend on whether the request is for data indicative of a print material level or for data indicative of a pressurization event. In the event that the request is a request for data indicative of the print material level, there may be request(s) for a first data response having a first number of data readings, and in the event that the request is a request for data indicative of a pressurisation (e.g. a pressure change) event, there may be request(s) for a second data response having a second number of data readings. The first number of data readings may be different from the second number of data readings. In some examples, the first number of data readings may be greater than the second number of data readings. In addition, the first number of data readings may have a different range than the second number of data readings. Moreover, in one example, the first data response may have characteristics such as a decreasing trend based on a predetermined order of the sensors. The request(s) for the first data response may comprise a plurality of different data requests. For example, logic circuitry of the print apparatus (such as the controller 304 or the logic circuitry 808) may make a first number of separate data requests. The request(s) for the second data response may comprise a plurality of different data requests (for example, the logic circuitry of the print apparatus may make the second number of data requests). The requests may comprise memory read and/or write requests.

The method of FIG. 19A comprises in block 1910, receiving a sensor data request. In block 1912, it is determined whether the request is for data indicative of a print material level or for data indicative of a pressurization event. In the event that the request is a request for data indicative of the print material level, the method proceeds to block 1914, and the logic circuitry responds with a first data response having a value within a first range. In the event that the request is a request for data indicative of a pressurisation event, the method proceeds to block 1916, and the logic circuitry responds with a second data response having a value within a second range. In some examples, the first and second ranges may be distinct, i.e. non-overlapping. The first and second ranges may be sub-ranges at respective low and high ends of a broader maximum range.

In some examples, the request in block 1910 is in the form of a write command or request, which may identify whether the request is for data indicative of a print material level or for data indicative of a pressurization event. In some examples, blocks 1914 may be carried out following a read command/request received from logic circuitry of print apparatus, requesting sensor data.

In some examples, prior to providing the first or second data response, parameters for performing a measurement may be set, for example through a calibration routine as described above. For example, the power or duration of a heat event and/or the duration of the measurement event, or electrical testing parameters may be determined.

In some examples, providing the first or second data response comprises iteratively providing data relating to different sensors and/or different sensor cells. In some examples, there may be a plurality of sensor cells which form part of a single sensor, such as a print agent level sensor, and each of these cells may be read in turn. In some examples, sensed data is written into a memory register and supplied therefrom to a host apparatus, for example in response to a read request. In some examples, the data provided by each sensor cell is read into a particular memory location, for example a memory register, and then overwritten by the data from the next sensor cell once it has been read therefrom for transmission to the host apparatus, for example following a read request received from that host apparatus to read that memory location. In some examples, obtaining the sensor data may be carried out in a similar manner to that used to determine individual calibration readings.

In other words, a first command, which may be a write command, may provide information allowing a sensor type/sensor cell to be identified, and may trigger (in some examples on receipt of a specific "conversion" command, but in other examples in response to the first command) a sequence of events to carry out sensing, execute an A/D conversion to store the conversion value into a memory location, which may be predetermined (for example, comprising a sensor data register). The sensing may be carried out using parameters (e.g. electrical test parameters, heating parameters, timing of measurements, etc.) which may also be stored in a memory (in some examples, in separate memory registers), and/or may be provided with the command. The A/D conversion may be carried out using parameters which may also be stored in a memory (in some examples, in one or more memory register(s)).

Figure 19B:
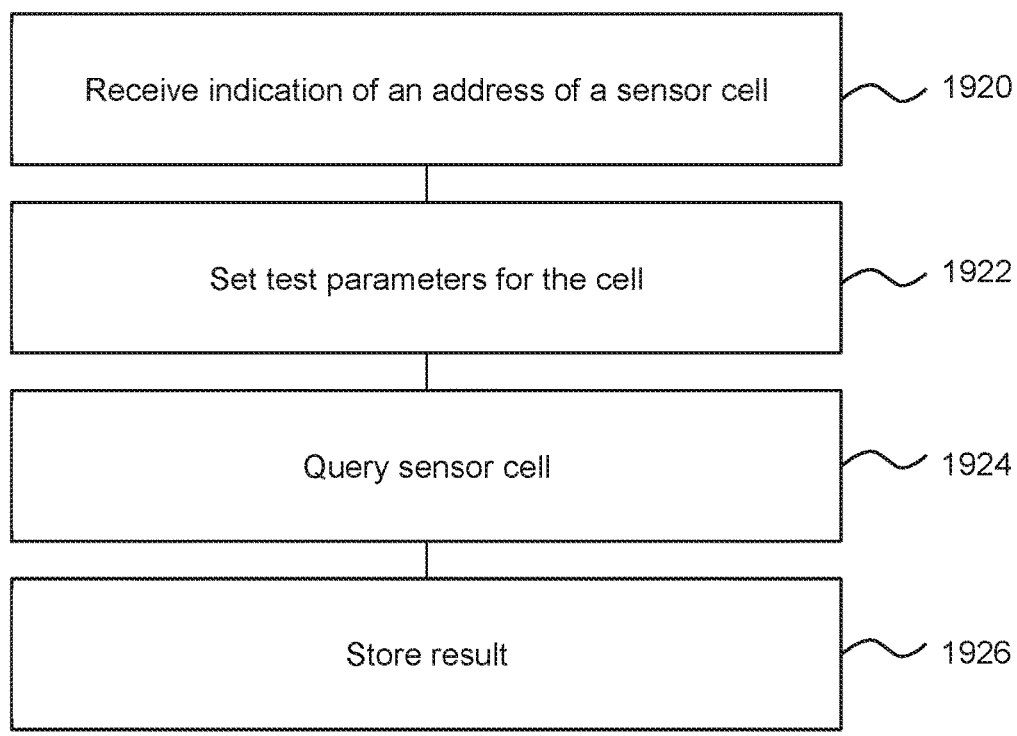

FIG. 19B shows an example of a method of reading a plurality of sensor cells of a sensor array. The method comprises receiving, in block 1920, an indication of an address of a sensor cell. For example, the address of the sensor cell may be written into a particular memory register and/or the indication of an address of a sensor cell may be provided as part of a write request, which may provide an indication of whether the request is for data indicative of a print material level or for data indicative of a pressurization event, as described in relation to block 1910. Block 1922 comprises setting the test parameters for the cell. For example, this may comprise setting a heat level and/or duration for a heater, or setting a voltage and/or current level for an electrical test of a resistor or the like. Block 1924 comprises carrying out the test by querying the sensor cell and block 1926 comprises storing the result. The result may provide a data response for that cell. In some examples, the result may be stored in a second particular register.

In some examples, each data response may be requested and/or read out onto a communications bus in turn. In some examples, a request for a reading from each of a plurality of cells may be managed by the host apparatus, which may request a sensor reading from a cell, supplying data identifying that cell (for example, the cell address and, in some examples, the sensor type), triggering the method of FIG. 19B. In some examples, once the sensor cell reading has been acquired and placed in a local memory by the replaceable print apparatus component, the host apparatus may make a read request (for example, requesting that the content of a specific memory register is read onto the bus). Once data has been acquired for that cell, the host apparatus may then initiate the process for a different cell/sensor type.

In another example, the process may be controlled by the logic circuitry/processing circuitry on which the sensors are provided. For example, this may comprise receiving, from a host apparatus, a request to provide readings from a particular sensor array (for example, from a strain sensor array, or from a fluid level sensing array), and the logic circuitry/processing circuitry may then initiate a routine to query sensor cells of that array.

In some examples, prior to receiving a sensor data request in block 1910, the method may comprise receiving a first command indicative of a first time period, and in some examples a task, and enable access to processing circuitry by second address for duration of the time period. In other words, the method of FIG. 19A (and/or the method of FIG. 19B) may, in some examples, follow a method as described in relation to FIG. 5. The sensor data request received in block 1910 may be sent to the second address. In some examples, the method of FIG. 19A (and/or the method of FIG. 19B) may be carried out during a time period during which a logic circuitry package is accessible via a second address, as described above.

The sensor data request may comprise a write request, which may include a sensor cell identifier, for example as described in relation to Block 1920. In some examples, a sensor type may be identified. For example, the sensor data request may specify that one of the level sensor, global TSR, strain gauge, crack detector should be queried. In some examples, a specific sensor cell or set of sensor cells may be selected. For example, the sensor data request may identify a specific sensor using an identifier such as an index or the like.

In some examples, such identifying data may be written to one or more memory register(s), which may be a predetermined or dedicated register(s).

Figure 20A:
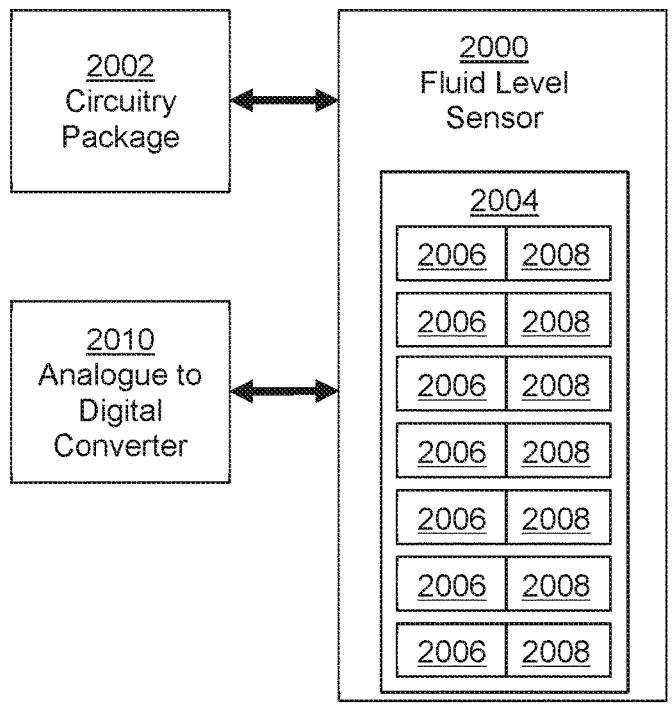
FIG. 20A shows an example fluid level sensor and FIGS. 20B and 20C shows examples of data acquired from a fluid level sensor.

FIG. 20A shows an example of a fluid level sensor 2000 in association with a circuitry package 2002. The fluid level sensor 2000 in this example comprises a relatively long thin silicon strip 2004 which supports 126 resistive sensor cells 2006 (only some of which are shown to avoid over complicating the drawing). The fluid level sensor 2000 further comprises a set of heating elements 2008 (AKA heater cells), one in association with each sensor cell 2006. The heating elements 2008 may be capable of providing heat at a plurality of power levels. In one example, there are three heating elements with each resistive sensor cell 2006, in order to provide three heating levels. In other examples, the heating elements may be controllable to output a plurality (e.g. three) of heating power. In order to read the sensor 2000, the circuitry package 2002 sends a signal to at least one heating element(s) 2008, which may be heating element(s) associated with a sensor cell to be read. This causes the heating element 2008 to emit a pulse of heat. One of the sensor cells 2006 is then selected to be read. This process is repeated until all 126 sensor cells 2006 have been read. In this example, the sensor readings, which are essentially voltage readings, as submitted to an analogue to digital converter 2010. The conversion applied by the analogue to digital converter 2010 may be predetermined or may for example be set by a calibration process as detailed above In one example, the circuitry package 2002, the analogue to digital converter 2010 and the fluid level sensor 2000 are all arranged on a single, common substrate, which may be a silicon substrate. Part of this substrate is exposed to the fluid being sensed (the part with sensors, or most of the part with sensors). The substrate may in turn be attached to a carrier, in one example, a stainless steel carrier that may be attached a replaceable print apparatus component (or in some examples, the lid of a print agent supply cartridge). A flex circuit attached to the carrier may form a connection between the first and second logic circuits described above.

In one example, a sensor read sequence may comprise selecting a sensor type (e.g. a fluid level sensor), a sensor cell location (e.g. position in a string of sensor cells, for example by reference to an address), setting a heating time and reading a result. In some examples, the result may be output to an A/D converter, which may start a conversion cycle at a predetermined time after heating begins, for example as measured by a timer. In some examples, the heating period and the reading period (conversion period) may at least partially overlap, although in other examples, reading may begin after the heating period has expired. In one example, the reading period starts during the heating period, and the heating period and the reading period terminate at substantially the same time. In some examples, the heating period and the reading period (conversion period) may at least partially overlap, although in other examples, reading may begin after the heating period has expired. This may allow a temperature condition to stabilise before a reading is taken and/or avoid heating currents which may be inconsistent along the length of the sensor 2000 during the time that the heater elements are powered. While measurements are taken in association with heating in this example, heating may be absent or disabled when measuring some sensor types.

Figure 20B:
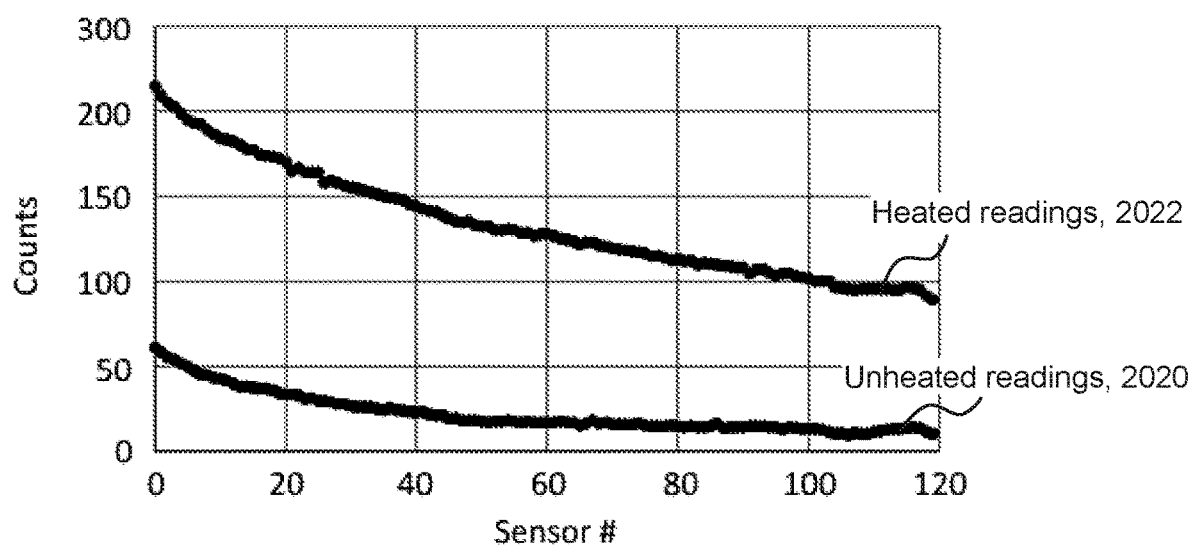

FIG. 20B shows examples of two sets of readings for an empty ink cartridge, comprising a set of readings 2020 taken when the sensor cells were not heated, and a set of readings 2022 taken when the sensor cells were heated. As discussed above, calibrating unheated sensors to a relatively low count provides the 'headroom' for acquiring heated readings. Alternatively, heated sensors may be calibrated to a relatively high count to provide the 'headroom' for acquiring unheated readings.

Figure 20C:
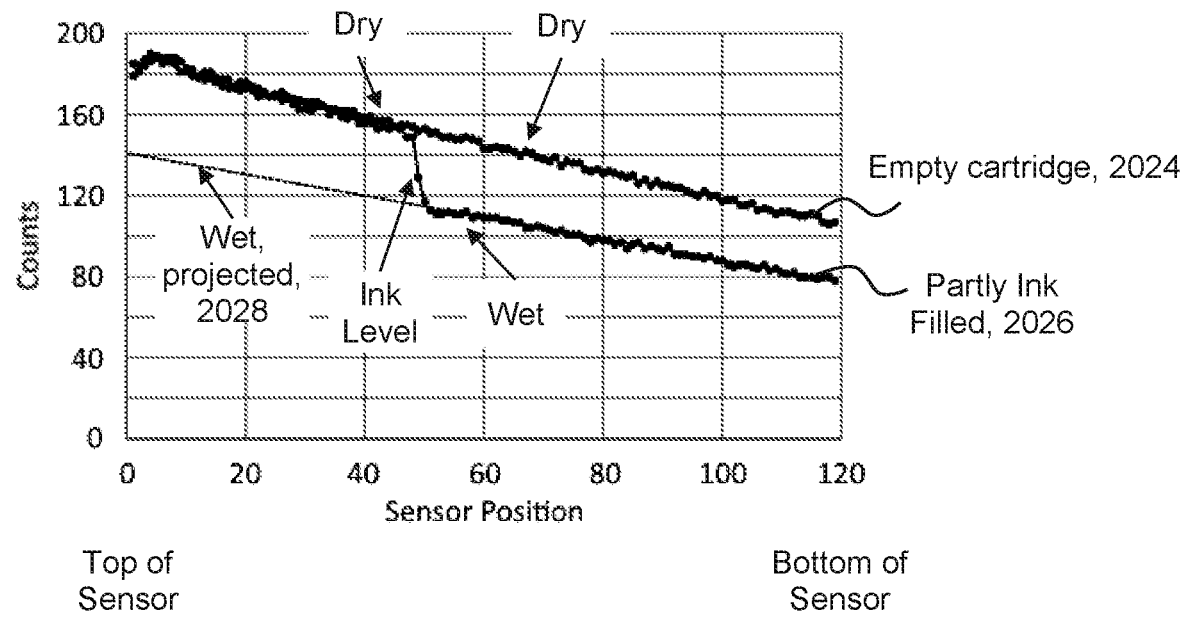

FIG. 20C shows examples of readings taken by the fluid level sensor 2000, with the sensors cells 2006 being heated by heat pulses supplied by the heating elements 2008. A set of readings 2024 for an empty cartridge and a set of readings for a partly filled cartridge 2026 are shown. These readings overlap for the lower indexed sensor positions. A projection of the expected count returned by the lower indexed sensor for a full cartridge 2028 is also shown When a fluid cools the region surrounding a sensor cell 2006, such a cell 2006 heats more slowly and cools more quickly than when such a cell 2006 is surrounded by air, in some examples reaching a lower temperature over the duration of the heating. Cooler elements may have a lower resistance than the hotter elements. This results in a reduction in sensor count output by the analogue to digital converter 2010. Thus the 'step change' shown in the transfer from a higher general count range to a lower general count range is indicative of the ink level, as indicated by the arrow with "ink level". The sensor(s) over which the change occurs provides the height of the fluid level. This step change may for example be detected by the print apparatus in which the sensor is installed.

Block 1914 of FIG. 19A may comprise returning a data response to a request for data indicative of a print material level. In some examples, the number of data readings request and/or returned in reading a fluid level sensor may be equal to the number of level sensor cells 2006. However, in other examples, the number of data readings may be less than the total number of sensor cells 2006, as a subset of the sensors may be read. In some examples, the data response may be returned following receipt of a read request from the print apparatus in which the sensor is installed.

A fluid level sensor may be queried in one or a series of requests in order return a data response comprising a data set which is representative of the sensor readings which, when taking the sensor cells in their physical order provide in which a step change in a series of data values is indicative of a measured or estimated print agent fluid level. In some such examples, methods may comprise generating a first data response in which a step change in a series of data values is indicative of a measured or estimated print agent fluid level. This may be generated by providing an array of thermal sensors or in some other way, for example to provide a 'backwards compatible' print agent fluid indication to a print apparatus, where the actual determination of the fluid level is done in some other way. Such a step change may be detected by a print apparatus performing a first derivative calculation on the sensor responses in sequence to identify the step change or discontinuity which indicates the fluid/air position.

As is further set out below, block 1916 of FIG. 19A may comprise, in at least some states of the print apparatus component, returning a data response comprising a data set which is representative of the sensor readings which, when taking the sensor cells in their physical order provide a series of data values indicative of a relatively smooth change in data values (or does not comprise such a step change). In some examples, the rate of change of data values may consistently increase or consistently decrease across the series.

Thus, in one example, the first data response may comprise a step change, and the second data response may not (or vice versa).

In some examples, the sensors may be read 'in order' of their physical arrangement, however in other examples the sensors may be read out of order, for example in an order specified in one or more commands sent from the print apparatus.

Figure 21A:
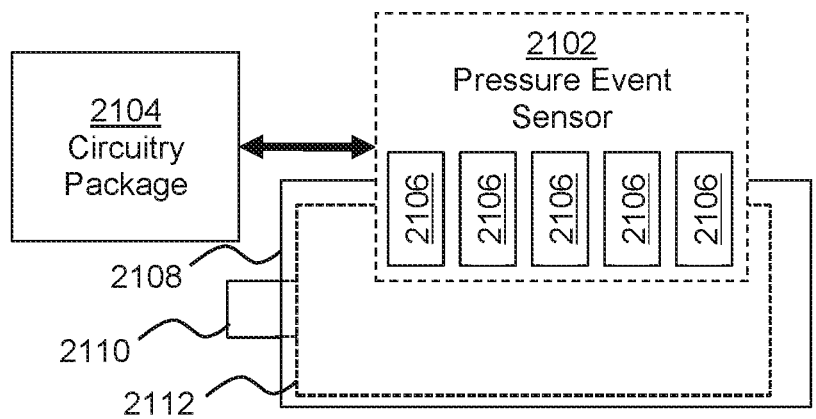
FIG. 21A shows an example pressure event sensor and FIG. 21B shows examples of data acquired from a pressure event sensor.

FIG. 21A shows an example of a pressure event sensor 2102 in association with a circuitry package 2104.

In this example, the pressure event sensor comprises a plurality of pressure sensors, in this example strain sensing cells 2106 arranged over the surface of a print material container 2108. Although in this example, only 5 cells 2106 are shown, in other examples there may be more, for example in the region of 100-200, for example around 120 cells (in one example, 126 cells). The strain sensing cells 2106 may comprise piezo-resistive cells (for example, thin film elements), the resistance of which may change when strain is applied. The print material container 2108 comprises an air inlet 2110, through which pressurized air may be introduced. When the print material container 2108 is pressurized, the surface deforms and the strain sensors placed under strain. In some examples, in order to test the operation of the pressure event sensor 2102, a pressure bag 2112 inside the container 2108 is 'hyper inflated' in order to cause a significant deflection in the strain sensors (and in some examples to cause priming or purging of nozzles or the like). In one example, the strain sensors are implant resistors which experience a change in resistance when bent or deflected.

While the circuitry package 2104 is shown separately from the print material container 2108 in the example, it may be integral (or in some examples, partially internal) thereto.

In other examples, other sensors can be used to detect a pressurization in the container. For example, a pressure sensor responsive to a pressure increase in the reservoir, for example above a certain threshold (e.g. 7 kPA gauge) may be used to detect hyperinflation/prime event.

In other examples, pressure events may be detected by detecting airflow through a valve, and/or for example near the air inlet 2110. For example, this may be detected using a metal slug in an inductor, for example in the form of a Linear Variable Differential Transformer which is pneumatically coupled to an air inlet, using a diaphragm with a strain gauge, using a manometer with a conductive liquid and electrical contacts that are wetted when air pressure is applied at an input port, using a magnetic slug in a tube with a Hall sensor outside the tube, using a manometer with an opaque liquid and a through beam optical sensor, using a diaphragm or slug connected to a switch, for example a Reed switch, which can detect displacement of the diaphragm/slug, or the like.

Figure 21B:
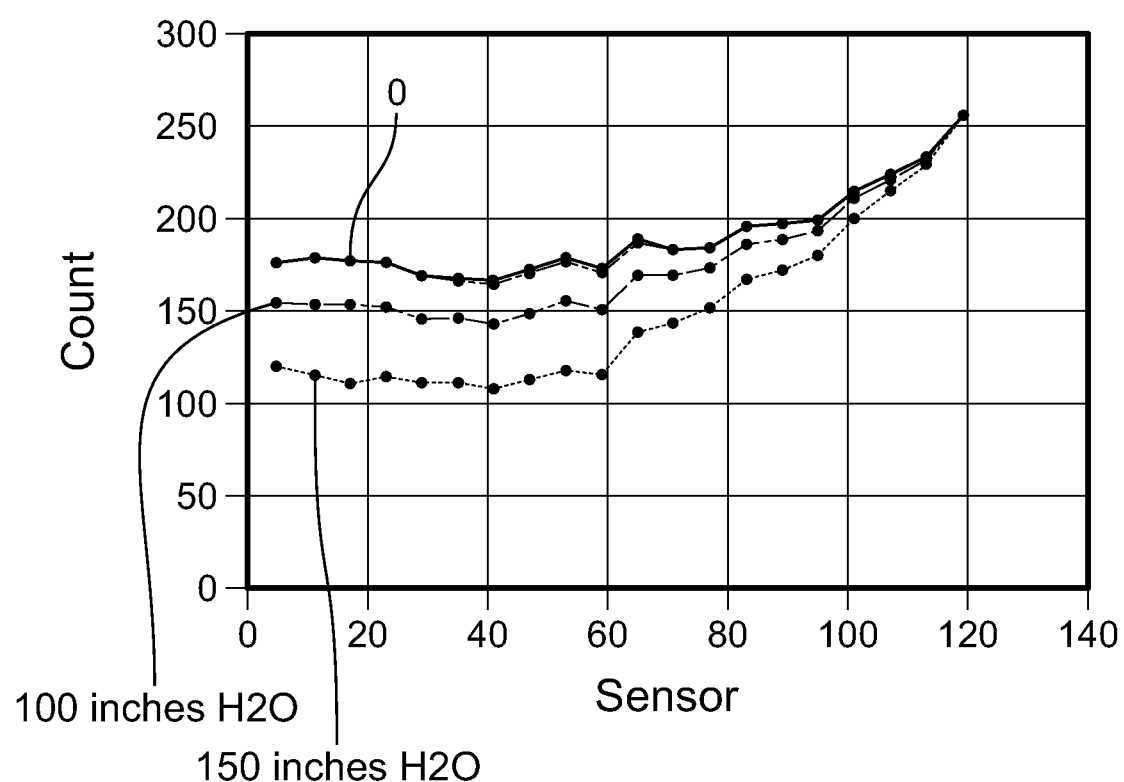

FIG. 21B shows readings taken from a subset of available strain sensing cells 2106.

When unstressed, the readings may be expected to be around 250 counts. In this example, one end of the surface over which the strain sensing cells are arranged is not constrained. Thus, the strain sensors do not tend to change significantly, however much pressure is applied. In this example, due the nature of the way in which the strain sensing cells 2106 are mounted, they experience a variable degree of strain even in the absence of pressure for inflation of the bag. However, this need not be the case in all examples—if all strain sensing cells 2106 were unstressed unless the bag pressure 2112 is inflated, then a flatter curve or line would be seen for the unpressurised measurements.

In some examples, the air pressure reached is independent of fluid level. As such, a low on fluid supply may require more air to be pumped into the supply to reach a target pressure, while a full supply will require less air. However, in other examples, the air pressure reached may depend on the state of a print agent cartridge on which the sensor is installed. For example, the maximum pressure reached may be higher when a cartridge is relatively full than when the cartridge is relatively empty.

FIG. 21B shows different levels of pressurization and the associated deflection in 'inches of water' in a water column. 27.7 inches of water column (wc) pressure is equivalent to 1 PSI of pressure (thus 50 inches of water is equivalent to 1.805 PSI, 100 inches of water is equivalent to 3.619 PSI, or around 24952 Pascal) and 150 inches of water is equivalent to 5.415 PSI or around 37335 Pascal), or 1 inch of water is a pressure of 2.4884 mbar. The pressures shown are absolute pressures.

In some examples, the calibration may take place to ensure that all the sensors provide an output count of at least 200 in the absence of a hyperinflation. This allows sufficient 'headroom' for the higher recorded pressure events without signal clipping. In some examples, the calibration may be carried out to provide a target count of above 250, or above 230). The sensor cell which is expected to be under the least strain (or at least under a relatively low strain) may be selected for testing. In some examples, the target count value may between 225 and 245, and the Vdac offset may be adjusted until this value is achieved.

In some examples, calibration may take place during a pressurisation event. In such examples, it may be intended that the test result is in a range which is below a threshold value (for example, in this case, below 180, or below 150, or below 100). The sensor which is expected to be under the most strain (or at least under a relatively high strain) may be selected for testing.

Block 1916 of FIG. 19A may comprise returning a second data response to a request for data indicative of a pressurization event, in some examples following receipt of a read request from the print apparatus in which the sensor is installed. In some examples, the response to the pressurization event may be characterised by acquiring a number or data readings, wherein the number of data readings may be equal to the number of strain sensing cells 2106. However, in other examples, the number of data readings may be less than the total number of strain sensing cells 2106, as a subset of the sensors may be read.

In some examples, if a pressurization event occurs in use and an expected behaviour is not seen (e.g. there are no readings below a threshold), this may indicate that the pressurization event has failed (for example, the integrity of the pressure bag 2112 has failed).

In some examples, the method of FIG. 19A comprises detecting a pneumatic stimulus, and providing a data response following detection of the pneumatic stimulus. In some examples, this may be detected as an air flow or the like. In some such examples, the method may comprise generating a data response which is similar in form to the expected response (e.g. in this example, a sequence of relatively smoothly changing counts in the range of 250 to around 100 counts). While this may be generated as set out in relation to FIGS. 21A and 21B, in other examples, for example to provide 'backwards compatibility' to a print apparatus, where the actual determination of the count level is done in some other way. For example, some print cartridges need not pressurise in the same way and in such examples a response to pressurisation could be mimicked, even in the absence of a pressurisation event (or independently of the measurement thereof).

In other examples, the method may comprise determining whether a request for data is a request for data indicative of a read result from a particular strain sensor.

Examples in the present disclosure can be provided as methods, systems or machine-readable instructions, such as any combination of software, hardware, firmware or the like. Such machine readable instructions may be included on a machine readable storage medium (including but is not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g. a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfill the functions of several units recited in the claims.

The features of any dependent claim may be combined with the features of any of the independent claims or other dependent claims.

In some examples, the disclosure comprises any of the following Statements.

STATEMENTS

1. A logic circuitry package having a first address and comprising a first logic circuit,
wherein the first address is an I2C address for the first logic circuit, and wherein the package is configured such that, in response to a first command indicative of a task and a first time period sent to the first address, the first logic circuit is to, for a duration of the time period:
   (i) perform a task, and
   (ii) disregard I2C traffic sent to the first address.

2. The logic circuitry package of Statement 1 wherein the first logic circuit further comprises a timer to measure the time period.

3. A logic circuitry package according to Statement 2 wherein the task performed by the logic circuitry package comprises at least one of: monitoring the timer and performing a computational task having a completion time which exceeds the time period.

4. A logic circuitry package according to any preceding Statement wherein the package is for association with a print material container.

5. A logic circuitry package according to Statement 4 further comprising a memory storing data representative of at least one characteristic of the print material container.

6. A logic circuitry package according to any preceding Statement wherein the package comprises a second logic circuit and the package is configured to make the second logic circuit accessible during the time period.

7. A logic circuitry package according to Statement 6 wherein the package comprises a dedicated signal path between the first and second logic circuit and the second logic circuit is made accessible by the first logic circuit sending a signal via the dedicated signal path.

8. A logic circuitry package according to Statement 7 wherein the signal is present for the duration of the time period.

9. A logic circuitry package according to any preceding Statement which comprises at least one sensor or sensor array.

10. A logic circuitry package according to Statement 9 wherein the at least one sensor comprises at least one print material level sensor.

11. A logic circuitry package according to any preceding Statement wherein the package has at least one second address and is configured such that, in response to the first command, the package is accessible via a second address for the duration of the time period.

12. A logic circuitry package according to Statement 11 wherein the package is configured to provide a first set of responses in response to instructions sent to the first address and to provide a second set of responses in response to instructions sent to a second address.

13. A logic circuitry package according to Statement 11 or Statement 12 wherein the package is configured to operate in a first mode in response to instructions sent to the first address and to operate in a second mode in response to instructions sent to the second address.

14. A logic circuitry package according to any of Statements 11 to 13 wherein the package is configured to provide a cryptographically authenticated set of responses in response to cryptographically authenticated communications sent to the first address and to provide a second, not cryptographically authenticated, set of responses in response to communications sent to the second address.

15. A logic circuitry package according to any of Statements 11 to 14 which is configured to transmit, outside of said time period and in response to communications sent to the first address, print material level-related data that is authenticated using an encryption key, and which is further configured to transmit, during the time period and in response to communications sent to the second address, print material level-related data not authenticated using that key.

16. A logic circuitry package according to any of Statements 11 to 15 wherein the at least one second address is an address of a second logic circuit.

17. A logic circuitry package according to any of Statements 11 to 16 wherein the package is not accessible via the second address for a second time period preceding the first time period and/or for a third time period following the first time period.

18. A logic circuitry package according to any of Statements 11 to 17 configured to set the second address to an initial second address at each start of the first time period.

19. A logic circuitry package according to Statement 18 wherein the package is configured to set its second address to a temporary address in response to a command sent to the initial second address, the command including that temporary address.

20. A logic circuitry package according to Statement 18 or 19, wherein, on receipt of a subsequent command indicative of a task and the first time period sent to the first address, the logic circuitry package is configured to have the same initial second address.

21. A logic circuitry package according to any of Statements 11 to 20 which is configured to:
respond to commands directed to the first address and not to commands directed to the second address outside the first time period; and
respond to commands directed to the second address and not to commands directed to the first address during the first time period.

22. A plurality of logic circuitry packages according to any of Statements 11 to 21 having different first addresses and the same second address.

23. A method comprising:
in response to a first command indicative of a task and a first time period sent to a first address of processing circuitry via an I2C bus
  (i) performing, by the processing circuitry, a task and
  (ii) disregarding I2C traffic sent to the first address
for a duration of the time period, the method comprising monitoring the time period using a timer of the processing circuitry.

24. A method according to Statement 23 wherein the method is carried out on processing circuitry provided on a replaceable print apparatus component.

25. A method according to any of Statements 23 to 24, further comprising, for the duration of the time period, responding, by the processing circuitry, to I2C traffic sent to at least one second address of the processing circuitry.

26. A method according to Statement 25 wherein the first address is associated with a first logic circuit of the processing circuitry, and the at least one second address is associated with a second logic circuit of the processing circuitry.

27. A method according to Statement 25 or 26 further comprising disabling access to the processing circuitry via the at least one second address after the duration of the time period.

28. A method according to any of Statements 25 to 27 wherein the second address is configured to be an initial second address at the start of the first time period.

29. A method according to Statement 28 wherein the processing circuitry is configured to reconfigure its second address to a temporary second address in response to a command sent to the initial second address and including that temporary address during the first time period.

30. A method according to Statement 29, wherein, on receipt of a subsequent command indicative of the task and the first time period sent to the first address, the logic circuitry is configured to have the same initial second address.

31. A method according to any of Statements 23 to 30 wherein the processing circuitry comprises a first logic circuit and a second logic circuit of the processing circuitry, wherein the first logic circuit is to perform the task and to send an activation signal to the second logic circuit for the duration of the time period.

32. A method according to Statement 31 wherein the method further comprises deactivating the second logic circuit by ceasing the activation signal.

33. A method according to Statement 31 or 32 wherein the activation signal is sent via a dedicated signal path.

34. A method according to any of Statements 23 to 33 wherein the task performed by the processing circuitry is the task indicated in the first command.

35. Processing circuitry for use with a replaceable print apparatus component to connect to a print apparatus logic circuit comprising:
a memory and first logic circuit to enable a read operation from the memory and perform processing tasks, the first logic circuit comprising a timer,
wherein the processing circuitry is accessible via an I2C bus of a print apparatus in which the replaceable print apparatus component is installed and is associated with a first address and at least one second address, and the first address is an I2C address for the first logic circuit, and
wherein the first logic circuit is to participate in authentication of the replaceable print apparatus component by a print apparatus in which the replaceable print apparatus component is installed; and
the processing circuitry is configured such that, in response to a first command indicative of a task and a first time period sent to the first logic circuit via the first address, the processing circuitry is to:
  (i) perform a task, and
  (ii) not respond to I2C traffic sent to the first address for a duration of the time period as measured by the timer.

36. Processing circuitry according to Statement 35 wherein the processing circuitry further comprises a second logic circuit, wherein the second logic circuit is accessible via the I2C bus and a second address, and the first logic circuit is to generate an activation signal to activate the second logic circuit for the duration of the time period.

37. Processing circuitry according to Statement 36 wherein the processing circuitry comprises a dedicated signal path between the first and second logic circuits for transmitting the activation signal.

38. Processing circuitry according to Statement 36 or 37 wherein the second logic circuit comprises at least one sensor which is readable by a print apparatus in which the replaceable print apparatus component is installed via the second address.

39. Processing circuitry according to any of Statements 36 to 38 comprising at least one sensor which is readable by a print apparatus in which the replaceable print apparatus component is installed via the second address and which is not readable via the first address.

40. Processing circuitry according to Statement 38 or 39 wherein the sensor comprises a consumable materials level sensor.

41. A plurality of print components each comprising a memory, wherein the memories of different print component store different print liquid characteristics, and each print component comprises a logic circuitry package according to any of Statements 1 to 21 or processing circuitry of Statements 35 to 40.

42. A print cartridge comprising a logic circuitry package according to any of Statements 1 to 21 and having a housing that has a width that is less than a height, wherein, in a front face, from bottom to top, a print liquid output, an air input and a recess are provided, respectively, the recess extending at the top, wherein I2C bus contacts of the package are provided at a side of the recess against an inner side of a side wall of the housing adjacent the top and front of the housing, and comprise a data contact, the data contact being the lowest of the I2C bus contacts.

43. A print cartridge according to Statement 42, wherein the first logic circuit of the package is also provided against the inner side of the side wall.

44. A replaceable print apparatus component including the logic circuitry package of any of Statements 1 to 21, the component further comprising a volume of liquid, the component having a height that is greater than a width and a length that is greater than the height, the width extending between two sides, wherein the package comprises interface pads, and the interface pads are provided at an inner side of one of the sides facing a cut-out for a data interconnect to be inserted, the interface pads extending along a height direction near the top and front of the component, and a data pad is a bottom-most of the interface pads, the liquid and air interface of the component being provided at the front on the same vertical reference axis parallel to the height direction wherein the vertical axis is parallel to and distanced from the axis that intersects the interface pads.

45. A replaceable print apparatus component according to Statement 44 wherein the rest of the logic circuitry package is also provided against the inner side.

In some examples, the disclosure comprises any of the following Paragraphs

PARAGRAPHS

1. A logic circuitry package
configured to be addressable via a first address and at least one second address and comprising a first logic circuit,
wherein the first address is an address for the first logic circuit, wherein the package is configured such that:
in response to a first command indicative of a first command time period sent to the first address, the package is accessible via at least one second address for a duration of the first command time period; and
in response to a second command indicative of a second command time period sent to the first address, the first logic circuit is to, for a duration of the second command time period, disregard traffic sent to the first address.

2. A logic circuitry package according to Paragraph 1 wherein the first logic circuit comprises a timer wherein the first command time period and/or second command time period are measured by the timer.

3. A logic circuitry package of Paragraph 1 or Paragraph 2 wherein, in response to the second command the logic circuit is configured to perform a processing task during at least the first or second command time period.

4. A logic circuitry package according to Paragraph 3 wherein the processing task comprises at least one of: monitoring a timer and performing a computational task having a completion time which exceeds the first command time period and/or second command time period.

5. A logic circuitry package according to any preceding Paragraph wherein the second command time period is longer than the first command time period and the first logic circuit is to, in response to the second command, not respond to traffic sent to the first address for the duration of the second command time period.

6. A logic circuitry package according to any preceding Paragraph wherein the package is for association with a print material container.

7. A logic circuitry package according to Paragraph 6 further comprising a memory storing data representative of at least one characteristic of the print material container.

8. A logic circuitry package according to any preceding Paragraph wherein the package comprises a second logic circuit and the package is configured to make the second logic circuit accessible during the first command time period.

9. A logic circuitry package according to Paragraph 8 wherein the package comprises a dedicated signal path between the first and second logic circuit and the second logic circuit is made accessible by the first logic circuit sending a signal via the dedicated signal path.

10. A logic circuitry package according to Paragraph 9 wherein the signal is present for the duration of the first command time period.

11. A logic circuitry package according to any preceding Paragraph which comprises at least one sensor or at least one sensor array.

12. A logic circuitry package according to Paragraph 11 wherein the at least one sensor or at least one sensor array comprises at least one print material level sensor.

13. A logic circuitry package according to any preceding Paragraph wherein the package is configured such that, in response to the second command, the package is accessible via a second address for the duration of the second command time period.

14. A logic circuitry package according to Paragraph 13 wherein the package is configured to provide a first set of responses in response to instructions sent to the first address and to provide a second set of responses in response to instructions sent to a second address.

15. A logic circuitry package according to Paragraph 13 or 14 wherein the package is configured to operate in a first mode in response to instructions sent to the first address and to operate in a second mode in response to instructions sent to the first address.

16. A logic circuitry package according to any of Paragraphs 13 to 15 wherein the package is configured to provide a cryptographically authenticated set of responses in response to cryptographically authenticated instructions sent to the first address and to provide a second, not cryptographically, authenticated set of responses in response to instructions sent to the second address.

17. A logic circuitry package according to any of Paragraphs 13 to 16 wherein the second address is an address of the second logic circuit.

18. A logic circuitry package according to any of Paragraphs 13 to 17 wherein the package is not accessible via the second address for a time period preceding the first command time period and/or for a time period following the first command time period.

19. A logic circuitry package according to any of Paragraphs 13 to 18 wherein the second address is configured to be an initial second address at the start of the first command time period.

20. A logic circuitry package according to Paragraph 19 wherein the package is configured to reconfigure its second address to a temporary address in response to a command sent to the initial second address and including that temporary address during the first command time period.

21. A logic circuitry package according to Paragraph 19 or 20, wherein, on receipt of a subsequent command indicative of the first command time period sent to the first address, the logic circuitry package is configured to have the same initial second address.

22. A logic circuitry package according to any preceding Paragraph which is configured to:
respond to commands directed to the first address and not to commands directed to a second address outside the first command time period; and
respond to commands directed to a second address and not to commands directed to the first address during the first command time period.

23. A plurality of logic circuitry packages according to any of Paragraphs 13 to 22 having different first addresses and the same second address.

24. A plurality of logic circuitry packages according to Paragraph 23 storing different data representative of at least one characteristic of different print material containers.

25. A method comprising:
in response to a first command indicative of a first command time period sent to a first address of processing circuitry via an I2C bus, enabling, by the processing circuitry, access thereto via at least one second address for a duration of the first command time period; and
in response to a second command indicative of a second command time period sent to the first address via the I2C bus, and for a duration of the second command time period, ignoring I2C traffic sent to the first address;
the method further comprising monitoring at least one of the first and second command time period using a timer of the processing circuitry.

26. A method according to Paragraph 25 wherein the method is carried out on processing circuitry provided on a replaceable print apparatus component.

27. A method according to Paragraph 25 or 26 wherein in response to the second command, the processing circuitry is to perform a task.

28. A method according to Paragraph 27 wherein the task is a task indicated in the second command.

29. A method according to any of Paragraphs 25 to 28, further comprising, for the duration of the first command time period, responding, by the processing circuitry, to I2C traffic sent to the at least one second address of the processing circuitry.

30. A method according to Paragraph 29 wherein the first address is associated with a first logic circuit of the processing circuitry, and the at least one second address is associated with a second logic circuit of the processing circuitry.

31. A method according to Paragraph 30 further comprising disabling access to the processing circuitry via the at least one second address after the duration of the first command time period.

32. A method according to any of Paragraphs 25 to 31 wherein the second address is configured to be an initial second address at the start of the first command time period.

33. A method according to Paragraph 32 wherein the processing circuitry is configured to reconfigure its second address to a temporary address in response to a command sent to the initial second address and including that temporary address during the first command time period.

34. A method according to Paragraph 33, wherein, on receipt of a subsequent command indicative of the first command time period sent to the first address, the processing circuitry is configured to have the same initial second address.

35. A method according to any of Paragraphs 25 to 34 wherein the processing circuitry comprises a first logic circuit and a second logic circuit of the processing circuitry, wherein the method comprises, sending, by the first logic circuit, an activation signal to the second logic circuit for the duration of the first command time period.

36. A method according to Paragraph 35 wherein the method further comprises deactivating the second logic circuit by ceasing the activation signal.

37. A method according to Paragraph 35 or 36 comprising sending the activation signal via a dedicated signal path.

38. Processing circuitry for use with a replaceable print apparatus component comprising:
a memory and first logic circuit to enable a read operation from the memory and perform processing tasks, the first logic circuit comprising a timer,
wherein the processing circuitry is accessible via an I2C bus of a print apparatus in which the replaceable print apparatus component is installed and is associated with a first address and at least one second address, and the first address is an I2C address for the first logic circuit, and
wherein the first logic circuit is to participate in authentication of the replaceable print apparatus component by a print apparatus in which the replaceable print apparatus component is installed; and
wherein the circuitry is configured such that:
in response to a first command indicative of a first command time period sent to the first address, the processing circuit is accessible via at least one second address for a duration of the first command time period; and
in response to a second command indicative of a second command time period sent to the first address, the first logic circuit is to, for a duration of the second command time period as measured by the timer, ignore I2C traffic sent to the first address.

39. Processing circuitry according to Paragraph 38 wherein the first logic circuit is configured to be accessible via the at least one second address for the duration of the first command time period.

40. Processing circuitry according to Paragraph 39 wherein the processing circuitry further comprises a second logic circuit, wherein the second logic circuit is accessible via the I2C bus and a second address, and the first logic circuit is to generate an activation signal to activate the second logic circuit for the duration of the first command time period.

41. Processing circuitry according to Paragraph 40 wherein the processing circuitry comprises a dedicated signal path between the first and second logic circuits for transmitting the activation signal.

42. Processing circuitry according to Paragraph 39 or 41 wherein the second logic circuit comprises at least one sensor or sensor array which is readable by a print apparatus in which the replaceable print apparatus component is installed via the at least one second address.

43. Processing circuitry according to Paragraph 42 in which the at least one sensor or sensor array which is readable by a print apparatus in which the replaceable print apparatus component is installed via the at least one second address is not readable via the first address.

44. Processing circuitry according to any of Paragraphs 42 or 43 wherein the sensor comprises a consumable materials level sensor.

45. Processing circuitry according to any of Paragraphs 42 to 44 where, in response to the first command the processing circuitry is to, for a duration of the first command time period as measured by the timer, ignore I2C traffic sent to the first address; and/or in response to the second command, the processing circuit is accessible via at least one second address for a duration of the first command time period.

46. A plurality of print components each comprising a memory wherein the memories of different print components store different print liquid characteristics, and each print component comprises a logic circuitry package according to any of Paragraphs 1 to 22.

47. A print cartridge comprising a logic circuitry package according to any of Paragraphs 1 to 22 and having a housing that has a width that is less than a height, wherein, in a front face, from bottom to top, a print liquid output, an air input and a recess are provided, respectively, the recess extending at the top, wherein I2C bus contacts of the package are provided at a side of the recess against an inner side of a side wall of the housing adjacent the top and front of the housing, the I2C bus contacts comprising a data contact, the data contact being the lowest of the contacts.

48. A print cartridge according to Paragraph 47, wherein the first logic circuit of the package is also provided against the inner side of the side wall.

49. A replaceable print apparatus component including the logic circuitry package of any of Paragraphs 1 to 22, the component further comprising a volume of liquid, the component having a height that is greater than a width and a length that is greater than the height, the width extending between two sides, the package comprising interface pads, wherein the interface pads are provided at an inner side of one of the sides facing a cut-out for a data interconnect to be inserted, the interface pads extending along a height direction near the top and front of the component, and comprising a data pad, the data pad being the bottom-most of the interface pads, the liquid and air interface of the component being provided at the front on the same vertical reference axis parallel to the height direction wherein the vertical axis is parallel to and distanced from the axis that intersects the interface pads.

50. A replaceable print apparatus component according to Paragraph 49 wherein the rest of the logic circuitry package is also provided against the inner side.

In some examples, the disclosure comprises any of the following Clauses:

CLAUSES

1. A method comprising, by logic circuitry associated with a replaceable print apparatus component,
 responding to a first validation request sent via an I2C bus to a first address associated with the logic circuitry with a first validation response; and
 responding to a second validation request sent via the I2C bus to a second address associated with the logic circuitry with a second validation response.
2. A method according to Clause 1 wherein the first validation response comprises a cryptographically authenticated response.
3. A method according to Clause 2 wherein
 the logic circuitry stores print apparatus component characteristics data and a first key for cryptographic authentication of data being communicated, wherein the first key is related to a second key for cryptographic authentication stored on the print apparatus, and
 the cryptographically authenticated response includes the characteristics data encrypted using the first key, and at least one of a message authentication code and a session key identifier derived from the at least one of the first key and the second key.
4. A method according to Clause 3 wherein the second validation response comprises a bitstream that is not encrypted using the first key and not accompanied by a message authentication code and/or a session key identifier.
5. A method according to any of Clauses 2 to 4 wherein the first, cryptographically authenticated, response, authenticated using a key, in response to a cryptographically authenticated command via the first address, includes data that after decoding will be represented or used as print material level data by a receiving print apparatus logic circuit, and
 another response, not authenticated using the key, in response to a command received via the second address, also includes data that after decoding will be represented or used as print material level data by the receiving print apparatus logic circuit.
6. A method according to any preceding Clause wherein the second validation response comprises an unencrypted response.
7. A method according to any preceding Clause wherein the second validation request comprises a request for an indication of a clock speed of a timer of the logic circuitry, and the method comprises determining a clock speed of the logic circuitry relative to another measurable clock signal or cycle.
8. A method according to any preceding Clause further comprising, after receiving the first validation request, receiving an address setting signal, sent via the I2C bus to an initial second address associated with the logic circuitry, wherein the address setting signal is indicative of a temporary second address, and setting the temporary second address as the address of the logic circuitry.
9. A method according to Clause 8 wherein the initial address is a default address to be used before each occasion on which a temporary address is set.
10. A method according to any preceding Clause which comprises determining the second validation response by reading a memory of the logic circuitry to provide an indication of version identity.
11. A method according to any preceding Clause comprising determining the second validation response by testing at least one component of the logic circuitry to return a test result.
12. A method according to any preceding Clause comprising determining the second validation response by reading a memory of the logic circuitry to provide an indication of a number of sensors in at least one sensor class.
13. A method according to any preceding Clause comprising determining the second validation response comprising an indication of a read/write history of the logic circuitry.
14. A method according to Clause 13 further comprising storing the indication of a read/write status of the logic circuitry, and updating the stored indication with read/write requests of the logic circuitry.
15. A method according to Clause 14 as it depends on Clause 8, wherein the indication is not updated when rewriting an address of the logic circuitry to be the temporary second address.
16. A method according to any of Clauses 14 to 15 wherein updating the indication comprises applying a predetermined algorithmic function to a read/write request and/or response to determine an updated indication.
17. A method according to any of Clauses 13 to 16 wherein a plurality of indications of a read/write status are stored in a memory, each determined using a different predetermined algorithmic function, and wherein the second validation request comprises a request for one of the stored indications, and the method comprises providing the response for that indication.

18. A logic circuitry package for a replaceable print apparatus component which is addressable via a first address and a second, reconfigurable, address;
 wherein the package is configured to participate in a first validation process based on communications sent to the first address;
 and to participate in a second validation process based on communications sent to the second address.
19. A logic circuitry package according to Clause 18 wherein the logic circuitry package is I2C compatible, using I2C compatible addresses.
20. A logic circuitry package according to Clause 18 or 19 wherein the second, reconfigurable, address is reconfigurable between a default address and at least one different address.
21. A logic circuitry package according to any of Clauses 18-20 wherein the package comprises a memory comprising identification data configured to be read via the second address.
22. A logic circuitry package according to Clause 21 wherein the same identification data is stored in the package so as to be read by cryptographically authenticated communications via the first address.
23. A logic circuitry package according to any of Clauses 18 to 22 wherein the package comprises a memory comprising a read/write history data portion, configured to be read via the second address.
24. A logic circuitry package according to Clause 23 wherein the memory further comprises at least one cell count.
25. A logic circuitry package according to Clause 24 wherein the at least one cell count is configured to be read via the second address.
26. A logic circuitry package according to Clause 25 wherein the same at least one cell count data is configured to be read by cryptographically authenticated communications via the first address.
27. A logic circuitry package according to any of Clauses 24-26 comprising at least one cell or array of cells the number of which corresponds to the stored cell count.
28. A logic circuitry package according to any of Clauses 18 to 27 wherein the memory further stores a clock count.
29. A logic circuitry package according to Clause 28 wherein the clock count represents a relative or absolute clock speed of a timer of the package.
30. A logic circuitry package according to any of Clauses 18 to 29 wherein the logic circuitry stores print apparatus component characteristics data and a first key for cryptographic authentication of data being communicated, wherein the first key is related to a second key for cryptographic authentication stored on the print apparatus, and participating in the first validation process comprises sending a cryptographically authenticated response which includes the characteristics data encrypted using the first key, and at least one of a message authentication code and a session key identifier derived from the at least one of the first key and the second key.
31. A logic circuitry package according to Clause 30 which is configured to participate in the second validation process by sending validation responses comprising a bitstream that is not encrypted using the first key and not accompanied by a message authentication code and/or session key identifier.
32. A logic circuitry package according to Clause 31, wherein the logic circuitry package is configured to, in response to a first cryptographically authenticated validation request to the first address, provide a cryptographically authenticated response using the first key, in response to a command including a time period, be responsive to commands directed to a default second address, in response to a command directed to a default second address, the command including a new address, reconfigure the default second address to be a temporary second address, in response to a second validation request to the, reconfigured, temporary second address, provide a response that is not cryptographically authenticated using the first key, after the end of the time period, again respond to commands directed to the first address.
33. A logic circuitry package according to Clause 32 wherein, on receipt of a subsequent command indicative of a period sent to the first address, the logic circuitry package is configured to have the same default second address.
34. A logic circuitry package according to Clause 32 or Clause 33 which is configured to reset the second address to the same default address before or at each command including the time period.
35. A logic circuitry package according to Clause 34 comprising a first and a second logic circuit associated with the first and second address, respectively, the package configured to enable the second logic circuit in response to the command including the time period, and set the initial second address at set enabling.
36. A logic circuitry package according to any of Clauses 32 to 34 wherein the package comprises a first operational mode in which it responds to communication sent to the first address and not the second address and a second operational mode in which it responds to communications sent to the reconfigurable address and not the first address.
37. A logic circuitry package according to any of Clauses 24 to 36 wherein the package comprises a first logic circuit associated with the first address and a second logic circuit associated with the reconfigurable address.
38. A logic circuitry package according to Clause 37 configured such that the second logic circuit is selectively enabled by the first logic circuit.
39. A logic circuitry package according to any of Clauses 18 to 32 wherein the first validation response includes identification data, the package includes a second logic circuit and the identification data pertains to the second logic circuit.
40. A logic circuitry package according to any of Clauses 18 to 39 wherein the first validation response includes identification data and the second validation response includes the same identification data.
41. A logic circuitry package according to any of Clauses 18 to 40 wherein the package is configured such that, in response to a first command indicative of a task and a first time period sent to the first address, the package is accessible via at least one second address for a duration of the time period.
42. A logic circuitry package according to Clause 41 comprising a timer to measure the time period.
43. A logic circuitry package according to Clause 42 comprising a second timer to indicate a clock speed of the logic circuitry during the time period.
44. A print material container validation package comprising a memory, a contact array for connecting with a I2C bus, at least one timer, and circuitry to provide:
 a first validation function, triggered by messages sent to a first address on an I2C bus, a second validation function, triggered by messages sent to a second address on the I2C bus.
45. A print cartridge comprising a logic circuitry package according to any of Clauses 18 to 43 and having a housing that has a width that is less than a height, wherein, in a front face, from bottom to top, a print liquid output, an air input and a recess are provided, respectively, the recess extending at the top, the package comprising I2C bus contacts, wherein the I2C bus contacts are provided at a side of the recess against an inner side of a side wall of the housing adjacent the top and front of the housing, and the I2C bus contacts comprise a data contact, the data contact being the lowest of the I2C bus contacts.

46. A print cartridge according to Clause 45, wherein the logic circuit of the package is provided against the inner side of the side wall.

In some examples, the disclosure comprises any of the following Descriptions:

DESCRIPTIONS

1. A logic circuit comprising:
    a communications interface including a data contact to communicate via a communications bus;
    an enablement contact, separate from the communication interface, to receive an input to enable the logic circuit; and
        at least one memory register, comprising at least one reconfigurable address register, wherein the logic circuit is configured, such that, when enabled, it responds to communications sent via the communication bus which are addressed to the address held in a reconfigurable address register.
2. A logic circuit according to Description 1 comprising:
    an analogue to digital converter.
3. A logic circuit according to Description 2 further comprising at least one memory register to store an offset parameter and/or a gain parameter for the analogue to digital converter.
4. A logic circuit according to any preceding Description wherein the logic circuit comprises at least one sensor.
5. A logic circuit according to Description 4 wherein the at least one sensor comprises at least one liquid level sensor.
6. A logic circuit according to Description 4 or Description 5 wherein the at least one sensor comprises a first sensor array and a second sensor array, wherein the first and second sensor arrays comprise sensors of different types.
7. A logic circuit according to any of Descriptions 4 to 6 wherein the at least one sensor comprises at least one of an ambient temperatures sensor, a crack detector and a fluid temperature sensor.
8. A logic circuit according to any of Descriptions 4 to 6 comprising at least one of: at least one memory register to store a sensor identifier;
    at least one memory register to store a sensor reading; and
        at least one memory register to store a number of sensors.
9. A logic circuit according to any of Descriptions 4-8 wherein the at least one sensor is provided on a substrate and the substrate and/or sensor have a length:width aspect ratio, as measured along the substrate surface, of at least 20:1.
10. A logic circuit according to any preceding Description wherein the logic circuit has a width and/or thickness of less than 1 mm.
11. A logic circuit according to any preceding Description comprising at least one memory register to store a version identity.
12. A logic circuit according to any preceding Description comprising a timer.
13. A logic circuit according to Description 12 in which the timer comprises a ring oscillator.
14. A logic circuit according to Description 12 or 13 comprising at least one memory to store a count of clock cycles.
15. A logic circuit according to any of the preceding Descriptions comprising a memory to store a value indicative of a read/write history of the logic circuit.
16. A logic circuit according to any preceding Description comprising logic configured to determine a value indicative of a read/write history of the logic circuit using a predetermined algorithmic function and/or based on predetermined secret data.
17. A logic circuit according to any preceding Description comprising logic configured to determine a plurality of values indicative of a read/write history of the logic circuit using different predetermined algorithmic function and/or based on predetermined secret data.
18. A logic circuit according to any preceding Description wherein the interface is an I2C interface.
19. A logic circuit according to any preceding Description wherein the logic circuit is for association with a print material container.
20. A replaceable print apparatus component including the logic circuit of any preceding Description, the component further comprising a volume of liquid, the component having a height that is greater than a width and a length that is greater than the height, the width extending between two sides, wherein the logic circuit comprises interface pads, and the interface pads are provided at an inner side of one of the sides facing a cut-out for a data interconnect to be inserted, the interface pads extending along a height direction near the top and front of the component, and the interface pads comprise a data pad, the data pad being the bottom-most of the interface pads, the liquid and air interface of the component being provided at the front on the same vertical reference axis parallel to the height direction wherein the vertical axis is parallel to and distanced from the axis that intersects the interface pads.
21. A replaceable print apparatus component according to Description 20 wherein the rest of the logic circuit is also provided against the inner side.
22. A logic circuit package comprising a first logic circuit and a second logic circuit, wherein the first logic circuit is configured to respond to communications sent to a first address and the second logic circuit comprises a logic circuit according to any of Descriptions 1 to 19.
23. A method comprising receiving, by logic circuitry connected to an I2C bus, an enablement signal, wherein the enablement signal is provided at an input which is separate to the I2C bus, setting, by the logic circuitry, an address thereof by writing a default address to an address memory register;
    receiving, by the logic circuitry, a command addressed to the default address and comprising a request to reset the address;
    setting, by the logic circuitry, a temporary address thereof by overwriting the default address in the address memory register; and
    receiving, by the logic circuitry, a command addressed to the temporary address.
24. A method according to Description 23 comprising receiving, by the logic circuitry, a validation request addressed to the temporary address, the validation request comprising a request for an indication of a clock speed of a timer of the logic circuitry; and determining, by the logic circuitry, a clock speed of the logic circuitry relative to another measurable clock signal or cycle and determining a validation response based on the relative clock speed.
25. A method according to Description 23 or 24 comprising receiving, by the logic circuitry, a validation request addressed to the second address, the validation request comprising a request for an indication of version identity; and determining, by the logic circuitry, a validation response by reading a memory of the logic circuitry to provide an indication of version identity.

26. A method according to any of Descriptions 23 to 25 comprising receiving, by the logic circuitry, a validation request addressed to the second address, the validation request comprising a request for an indication of version identity; and determining, by the logic circuitry, a validation response by testing at least one component of the logic circuitry to return a test result.

In some examples, the disclosure comprises any of the following Items:

ITEMS

1. A logic circuitry package configured to communicate with a print apparatus logic circuit, wherein the logic circuitry package is configured to respond to communications sent to a first address and to at least one second address, and the logic circuitry package comprises a first logic circuit, wherein the first address is an address for the first logic circuit, and the package is configured such that, in response to a first command indicative of a task and a first time period sent to the first address, the package is accessible via at least one second address for a duration of the time period.
2. A logic circuitry package according to Item 1 wherein the package is for association with a print material container.
3. A logic circuitry package according to Item 2 further comprising a memory storing data representative of at least one characteristic of the print material container.
4. The logic circuitry package according to any preceding Item that is configured to be I2C compatible and wherein at least of the first and second addresses are I2C compatible addresses.
5. A logic circuitry package according to any preceding Item wherein the package is not accessible via the second address for a second time period preceding the first time period and/or for a third time period following the first time period.
6. A logic circuitry package according to any preceding Item which is configured to:
respond to communications sent to the first address and not to communications sent to the second address(es) outside the first time period; and
respond to communications sent to the second address(es) and not to communications sent to the first address during the first time period.
7. A logic circuitry package according to any preceding Item configured to set the second address to an initial second address at each start of the first time period.
8. A logic circuitry package according to Item 7 wherein the package is configured to set its second address to a temporary address in response to a command sent to the initial second address, the command including that temporary address.
9. A logic circuitry package according to Item 7 or 8, wherein, on receipt of a subsequent command indicative of the task and the first time period sent to the first address, the logic circuitry package is configured to have the same initial second address.
10. A logic circuitry package according to any preceding Item wherein the first logic circuit is to perform the task for the duration of the time period.
11. A logic circuitry package according to Item 10 in which the task comprises at least one of:
activating the second address, deactivating the first address, transmitting a signal to another logic circuit of the package, re-configuring the initial second address to a different, temporary second address, performing a computational task, and monitoring a timer of the first logic circuit.
12. A logic circuitry package according to any preceding Item wherein the first logic circuit comprises a timer to measure the duration of the time period.
13. A logic circuitry package according to any preceding Item wherein the first logic circuit is configured to not respond to commands sent to the first address for the duration of the time period.
14. A logic circuitry package according to any preceding Item wherein the package is configured to operate in a first mode in response to communications sent to the first address and to operate in a second mode in response to communications sent to the second address.
15. A logic circuitry package according to any preceding Item wherein the package is configured to provide a cryptographically authenticated set of responses in response to cryptographically authenticated communications sent to the first address and to provide a second, not cryptographically authenticated, set of responses in response to communications sent to the at least one second address.
16. A logic circuitry package according to any preceding Item further comprising a second logic circuit, wherein the second address is an address of the second logic circuit.
17. A logic circuitry package according to Item 16 wherein the second logic circuit includes at least one of a non-volatile memory, a plurality of registers, a timer, and read and/or write buffers.
18. A logic circuitry package according to Item 16 or 17 wherein the second logic circuit comprises at least one sensor or sensor array.
19. A logic circuitry package according to any of Items 16 to 18 wherein the package comprises a dedicated signal path between the first and second logic circuit, and the at least one second address is enabled by the first logic circuit sending a signal via the dedicated signal path and wherein the package is configured to activate the second logic circuit in response to the first command.
20. A logic circuitry package according to Item 19 wherein the signal is present for the duration of the time period.
21. A logic circuitry package according to any preceding Item which comprises at least one sensor or sensor array.
22. A logic circuitry package according to Item 20 wherein the at least one sensor or sensor array comprises at least one of a print material level sensor and another sensor type.
23. A logic circuitry package according to any preceding Item which is configured to transmit, outside of said time period and in response to communications sent to the first address, communications that are authenticated using a key, and which is further configured to transmit, during said time period and in response to communications sent to the second address, communications which are not authenticated using that key.
24. A logic circuitry package according to any preceding Item which is configured to transmit, outside of said time period and in response to communications sent to the first address, print material level-related data that is authenticated using an key, and which is further configured to transmit, during said time period and in response to communications sent to the second address, print-material level-related data not authenticated using that key, wherein print-material level-related data is data that the print apparatus logic circuit interprets and represents as print material level of a print component to which the logic circuitry package pertains.

25. A logic circuitry package according to Item 23 or 24 wherein the key is an encryption key and/or a secret base key.

26. A replaceable print apparatus component including the logic circuitry package of any preceding Item, the component further comprising a volume of liquid,
the component having a height that is greater than a width and a length that is greater than the height, the width extending between two sides, and wherein:
the package comprises interface pads for communicating with the print apparatus logic circuit and the interface pads are provided at an inner side of one of the sides facing a cut-out for a data interconnect to be inserted, the interface pads extending along a height direction near a top and front of the component, and the interface pads comprising a data pad, the data pad being a bottom-most of these interface pads,
and the liquid and air interface of the component is provided at the front on the same vertical reference axis parallel to the height direction wherein the vertical axis is parallel to and distanced from the axis that intersects the interface pads.

27. A replaceable print apparatus component according to Item 26 wherein the rest of the logic circuitry package is also provided against the inner side.

28. A plurality of packages according to any of Items 1 to 25 having different first addresses and the same second address.

29. A replaceable print apparatus component including an I2C compatible logic circuitry package, wherein the I2C compatible logic circuitry package comprises:
an I2C interface including a data contact to communicate via an I2C bus of a host print apparatus;
a memory comprising data representing print liquid characteristics, the data retrievable and updatable via the data contact;
wherein the package is configured to transmit data including said data representing print liquid characteristics to the bus over the data contact; and
wherein the package is further configured to, in response to a command indicative of a first time period sent to a first address, subsequently respond to commands sent to at least one second address for a duration of the time period over the same bus and data contact; and
after the end of the time period, again respond to commands transmitted to the first address over the same bus and data contact.

30. A replaceable print apparatus component according to Item 29, wherein the command is also indicative of a task.

31. A replaceable print apparatus component according to Item 29, wherein
the second address includes an initial second address, and the package is configured to, in response to a command to the initial second address including a temporary address, respond to data sent to the temporary address until the end of the time period over the same bus and data contact.

32. A print cartridge comprising an I2C compatible logic circuitry package according to any of Item 1 to 25 and having a housing that has a width that is less than a height, wherein, in a front face, from bottom to top, a print liquid output, an air input and a recess are provided, respectively, the recess extending at the top, wherein I2C bus contacts of the package are provided at a side of the recess against an inner side of a side wall of the housing adjacent the top and front of the housing, the data contact being the lowest of the contacts.

33. A print cartridge according to Item 32, wherein the first logic circuit of the package is also provided against the inner side of the side wall.

34. A method comprising:
in response to a first command indicative of a task and a first time period sent to a first address of processing circuitry via a communications bus, enabling, by the processing circuitry, access thereto via at least one second address for a duration of the time period.

35. A method according to Item 34 wherein the method is carried out on processing circuitry provided on a replaceable print apparatus component.

36. A method according to Item 34 or 35 further comprising disabling access to the processing circuitry via the first address for the duration of the time period.

37. A method according to Item 34 to 36 further comprising disabling access to the processing circuitry via any second address after the duration of the time period.

38. A method according to Items 34 to 37 further comprising monitoring the duration of the time period using a timer of the processing circuitry.

39. A method according to any of Items 34 to 38 wherein the first address is associated with a first logic circuit and the second address is associated with a second logic circuit, and method comprises performing, by the first logic circuit, the task for the duration of the time period.

40. A method according to any of Items 33 to 38 wherein the first address is associated with first logic circuit and the at least one second address is associated with second logic circuit, and wherein enabling access to the processing circuitry via the second address comprises activating the second logic circuit.

41. A method according to Item 40 wherein the method comprises the first logic circuit sending an activation signal to the second logic circuit to activate the circuitry.

42. A method according to Item 41 wherein the method further comprises deactivating the second logic circuit by ceasing the activation signal.

43. A method according to any of Item 40 to 42 comprising sending the activation signal via a dedicated signal path.

44. A method according to any of Items 34 to 43 wherein the second address is configured to be an initial second address at the start of the first time period.

45. A method according to Item 44 comprising reconfiguring, by the processing circuitry, the initial second address to a temporary address in response to a command sent to the initial second address and including that temporary address during the first time period.

46. A method according to Item 44 or Item 45, wherein, on receipt of a subsequent command indicative of the task and the first time period sent to the first address, the processing circuitry is configured to have the same initial second address.

47. Processing circuitry for use with a replaceable print apparatus component comprising:
  a memory and first logic circuit to enable a read operation from the memory,
wherein the processing circuitry is accessible via an I2C bus of a print apparatus in which the replaceable print apparatus component is installed and is associated with a first address and at least one second address, and the first address is an I2C address for the first logic circuit, and
wherein the first logic circuit is to participate in authentication of the replaceable print apparatus component by a print apparatus in which the replaceable print apparatus component is installed; and
the processing circuitry is configured such that, following receipt of a first command indicative of a first time period sent to the first logic circuit via the first address, the processing circuitry is accessible via at least one second address for a duration of the time period.

48. Processing circuitry according to Item 47, wherein the processing circuitry further comprises a second logic circuit, wherein the second logic circuit is accessible via the at least one second address and wherein the second logic circuit comprises at least one sensor which is readable by a print apparatus in which the replaceable print apparatus component is installed via the at least one second address.

49. Processing circuitry according to Item 47 or 48 in which the at least one sensor which is readable by a print apparatus in which the replaceable print apparatus component is installed via the at least one second address is not readable via the first address.

50. Processing circuitry according to any of Items 47 to 49 wherein the sensor comprises a consumable materials level sensor.

In some examples, the disclosure comprises any of the following Passages:

PASSAGES

1. A method comprising, by logic circuitry associated with a replaceable print apparatus component installed in a print apparatus,
receiving a sensor data request;
determining whether the request is for data indicative of a print material level or for data indicative of a pressurisation event; and
in the event that the request is a request for data indicative of the print material level, responding with a first data response in a first value range; and
in the event that the request is a request for data indicative of a pressurisation event, responding with a second data response in a second value range.

2. A method according to Passage 1 further comprising measuring sensor data in response to the sensor data request.

3. A method according to any preceding Passage wherein responding to a sensor data request comprises determining whether the sensor data request is for data indicative of a print material level or for data indicative of a pressurisation event based on an identifier.

4. A method according to any preceding Passage further comprising, prior to returning the first or second data response, storing the first or second data response in a predetermined memory location.

5. A method according to any preceding Passage comprising, in response to receiving the sensor data request, acquiring the first or second data response and prior to returning the first or second data response, receiving a request to supply the acquired first or second data response.

6. A method according to Passage 5 in which the sensor data request comprise a write command and the request to supply the acquired first or second data response comprises a read command.

7. A method according to any preceding Passage further comprising receiving the request and returning the first and/or second data response via a communication bus.

8. A method according to any preceding Passage further comprising, prior to receiving the sensor data request, and in response to a first command indicative of a time period sent to a first address of processing circuitry via a communications bus, enabling, by the processing circuitry, access thereto via at least one second address for a duration of the time period.

9. A method according to Passage 8 wherein the second address is configured to be an initial second address at the start of the first time period.

10. A method according to Passage 9 comprising reconfiguring, by the processing circuitry, the initial second address to a temporary address in response to a command sent to the initial second address and including that temporary address during the first time period.

11. A method according to Passage 9 or Passage 10 comprising, on receipt of a subsequent command indicative of the task and the first time period sent to the first address, configuring the processing circuitry to have the same initial second address.

12. A method according to any preceding Passage further comprising, prior to receiving the first command, responding to a first validation request to a first address associated with the logic circuitry with a cryptographically authenticated validation response.

13. A method according to Passage 12 in which the first and second data responses are not cryptographically authenticated.

14. A method according to any preceding Passage comprising, prior to receiving the sensor data request, calibrating data response parameters.

15. A method according to any preceding Passage which comprises receiving a plurality of data requests for data indicative of a print material level or data indicative of a pressurisation event, and returning a plurality of first data responses in the first value range, or a plurality of second data responses in a second value range accordingly.

16. A method according to Passage 15 wherein:
if a plurality of first data responses is provided, the plurality of first data responses comprise a sequence of data readings having a step change, and/or
if a plurality of second data responses is provided, the plurality of second data responses comprise a smoothly varying sequence of data readings.

17. A logic circuitry package configured to:
communicate with a print apparatus logic circuit,
determine whether a sensor data request received from the print apparatus logic circuit is for data indicative of a print material level or for data indicative of a pressurisation event; and
in the event that the request is a request for data indicative of the print material level, respond with a first data response in a first value range; and
in the event that the request is a request for data indicative of a pressurisation event, respond with a second data response in a second value range.

18. A logic circuitry package according to Passage 17 configured to carry out the method of any of Passages 1 to 16.

19. A system comprising a print apparatus and a logic circuitry package,
wherein the print apparatus comprises a print apparatus logic circuit to request data indicative of a print material level or for data indicative of a pressurisation event and the logic circuitry package is configured to communicate with a print apparatus logic circuit,
wherein the print apparatus logic circuitry is configured to:
when requesting data indicative of the print material level, request a first data response having a first number of data readings; and
when requesting data indicative of a pressurisation event, request a second data response having a second number of data readings, and the logic circuitry package is configured to provide the requested data response.

20. A system according to Passage 19 in which the first data response is requested using a number of data requests equal to or greater than the first number and the second data response is requested using number of data requests equal to or greater than the second number.

21. A system according to Passage 19 or 20 in which the first data response comprises a data sequence comprising a step change.

22. A system according to any of Passages 19 or 21 in which the second data response comprises a smoothly varying data sequence.

23. A system according to any of Passages 19 to 22 in which the logic circuitry package is configured to respond to communications sent to a first address and to at least one second address, and the logic circuitry package comprises a first logic circuit, wherein the first address is an address for the first logic circuit, and the package is configured such that, in response to a first command sent to the first address, the package is accessible via at least one second address for a duration of the time period, and, to provide the first and second responses during the time period.

24. A system according to Passage 23 in which the logic circuitry package further comprises a second logic circuit, which is addressable via the second address.

25. A system according to Passage 24 wherein the second logic circuit includes at least one of a non-volatile memory, a plurality of registers, a timer, and read and/or write buffers.

26. A system according to Passage 24 or 25 wherein the second logic circuit comprises at least one sensor or sensor array.

27. A system according to any of Passages 23 to 26 in which the logic circuitry package is configured to transmit, outside of said time period and in response to communications sent to the first address, communications that are authenticated using a key, and which is further configured to transmit, during said time period and in response to communications sent to the second address, communications which are not authenticated using that key.

28. A system according to any of Passages 23 to 27 in which the logic circuitry package is configured to transmit, outside of said time period and in response to communications sent to the first address, print material level-related data that is authenticated using a key, and which is further configured to transmit, during said time period and in response to communications sent to the second address, print-material level-related data not authenticated using that key, wherein print-material level-related data is data that the print apparatus logic circuit interprets and represents as print material level of a print component to which the logic circuitry package pertains.

29. A system according to Passage 27 or 28 wherein the key is an encryption key and/or a secret base key.

30. A system according to Passages 19 to 29 in which the logic circuitry package is for association with a print material container.

31. A system according to Passage 30 in which the logic circuitry package further comprises a memory storing data representative of at least one characteristic of the print material container.

32. A system according any of Passages 19 to 31 in which the logic circuitry package is configured to be I2C compatible.

33. A system according to any of Passages 19 to 32 in which the logic circuitry package comprises at least one sensor or sensor array.

34. A system according to Passage 33 wherein the at least one sensor or sensor array comprises at least one of a print material level sensor and an array of strain sensors.

35. A system according to any of Passages 19 to 32 in which the logic circuitry package is configured to carry out the method of any of Passages 1 to 16.

36. A replaceable print apparatus component including the logic circuitry package of Passage 17 or 18, the component further comprising a volume of liquid,
 the component having a height that is greater than a width and a length that is greater than the height, the width extending between two sides, and wherein:
 the package comprises interface pads for communicating with the print apparatus logic circuit and the interface pads are provided at an inner side of one of the sides facing a cut-out for a data interconnect to be inserted, the interface pads extending along a height direction near a top and front of the component, and the interface pads comprising a data pad, the data pad being a bottom-most of these interface pads,
 and the liquid and air interface of the component is provided at the front on the same vertical reference axis parallel to the height direction wherein the vertical axis is parallel to and distanced from the axis that intersects the interface pads.

37. A replaceable print apparatus component according to Passage 36 wherein the rest of the logic circuitry package is also provided against the inner side.

38. Processing circuitry for use with a replaceable print apparatus component comprising:
 a memory and first logic circuit to enable a read operation from the memory, wherein the processing circuitry is accessible via an I2C bus of a print apparatus in which the replaceable print apparatus component is installed and is associated with a first address and at least one second address, and the first address is an I2C address for the first logic circuit, and
 wherein the first logic circuit is to participate in authentication of the replaceable print apparatus component by a print apparatus in which the replaceable print apparatus component is installed; and
 the processing circuitry is configured such that, following receipt of a first command indicative of a first time period sent to the first logic circuit via the first address, the processing circuitry is accessible via at least one second address for a duration of the time period and, during the time period, to provide a plurality of different reading responses.

39. Processing circuitry according to Passage 38 wherein the reading responses are in response to at least one subsequent command during the time period, the at least one command including at least one of a type selection, the processing circuitry is configured to provide different reading responses in response to receiving different type selections.

40. Processing circuitry according to Passage 38 or 39 wherein the processing circuitry is configured to,
 for each sensor type, provide non-clipped reading responses in a predefined output value range based on certain received operational calibration parameters for the respective type,
 provide different reading responses for different sensor types, using the respective operational calibration parameters for each sensor type.

41. Processing circuitry according to any of Passages 38 to 40, wherein the processing circuitry further comprises a second logic circuit, wherein the second logic circuit is accessible via the at least one second address and wherein the second logic circuit comprises at least one cell which is readable by a print apparatus in which the replaceable print apparatus component is installed via the at least one second address.

42. Processing circuitry according Passage 41, in which the at least one cell which is readable by a print apparatus in which the replaceable print apparatus component is installed via the at least one second address is not readable via the first address.

43. Processing circuitry according to Passage 41 or 42 wherein the cell comprises at least part of at least one of consumable materials level sensor and a pressure sensor.

44. Processing circuitry according to any of Passages 38 to 43 which is configured to read a plurality of sensors associated therewith in turn.

45. Processing circuitry according to any of Passages 38 to 44 which is configured to carry out the method of any of Passages 1 to 16.

46. A replaceable print apparatus component including an I2C compatible logic circuitry package, wherein the I2C compatible logic circuitry package comprises:
    an I2C interface including a data contact to communicate via an I2C bus of a host print apparatus;
    a memory comprising data representing print liquid characteristics, the data retrievable and updatable via the data contact;
    wherein the package is configured to transmit data including said data representing print liquid characteristics to the bus over the data contact; and
    wherein the package is further configured to communicate with a print apparatus logic circuit, and to respond to a first sensor data request received from the print apparatus logic circuit by returning a first response, and to respond to a second sensor data request received from the print apparatus logic circuit by returning a second response, wherein the first sensor data request is a request for data or a first sensor type and the second sensor data request is a request for data or a first sensor type, and the second response is different from the first response.

47. A replaceable print apparatus component according to Passage 46 wherein the I2C compatible logic circuitry package is configured to:
    in response to a first authenticated command received through the data contact, decode the command and respond with an authenticated message authenticated using an authentication feature,
    in response to at least one second authenticated command received through the same data contact, the command including a second I2C address and a timing period,
    set at least part of the logic to respond to commands directed to the second address,
    start a timer to determine the end of the timing period,
    after start of the timer, respond to messages sent to the second I2C address, during at least part of the timing period by providing the first and second responses, and
    after the timing period, respond to messages addressed to the first I2C address and not to the second I2C address.

48. A replaceable print apparatus component according to Passage 46 or 47 wherein the I2C compatible logic circuitry package is configured to carry out the method of any of Passages 1 to 16.

What is claimed is:

1. A logic circuitry package comprising:
    memory to store a conversion parameter of an analogue to digital converter;
    instructions; and
    processor circuitry to execute the instructions to:
        communicate with a logic circuit,
        respond to a sensor data request received from a host logic circuit by returning a first response, and following receipt of a calibration parameter from the host logic circuit, return a second response which is different from the first response and cause the stored conversion parameter to be overwritten.

2. A logic circuitry package according to claim 1, wherein the memory is to store the calibration parameter, wherein following receipt of the calibration parameter from the host logic circuitry, the stored calibration parameter is overwritten.

3. A logic circuitry package according to claim 1, wherein the processor circuitry is to set the calibration parameter to a default value before or upon receiving a command.

4. A logic circuitry package according to claim 1, including at least one of a non-volatile memory, a plurality of registers, a timer, or read and/or write buffers.

5. A logic circuitry package according to claim 1, including at least one sensor or sensor array.

6. A logic circuitry package according to claim 5, wherein the at least one sensor or sensor array includes at least one of a liquid presence sensor or an array of strain sensors.

7. A logic circuitry package according to claim 1, wherein the calibration parameter includes at least one of an offset parameter or a gain parameter.

8. A logic circuitry package according to claim 1, wherein the processor circuitry is to use the calibration parameter to determine the second response.

9. A logic circuitry package according to claim 1, wherein the processor circuitry is to query a sensor or a sensor cell in response to the sensor data request.

10. A logic circuitry package according to claim 9, wherein the processor circuitry is to set at least one parameter for the sensor or sensor cell prior to querying the cell.

11. A logic circuitry package according to claim 1, wherein to respond to the sensor data request, the processor circuitry is to determine for which sensor or sensor cell the sensor data is requested based on an identifier provided in the request.

12. A logic circuitry package according to claim 1, wherein to respond to the sensor data request, the processor circuitry is to:
    (i) following receipt of a first command, acquire a data reading and store the data reading in the memory; and
    (ii) following receipt of a second command, send the stored data reading to the host logic circuit.

13. A logic circuitry package according to claim 1, wherein the processor circuitry is to receive a second sensor data request prior to returning the second response.

14. A logic circuitry package according to claim 1, wherein (i) at least one of the first response or second response is in a first value range when the sensor data request is a request for data of a first sensor type, and (ii) at least one of the first response or second response is in a second value range when the sensor data request is a request for data of a second sensor type.

15. A logic circuitry package according to claim 14, wherein the first sensor type includes a materials level sensor and the second sensor type includes a pressure sensor.

16. A logic circuitry package according to claim 1, wherein the first response and the second response are not cryptographically authenticated.

17. A logic circuitry package according to claim 1, wherein the calibration parameter is a first calibration parameter, and the processor circuitry is to:
    receive a second calibration parameter after returning the second response; and
    return a third response different from the second response.

18. Processor circuitry for use with a replaceable print component comprising:
  a memory; and
  a first logic circuit to enable a read operation from the memory,
  wherein the Processor circuitry is accessible via a communications bus of a print apparatus in which the replaceable print component is installed, the processor circuitry is associated with a first address and at least one second address, and the first address is an address for the first logic circuit, and
  wherein the first logic circuit is to participate in authentication of the replaceable print component by the print apparatus in which the replaceable print apparatus component is installed; and
  following receipt of a first command indicative of a first time period sent to the first logic circuit via the first address, the processor circuitry is accessible via at least one second address for a duration of the time period and, during the time period, the processor circuitry is to calibrate a response to a data request in response to feedback received from the print apparatus.

19. Processor circuitry according to claim 18, including a second logic circuit, wherein the second logic circuit is accessible via the at least one second address and wherein the second logic circuit includes at least one cell which is readable by the print apparatus in which the replaceable print apparatus component is installed via the at least one second address.

\* \* \* \* \*